(12) United States Patent
Zhang et al.

(10) Patent No.: US 11,490,086 B2
(45) Date of Patent: Nov. 1, 2022

(54) BLOCK DIMENSION SETTINGS OF TRANSFORM SKIP MODE

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Zhipin Deng, Beijing (CN); Hongbin Liu, Beijing (CN); Na Zhang, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/523,167

(22) Filed: Nov. 10, 2021

(65) Prior Publication Data

US 2022/0070461 A1    Mar. 3, 2022

Related U.S. Application Data

(63) Continuation of application No. PCT/CN2020/089936, filed on May 13, 2020.

(30) Foreign Application Priority Data

May 13, 2019 (WO) ................ PCT/CN2019/086656
Sep. 21, 2019 (WO) ................ PCT/CN2019/107144

(51) Int. Cl.
*H04L 25/493* (2006.01)
*H03K 5/1534* (2006.01)
(Continued)

(52) U.S. Cl.
CPC .......... *H04N 19/124* (2014.11); *H04N 19/12* (2014.11); *H04N 19/127* (2014.11);
(Continued)

(58) Field of Classification Search
None
See application file for complete search history.

(56) References Cited

U.S. PATENT DOCUMENTS 9,426,466 B2  8/2016  Van Der Auwera et al.
10,404,988 B2  9/2019  Ye et al.
(Continued)

FOREIGN PATENT DOCUMENTS

CN    1736103 A    2/2006
CN    103098467 A    5/2013
(Continued)

OTHER PUBLICATIONS

Bross et al. "High Efficiency Video Coding (HEVC) Text Specification Draft 9," Joint Collaborative Team on Video Coding (JCT-VC) of ITU-T SG16 WP3 and ISO/IEC JTC1/SC29/WG11 11th Meeting: Shanghai, CN, Oct. 10-19, 2012, document JCTVC-K1003, 2012.
(Continued)

*Primary Examiner* — Christopher Braniff
(74) *Attorney, Agent, or Firm* — Perkins Coie LLP

(57) ABSTRACT

Devices, systems and methods for lossless coding for visual media coding are described. An exemplary method for video processing includes determining, based on a current video block of a video satisfying a dimension constraint, that coding modes are enabled for representing the current video block in a bitstream representation, where the dimension constraint states that a same set of allowed dimensions for the current video block is disabled for the coding modes, and where, for an encoding operation, the coding modes repre-
(Continued)

sent the current video block in the bitstream representation without using a transform operation, or where, for a decoding operation, the coding modes are used to obtain the current video block without using an inverse transform operation; and performing a conversion between the current video block and the bitstream representation of the video based on one of the coding modes.

17 Claims, 45 Drawing Sheets

(51) Int. Cl.
| | |
|---|---|
| H04N 19/124 | (2014.01) |
| H04N 19/12 | (2014.01) |
| H04N 19/127 | (2014.01) |
| H04N 19/167 | (2014.01) |
| H04N 19/176 | (2014.01) |
| H04N 19/70 | (2014.01) |

(52) U.S. Cl.
CPC ......... *H04N 19/167* (2014.11); *H04N 19/176* (2014.11); *H04N 19/70* (2014.11)

(56) References Cited

U.S. PATENT DOCUMENTS

| | | | |
|---|---|---|---|
| 11,233,992 B2 | 1/2022 | Kim | |
| 2013/0003838 A1 | 1/2013 | Gao et al. | |
| 2013/0077696 A1 | 3/2013 | Zhou | |
| 2014/0146894 A1 | 5/2014 | Yu et al. | |
| 2014/0226721 A1 | 8/2014 | Joshi et al. | |
| 2014/0362917 A1* | 12/2014 | Joshi | H04N 19/129 375/240.12 |
| 2015/0264354 A1 | 9/2015 | Zhang et al. | |
| 2015/0304667 A1 | 10/2015 | Suehring et al. | |
| 2016/0100189 A1 | 4/2016 | Pang et al. | |
| 2016/0227221 A1 | 8/2016 | Lai et al. | |
| 2016/0373739 A1 | 12/2016 | Holcomb et al. | |
| 2017/0180737 A1 | 6/2017 | Ye et al. | |
| 2017/0237991 A1 | 8/2017 | Jiang et al. | |
| 2018/0014017 A1 | 1/2018 | Li et al. | |
| 2018/0124392 A1 | 5/2018 | Gamei et al. | |
| 2018/0352226 A1 | 12/2018 | An et al. | |
| 2019/0052909 A1 | 2/2019 | Cho et al. | |
| 2021/0306654 A1 | 9/2021 | Lee | |
| 2021/0385439 A1 | 12/2021 | Zhu et al. | |
| 2022/0014775 A1 | 1/2022 | Lee | |
| 2022/0078424 A1 | 3/2022 | Zhang et al. | |
| 2022/0141465 A1 | 5/2022 | Ko et al. | |

FOREIGN PATENT DOCUMENTS

| | | |
|---|---|---|
| CN | 103634608 A | 3/2014 |
| CN | 104509113 A | 4/2015 |
| CN | 104704838 A | 6/2015 |
| CN | 106464901 A | 2/2017 |
| CN | 106797476 A | 5/2017 |
| CN | 107637077 A | 1/2018 |
| CN | 108712649 A | 10/2018 |
| WO | 2013166395 A2 | 11/2013 |
| WO | 2013192164 A2 | 12/2013 |
| WO | 2016057701 A1 | 4/2014 |
| WO | 2014197691 A1 | 12/2014 |
| WO | 2015043501 A1 | 4/2015 |
| WO | 2016197314 A1 | 12/2016 |
| WO | 2020228578 A1 | 11/2020 |

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0368, 2018.

De-Luxian-Hernandez et al. "CE3: Intra Sub-Partitions Coding Mode (Tests 1.1.1 and 1.1.2)," oint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.

Choi et al. "CE8-related : Transform Skip Restriction," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0430, 2019.

Clare et al. "CE8: BDPCM with Harmonized Residual Coding and CCB Limitation (CE8-3.1a, CE8-3.1b, CE8-5.1a, CE8-5.1b)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0214, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Karczewicz et al. "CE8-Related: Quantized Residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0413, 2019.

Koo et al. "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0133, 2018.

Koo et al. "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0193, 2019.

Liao et al. "CE10.3.1.b: Triangular Prediction Unit Mode," Joint Video Exploration Team (JVET) of ITU-T SG 16 WP 3 and ISO/IEC JTC 1/SC 29/WG 11 12th Meeting: Macao, CN, Oct. 3-12, 2018, document JVET-L0124, 2018.

Lu et al. "CE12: Mapping Functions (Test CE12-1 and CE12-2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0427, 2019.

Pfaff et al. "CE3: Affine Linear Weighted Intra Prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217, 2019.

Pu et al. "CE12-4: SDR In-loop Reshaping," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0246, 2018.

Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, document JCTVC-Y1002, 2016.

Salehifar et al. "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0099, 2018.

Yoo et al. "Non-CE6 : On Transform Skip Conditions," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0275, 2019.

JEM-7.0: https://jvet.hhi.fraunhofer.de/svn/svn_HMJEMSoftware/tags/ HM-16.6-JEM-7.0.

International Search Report and Written Opinion from International Patent Application No. PCT/CN2020/089934 dated Aug. 3, 2020 (10 pages).

(56) References Cited

OTHER PUBLICATIONS

International Search Report and Written Opinion from International Patent Application No. PCT/CN2020/089936 dated Aug. 12, 2020 (11 pages).
International Search Report and Written Opinion from International Patent Application No. PCT/CN2020/089938 dated Aug. 14, 2020 (12 pages).
International Search Report and Written Opinion from International Patent Application No. PCT/CN2020/091543 dated Jul. 29, 2020 (10 pages).
Non Final Office Action from U.S. Appl. No. 17/529,533 dated Feb. 9, 2022.
Final Office Action from U.S. Appl. No. 17/529,533 dated May 27, 2022.
Chen et al. "Algorithm Description fofr Versatile Video Coding and Test Model 6 (VTM 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2002, 2019. (cited in EP20806621.7 EESR mailed Apr. 29, 2022).
Extended European Search Report from European Patent Application 20806621.7 dated Apr. 29, 2022 (11 pages).
Examination Report from Indian Patent Application 202127053717 dated Jun. 30, 2022 (6 pages).

\* cited by examiner

2100

2102 Performing a conversion between a video comprising multiple color components and a bitstream representation of the video, where the bitstream representation conforms to a rule that specifies that one or more syntax elements are included in the bitstream representation for two color components to indicate whether a transquant bypass mode is applicable for representing video blocks of the two color components in the bitstream representation, and where, when the transquant bypass mode is applicable to a video block, the video block is represented in the bitstream representation without use of a transform and quantization process or the video block is obtained from the bitstream representation without use of an inverse transform and inverse quantization process

Performing a conversion between a current video block of a video and a bitstream representation of the video, wherein the current video block is coded in the bitstream representation using a quantized residual block differential pulse-code modulation (QR-BDPCM) mode in which a difference between a quantized residual of an intra prediction of the current video block and a prediction of the quantized residual is represented in the bitstream representation, wherein the bitstream representation conforms to a format rule that specifies whether the bitstream representation includes a side information of QR-BDPCM mode and/or a syntax element indicating applicability of a transform skip (TS) mode to the current video block, and wherein the side information includes at least one of an indication of usage of the QR-BDPCM mode or a prediction direction of the QR-BDPCM mode

2902 — Performing a conversion between a current video block of a video and the bitstream representation of the video, wherein the bitstream representation conforms to a format rule that specifies whether the bitstream representation includes a syntax element that indicates whether the current video block is coded using a transquant bypass mode, and wherein, when the transquant bypass mode is applicable to the current video block, the current video block is represented in the bitstream representation without use of a transform and quantization process

Performing a conversion between a current video block of a video and a bitstream representation of the video, wherein the bitstream representation includes a syntax element that indicates whether a transquant bypass mode is applicable for representing the current video block, wherein, when the transquant bypass mode is applicable to the current video block, the current video block is represented in the bitstream representation without use of a transform and quantization process, wherein the transquant bypass mode is applicable at a first video unit level for the current video block, and wherein the bitstream representation excludes a signaling of the transquant bypass mode at a second video unit level in which video blocks of the current video block that are smaller than that at the first video unit level ⟵ 3502

Performing a conversion between a current video block of a video and a bitstream representation of the video, wherein the bitstream representation includes a syntax element that indicates whether a transquant bypass mode is applicable for representing the current video block, wherein, when the transquant bypass mode is applicable to the current video block, the current video block is represented in the bitstream representation without use of a transform and quantization process, wherein the transquant bypass mode is applicable at a first video unit level for the current video block, and wherein the bitstream representation includes a side information of a usage of the transquant bypass mode at a second video unit level of the current video block

FIG. 36

BLOCK DIMENSION SETTINGS OF TRANSFORM SKIP MODE

CROSS REFERENCE TO RELATED APPLICATIONS

This application is a continuation of International Patent Application No. PCT/CN2020/089936, filed on May 13, 2020, which claims the priority to and benefits of International Patent Applications PCT/CN2019/086656, filed on May 13, 2019 and PCT/CN2019/107144, filed on Sep. 21, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to lossless coding for visual media coding. The described methods may be applied to both the existing video coding standards (e.g., High Efficiency Video Coding (HEVC)) and future video coding standards or video codecs.

In a representative aspect, the disclosed technology may be used to provide a method for video processing. This method includes performing a conversion between a video comprising multiple color components and a bitstream representation of the video, wherein the bitstream representation conforms to a rule that specifies that one or more syntax elements are included in the bitstream representation for two color components to indicate whether a transquant bypass mode is applicable for representing video blocks of the two color components in the bitstream representation, and wherein, when the transquant bypass mode is applicable to a video block, the video block is represented in the bitstream representation without use of a transform and quantization process or the video block is obtained from the bitstream representation without use of an inverse transform and inverse quantization process.

In another representative aspect, the disclosed technology may be used to provide a method for video processing. This method includes determining, based on a characteristic of a current video block of a video, whether a transquant bypass mode is applicable to the current video block, where, when the transquant bypass mode is applicable to the current video block, the current video block is represented in the bitstream representation without use of a transform and quantization process or the current block is obtained from the bitstream representation without use of an inverse transform and inverse quantization process; and performing, based on the determining, a conversion between the current video block and a bitstream representation of the video.

In another representative aspect, the disclosed technology may be used to provide a method for video processing. This method includes determining, based on a current video block of a video satisfying a dimension constraint, that two or more coding modes are enabled for representing the current video block in a bitstream representation, wherein the dimension constraint states that a same set of allowed dimensions for the current video block is disabled for the two or more coding modes, and wherein, for an encoding operation, the two or more coding modes represent the current video block in the bitstream representation without using a transform operation on the current video block, or wherein, for a decoding operation, the two or more coding modes are used to obtain the current video block from the bitstream representation without using an inverse transform operation; and performing a conversion between the current video block and the bitstream representation of the video based on one of the two or more coding modes.

In another representative aspect, the disclosed technology may be used to provide a method for video processing. This method includes determining, based on a current video block of a video satisfying a dimension constraint, that two coding modes are enabled for representing the current video block in a bitstream representation, wherein the dimension constraint states that a same set of allowed dimensions are used for enabling the two coding modes, and wherein, for an encoding operation, the two coding modes represent the current video block in the bitstream representation without using a transform operation on the current video block, or wherein, for a decoding operation, the two coding modes are used to obtain the current video block from the bitstream representation without using an inverse transform operation; and performing a conversion between the current video block and the bitstream representation of the video based on one of the two coding modes.

In another representative aspect, the disclosed technology may be used to provide a method for video processing. This method includes determining, based on a current video block of a video satisfying a dimension constraint, that a coding mode is enabled for representing the current video block in a bitstream representation, wherein, during an encoding operation, the coding mode represents the current video block in the bitstream representation without using a transform operation on the current video block, or wherein, during an decoding operation, the current video block is obtained from the bitstream representation without using an inverse transform operation, and wherein the dimension constraint states that a first maximum transform block size for the current video block for which the transform operation or the inverse transform operation is not applied using the coding mode is different from a second maximum transform block size for the current video block for which the transform operation or the inverse transform operation is applied using another coding modes; and performing a conversion between the current video block and the bitstream representation of the video based on the coding mode.

In another representative aspect, the disclosed technology may be used to provide a method for video processing. This method includes performing a conversion between a current video block of a video and a bitstream representation of the video, wherein the current video block is coded in the bitstream representation using a quantized residual block differential pulse-code modulation (QR-BDPCM) mode in which a difference between a quantized residual of an intra prediction of the current video block and a prediction of the quantized residual is represented in the bitstream representation, wherein the bitstream representation conforms to a format rule that specifies whether the bitstream representation includes a side information of QR-BDPCM mode and/or a syntax element indicating applicability of a transform skip (TS) mode to the current video block, and wherein the side information includes at least one of an indication of usage of the QR-BDPCM mode or a prediction direction of the QR-BDPCM mode.

In another representative aspect, the disclosed technology may be used to provide a method for video processing. This method includes determining that a current video block of a video is coded using a transquant bypass mode in which a transform and quantization process is not applied to the current video block; and performing, based on the determining, a conversion between the current video block and a bitstream representation of the video by disabling a luma mapping with chroma scaling (LMCS) process, wherein the disabling the LMCS process disables a performance of switching between samples a reshaped domain and an original domain for the current video block in case that the current video block is from a luma component, or wherein the disabling the LMCS process disables a scaling of a chroma residual of the current video block in case that the current video block is from a chroma component.

In another representative aspect, the disclosed technology may be used to provide a method for video processing. This method includes performing a first determination whether a current video block of a video is coded using a first coding mode in which a transform operation is not applied to the current video block; performing a second determination whether one or more video blocks of the video are coded using a second coding mode, wherein the one or more video blocks comprise reference samples that are used for the current video block; performing a third determination, based on the first determination and the second determination, whether a third coding mode related to an intra prediction process is applicable to the current video block; and performing, based on the third determination, a conversion between the current video block and a bitstream representation of the video.

In another representative aspect, the disclosed technology may be used to provide a method for video processing. This method includes performing a conversion between a current video block of a video and the bitstream representation of the video, wherein the bitstream representation conforms to a format rule that specifies whether the bitstream representation includes a syntax element that indicates whether the current video block is coded using a transquant bypass mode, and wherein, when the transquant bypass mode is applicable to the current video block, the current video block is represented in the bitstream representation without use of a transform and quantization process.

In another representative aspect, the disclosed technology may be used to provide a method for video processing. This method includes determining that a transquant bypass mode is applicable to a current video block of a video, wherein, in the transquant bypass mode, a transform and quantization process is not used on the current video block; disabling, based on the determining, a filtering method for samples of the current video block; and performing, based on the determining and the disabling, a conversion between the current video block and a bitstream representation of the video.

In another representative aspect, the disclosed technology may be used to provide a method for video processing. This method includes performing a first determination that a transquant bypass mode is applicable to a current video block of a video, wherein, in the transquant bypass mode, a transform and quantization process is not used on the current video block; performing a second determination, in response to the first determination, that a transform selection mode in implicit multiple transform set (MTS) process is not applicable for the current video block; and performing, based on the first determination and the second determination, a conversion between the current video block and a bitstream representation of the video.

In another representative aspect, the disclosed technology may be used to provide a method for video processing. This method includes performing a first determination that a transquant bypass mode is applicable to a current video block of a video, wherein, in the transquant bypass mode, a transform and quantization process is not used on the current video block, wherein the current video block is associated with a chroma component; performing a second determination, in response to the first determination, that samples of the chroma component are not scaled in a Luma Mapping with Chroma Scaling (LMCS) process; and performing, based on the first determination and the second determination, a conversion between the current video block and a bitstream representation of the video.

In another representative aspect, the disclosed technology may be used to provide a method for video processing. This method includes determining that a transquant bypass mode is applicable to a current video block of a video, wherein, in the transquant bypass mode, a transform and quantization process is not used on the current video block; disabling, based on the determining, a Luma Mapping with Chroma Scaling (LMCS) process for a coding unit (CU), a coding tree unit (CTU), a slice, a tile, a tile group, a picture, or a sequence of the current video block; and performing, based on the determining, a conversion between the current video block and a bitstream representation of the video by disabling a Luma Mapping with Chroma Scaling (LMCS) process for a coding unit (CU), a coding tree unit (CTU), a slice, a tile, a tile group, a picture, or a sequence of the current video block, wherein the disabling the LMCS process disables performance of switching between samples in a reshaped domain and an original domain for the current video block in case that the current video block is from a luma component, or wherein the disabling the LMCS process disables a scaling of a chroma residual of the current video block in case that the current video block is from a chroma component.

In another representative aspect, the disclosed technology may be used to provide a method for video processing. This method includes performing a first determination whether a current video block of a video is coded using a mode in which an identity transform or no transform is applied to the current video block; performing a second determination, based on the first determination, whether to apply a coding tool to the current video block; and performing, based on the first determination and the second determination, a conversion between the current video block and a bitstream representation of the video.

In another representative aspect, the disclosed technology may be used to provide a method for video processing. This method includes performing a conversion between a current video block of a video and a bitstream representation of the video, wherein the bitstream representation includes a syntax element that indicates whether a transquant bypass mode is applicable for representing the current video block, wherein, when the transquant bypass mode is applicable to the current video block, the current video block is represented in the bitstream representation without use of a transform and quantization process, wherein the transquant bypass mode is applicable at a first video unit level for the current video block, and wherein the bitstream representation excludes a signaling of the transquant bypass mode at a second video unit level in which video blocks of the current video block that are smaller than that at the first video unit level.

In another representative aspect, the disclosed technology may be used to provide a method for video processing. This method includes performing a conversion between a current video block of a video and a bitstream representation of the video, wherein the bitstream representation includes a syntax element that indicates whether a transquant bypass mode is applicable for representing the current video block, wherein, when the transquant bypass mode is applicable to the current video block, the current video block is represented in the bitstream representation without use of a transform and quantization process, wherein the transquant bypass mode is applicable at a first video unit level for the current video block, and wherein the bitstream representation includes a side information of a usage of the transquant bypass mode at a second video unit level of the current video block.

In another representative aspect, the disclosed technology may be used to provide a method for video processing. This method includes determining, for a current video block of a video, whether a mode is applicable in which a lossless coding technique is applied to the current video block; and performing, based on the determining, a conversion between the current video block and a bitstream representation of the video, wherein the bitstream representation includes a syntax element that indicates whether a coding tool is applicable at a video unit level of the current video block, wherein the video unit level is larger than a coding unit (CU), and wherein the coding tool is not applied to samples within the video unit level.

In another representative aspect, the disclosed technology may be used to provide a method for video processing. This method includes determining, for a current video block of a video, whether one or more syntax elements that indicate whether non-discrete cosine transform II (DCT2) transforms are allowed for intra subblock partitioning (ISP) mode or sub-block transform (SBT) mode are included in a bitstream representation for the current video block; and performing, based on the determining, a conversion between the current video block and the bitstream representation of the video.

In another representative aspect, the disclosed technology may be used to provide a method for video processing. This method includes configuring, for a current video block comprising a plurality of color components, a bitstream representation of the current video block, wherein an indication of skipping a transform and quantization process is signaled separately in the bitstream representation for at least two color components of the plurality of color components, and performing, based on the configuring, a conversion between the current video block and the bitstream representation of the current video block.

In another representative aspect, the disclosed technology may be used to provide a method for video processing. This method includes making a decision, based on a characteristic of a current video block, regarding an enablement of a mode that skips an application of a transform and quantization process on the current video block, and performing, based on the decision, a conversion between the current video block and a bitstream representation of the current video block.

In yet another representative aspect, the disclosed technology may be used to provide a method for video processing. This method includes making a decision, based on at least one dimension of a current video block, regarding an enablement of a first mode that skips an application of a transform and quantization process on the current video block and a second mode that does not apply a transform to the current video block, and performing, based on the decision, a conversion between the current video block and a bitstream representation of the current video block.

In yet another representative aspect, the disclosed technology may be used to provide a method for video processing. This method includes determining that a current video block is coded using a first mode and a second mode that skips an application of a transform and quantization process on the current video block, and performing, based on the determining, a conversion between the current video block and a bitstream representation of the current video block.

In yet another representative aspect, the disclosed technology may be used to provide a method for video processing. This method includes configuring, for a current video block, a bitstream representation of the current video block, wherein an indication of skipping a transform and quantization process is signaled in the bitstream representation before signaling syntax elements related to one or more multiple transform related coding tools, and performing, based on the configuring, a conversion between the current video block and the bitstream representation of the current video block.

In yet another representative aspect, the disclosed technology may be used to provide a method for video processing. This method includes determining that a current video block is coded using a mode that skips an application of a transform and quantization process on the current video block, and disabling, based on the determining and as part of performing a conversion between the current video block and a bitstream representation of the current video block, a filtering method.

In yet another representative aspect, the disclosed technology may be used to provide a method for video processing. This method includes determining that a current video block is coded using a mode that skips an application of a transform and quantization process on the current video block, and disabling, based on the determining and as part of performing a conversion between the current video block and a bitstream representation of the current video block, an in-loop reshaping (ILR) process for (i) a current picture comprising the current video block or (ii) a portion of the current picture.

In yet another representative aspect, the disclosed technology may be used to provide a method for video processing. This method includes configuring, for a current video block, a bitstream representation of the current video block, wherein an indication of skipping a transform and quantization process is selectively signaled in the bitstream representation after signaling one or more indications of quantization parameters; and performing, based on the configuring, a conversion between the current video block and the bitstream representation of the current video block.

In yet another representative aspect, the disclosed technology may be used to provide a method for video processing. This method includes configuring, for a current video block, a bitstream representation of the current video block, wherein an indication of an application of a coding tool to the current video block is signaled in the bitstream representation at a level of a video unit that is larger than a coding unit (CU); and performing, based on the configuring, a conversion between the current video block and the bitstream representation of the current video block, wherein performing the conversion comprises refraining from applying the coding tool to at least some samples of the current video block despite the indication of the application of the coding tool in the bitstream representation.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIGS. 21-38 show flowcharts of example methods for video processing.

DETAILED DESCRIPTION

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

2 Video Coding Introduction

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Coding Flow of a Typical Video Codec

Figure 1:
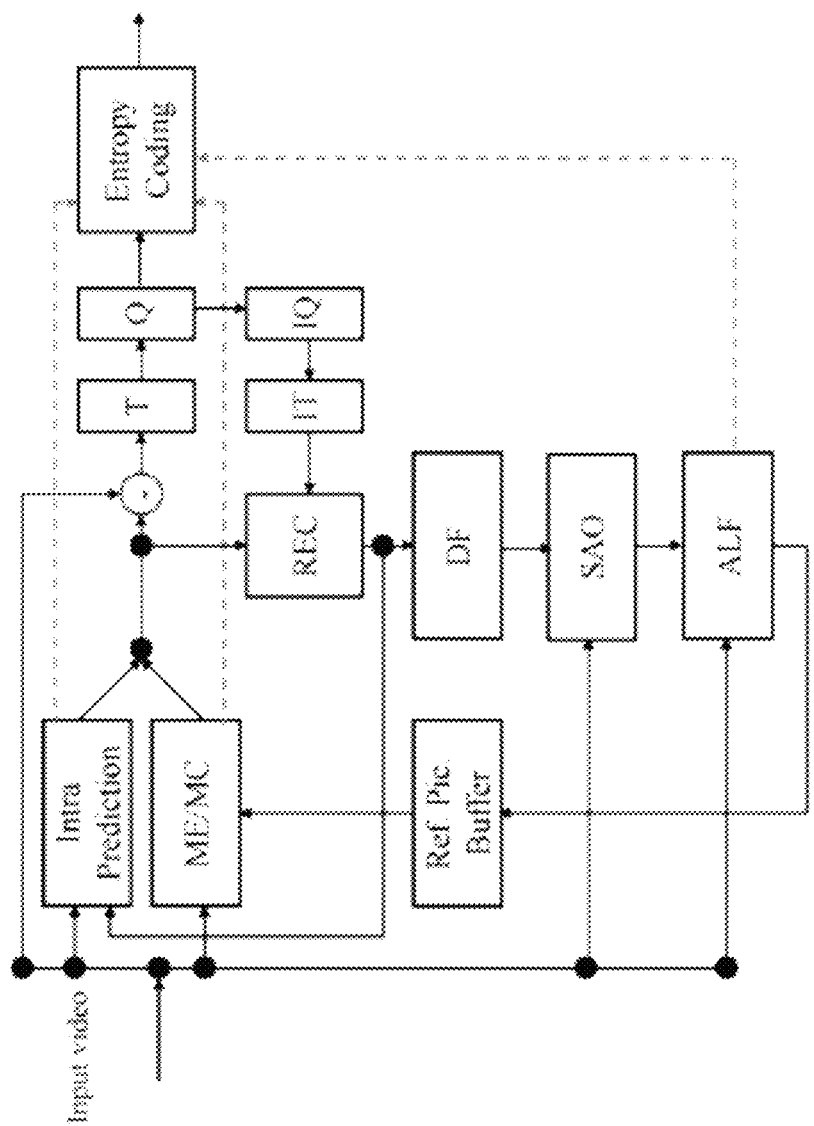
FIG. 1 shows a block diagram of an example encoder.

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2 Intra Mode Coding with 67 Intra Prediction Modes

To capture the arbitrary edge directions presented in natural video, the number of directional intra modes is extended from 33, as used in HEVC, to 65. The additional directional modes are depicted as dotted arrows in FIG. 2, and the planar and DC modes remain the same. These denser directional intra prediction modes apply for all block sizes and for both luma and chroma intra predictions.

Figure 2:
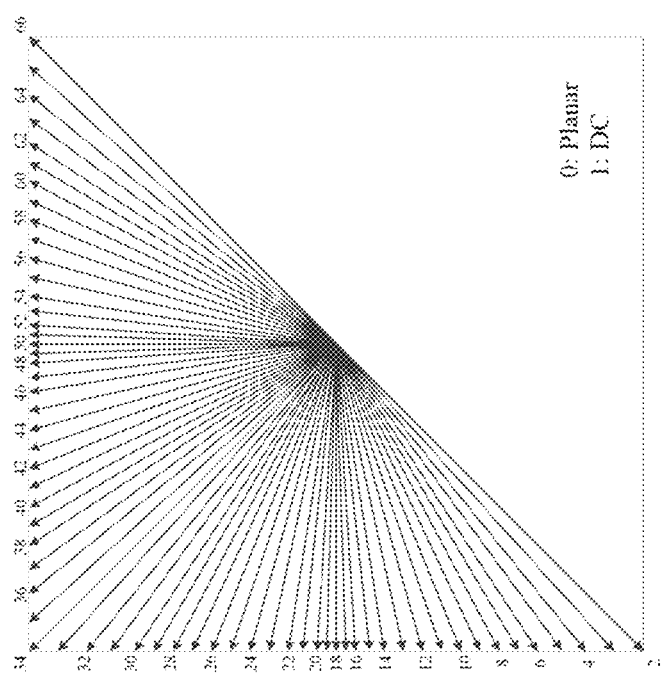
FIG. 2 shows an example of 67 intra prediction modes.
Figure 3B:
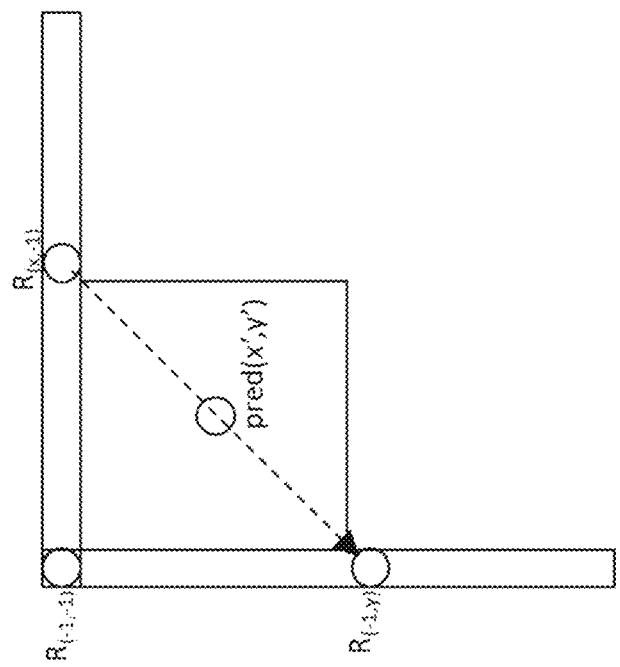
FIGS. 3A-3D show examples of samples used by a position dependent intra prediction combination (PDPC) method applied to diagonal and adjacent angular intra modes.
Figure 3A:
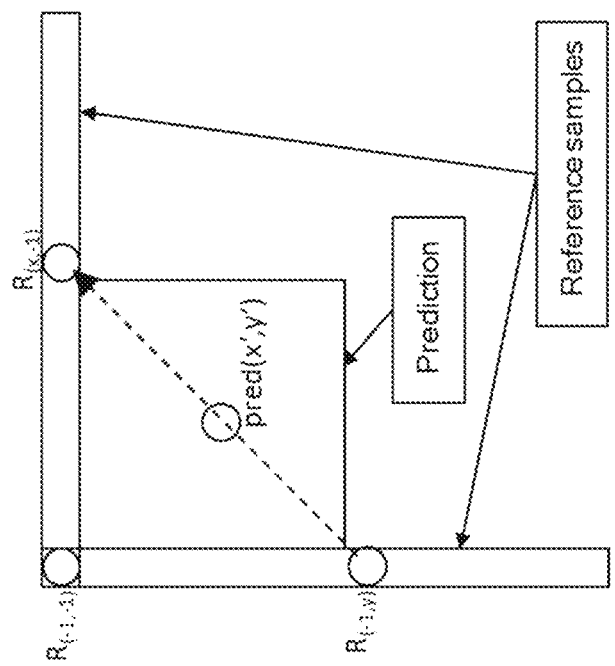
Figure 3D:
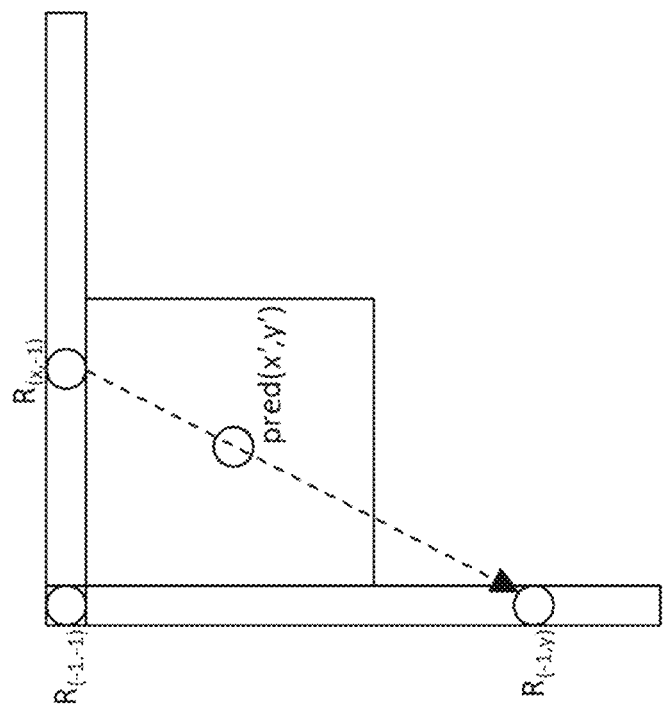
Figure 3C:
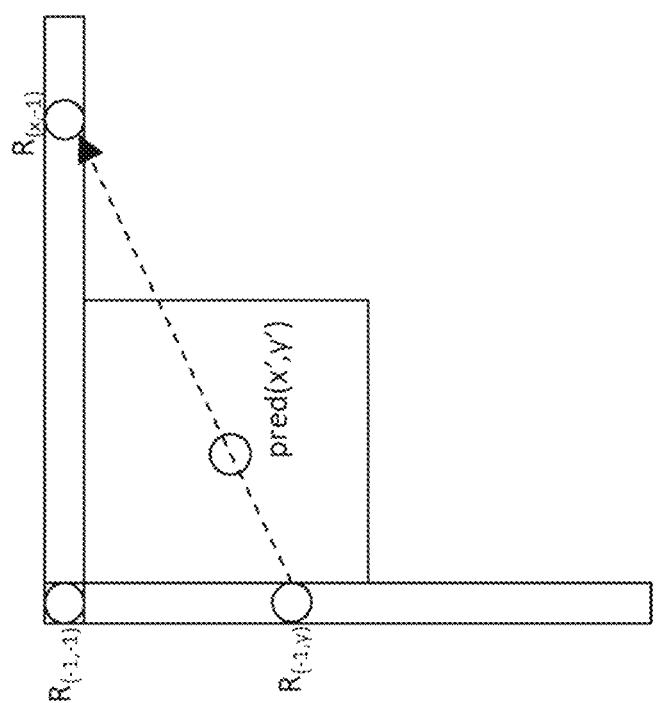

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

2.2.1 Position Dependent Intra Prediction Combination (PDPC)

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y) = (wL \times R_{-1,y} + wT \times R_{x,-1} - wTL \times R_{-1,-1} + (64 - wL - wT + wTL) \times \text{pred}(x,y) + 32) >> 6$$

Herein, $R_{x,-1}$, $R_{-1,y}$ represent the reference samples located at the top and left of current sample (x,y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

FIGS. 3A-3D illustrate the definition of reference samples ($R_{x,-1}$, $R_{-1,y}$, and $R_{-1,-1}$) for PDPC applied over various prediction modes. The prediction sample pred(x',y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1. The PDPC weights are dependent on prediction modes and are shown in Table 1.

the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in MPM list and only signal MPM index without remaining mode. The reference line index is signaled before intra prediction modes, and Planar and DC modes are excluded from intra prediction modes in case a nonzero reference line index is signaled.

MRL is disabled for the first line of blocks inside a CTU to prevent using extended reference samples outside the current CTU line. Also, PDPC is disabled when additional line is used.

2.4 Intra Subblock Partitioning (ISP)

Figure 5:
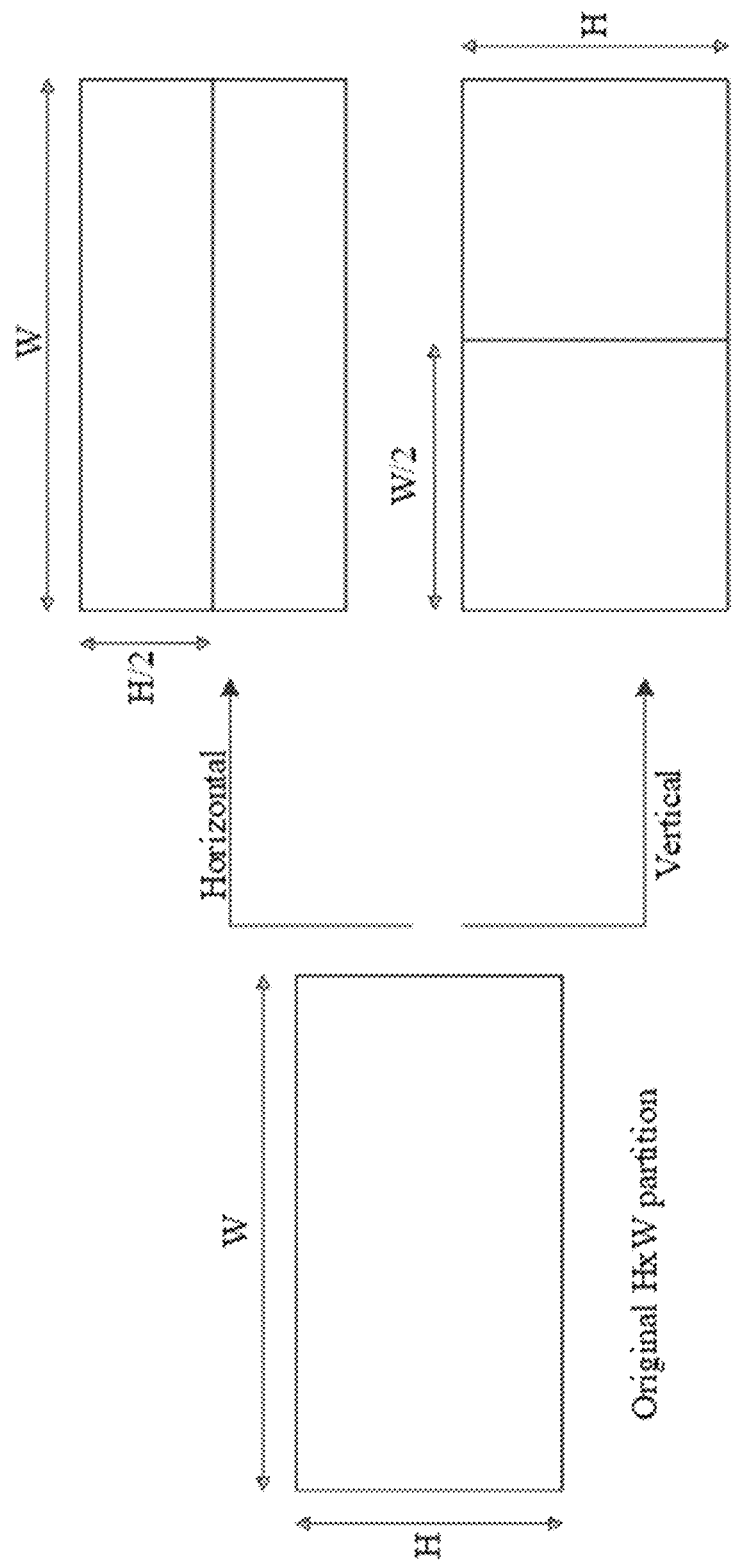
FIG. 5 shows an example of divisions of 4×8 and 8×4 blocks.
Figure 6:
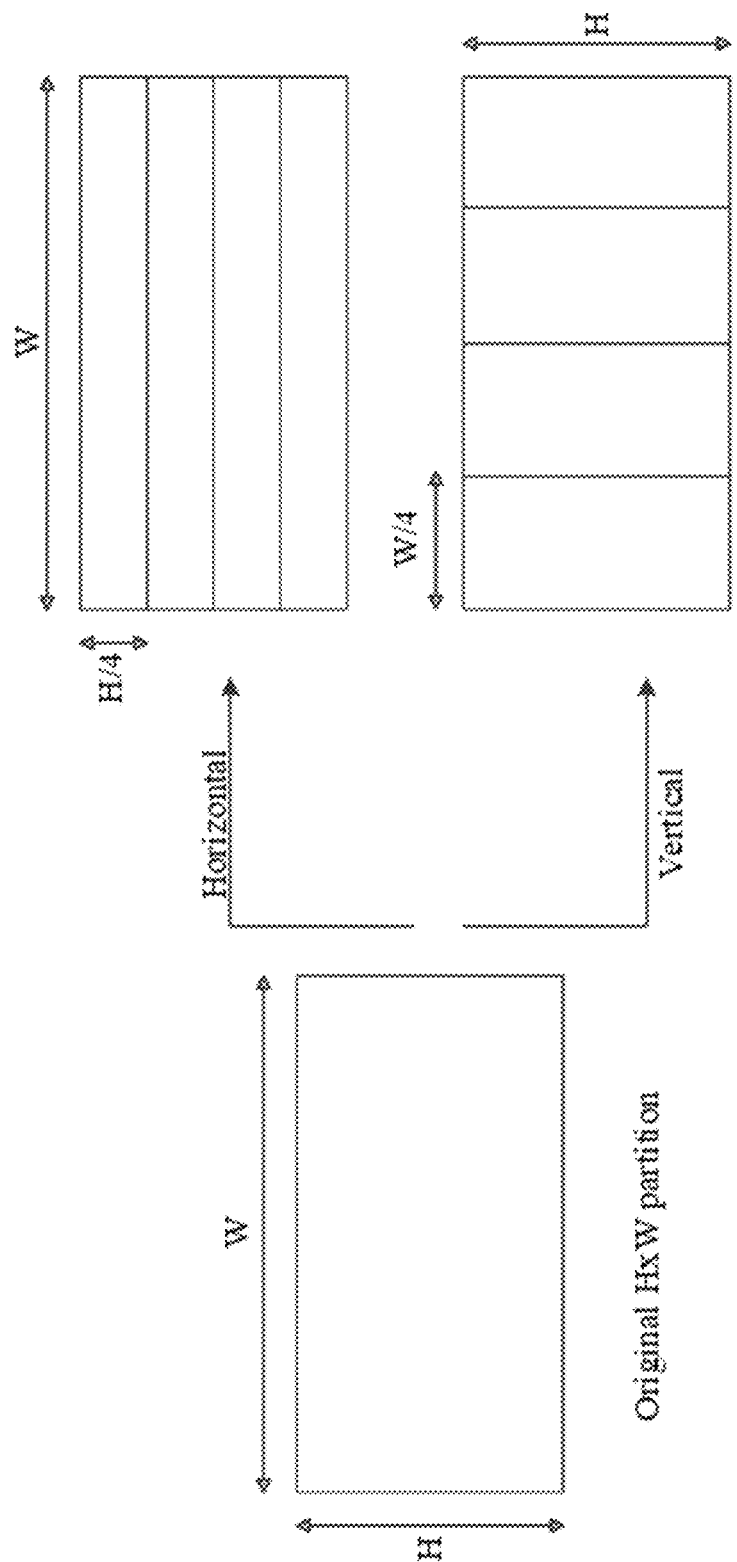
FIG. 6 shows an example of divisions all blocks except 4×8, 8×4 and 4×4.
Figure 7:
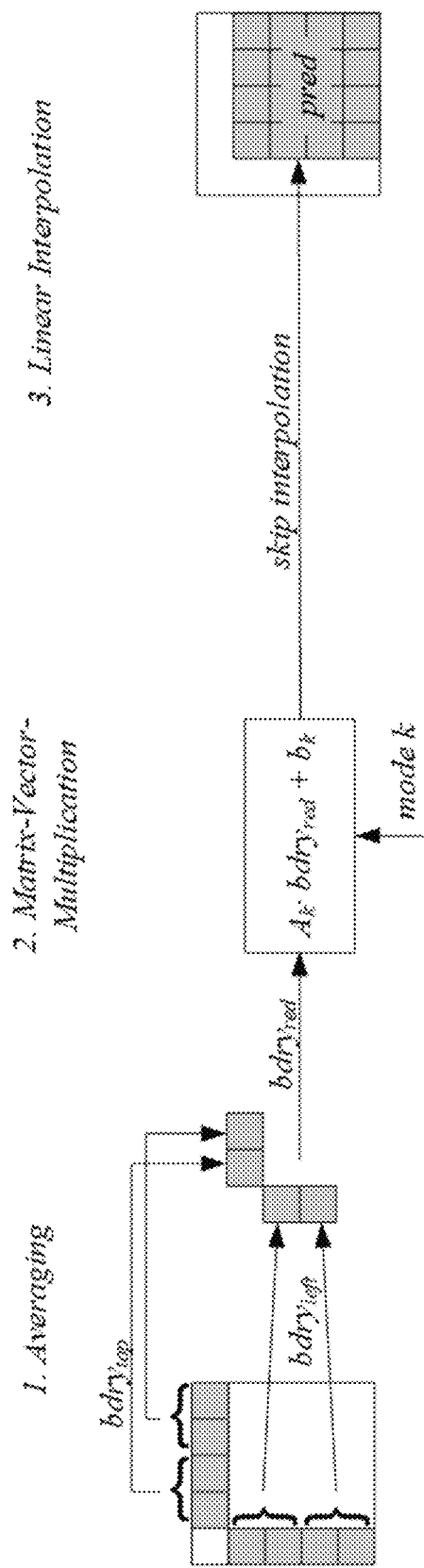
FIG. 7 shows an example of ALWIP for 4×4 blocks.
Figure 8:
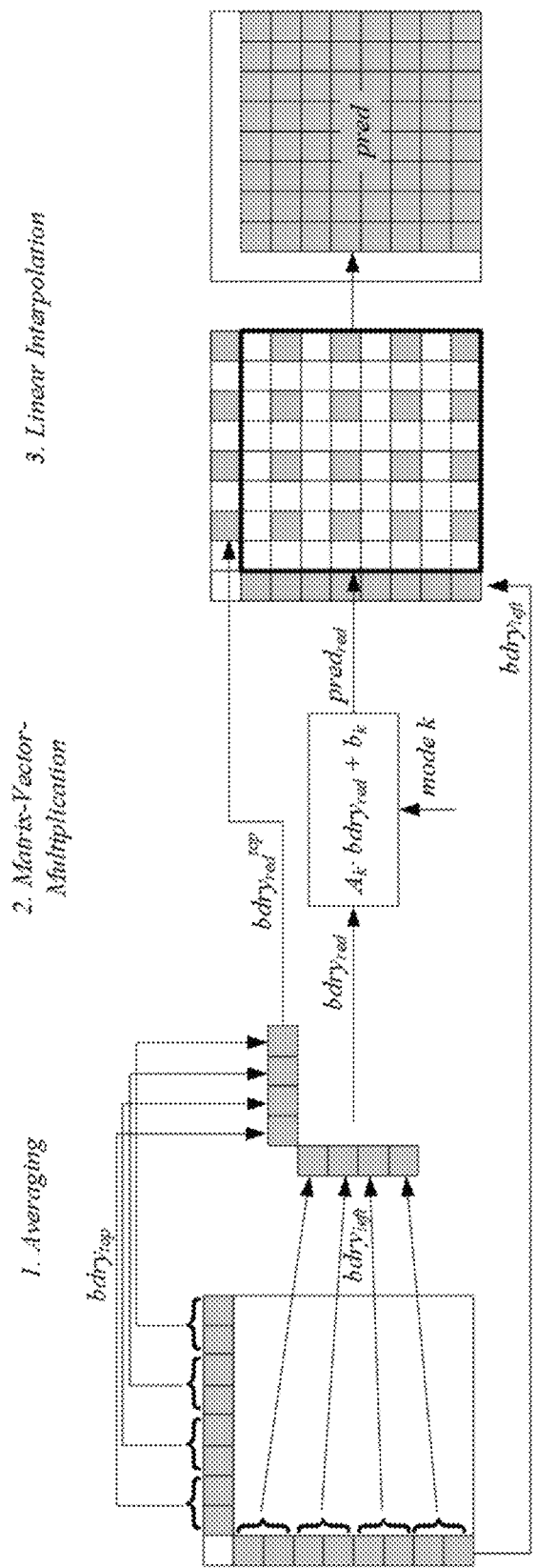
FIG. 8 shows an example of ALWIP for 8×8 blocks.
Figure 9:
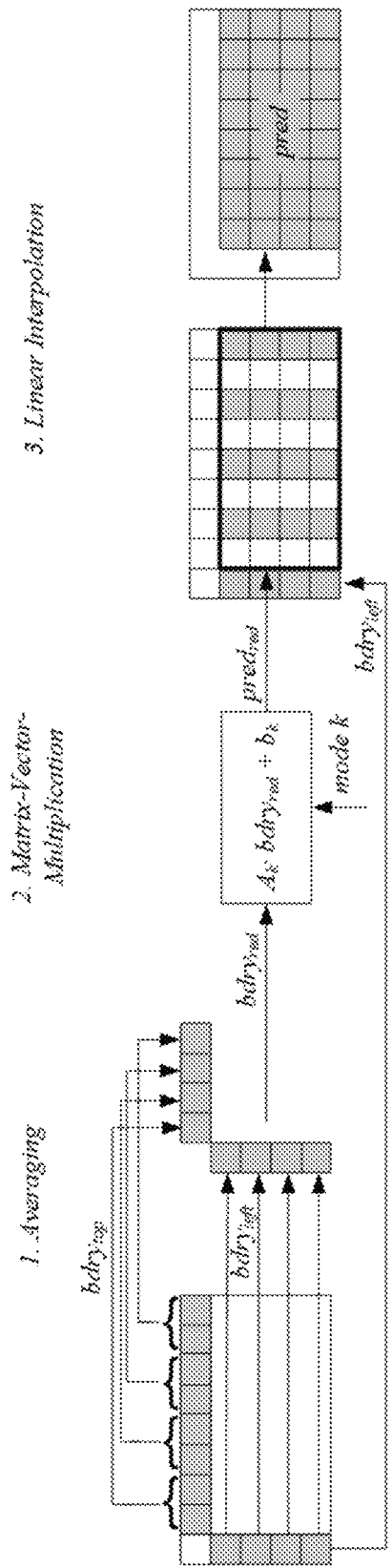
FIG. 9 shows an example of ALWIP for 8×4 blocks.
Figure 10:
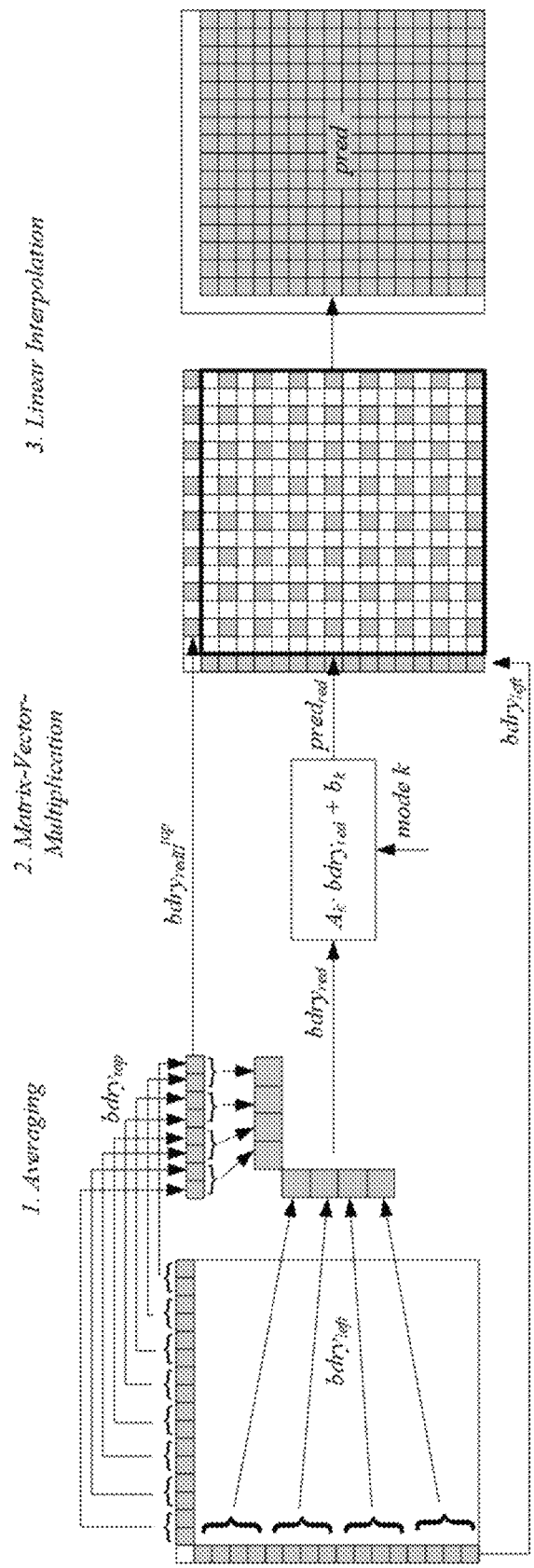
FIG. 10 shows an example of ALWIP for 16×16 blocks.

In JVET-M0102, ISP is proposed, which divides luma intra-predicted blocks vertically or horizontally into 2 or 4 sub-partitions depending on the block size dimensions, as shown in Table 2. FIG. 5 and FIG. 6 show examples of the two possibilities. All sub-partitions fulfill the condition of having at least 16 samples. For block sizes, 4×N or N×4 (with N>8), if allowed, the 1×N or N×1 sub-partition may exist.

TABLE 2

Number of sub-partitions depending on the block size (denoted maximum transform size by maxTBSize)

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTB Size | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the

TABLE 1

Example of PDPC weights according to prediction modes

| Prediction modes | wT | wL | wTL |
|---|---|---|---|
| Diagonal top-right | 16 >> ((y' << 1) >> shift | 16 >> ((x' << 1) >> shift | 0 |
| Diagonal bottom-left | 16 >> ((y' << 1) >> shift | 16 >> ((x' << 1) >> shift | 0 |
| Adjacent diagonal top-right | 32 >> ((y' << 1) >> shift | 0 | 0 |
| Adjacent diagonal bottom-left | 0 | 32 >> ((x' << 1) >> shift | 0 |

2.3 Multiple Reference Line (MRL)

Figure 4:
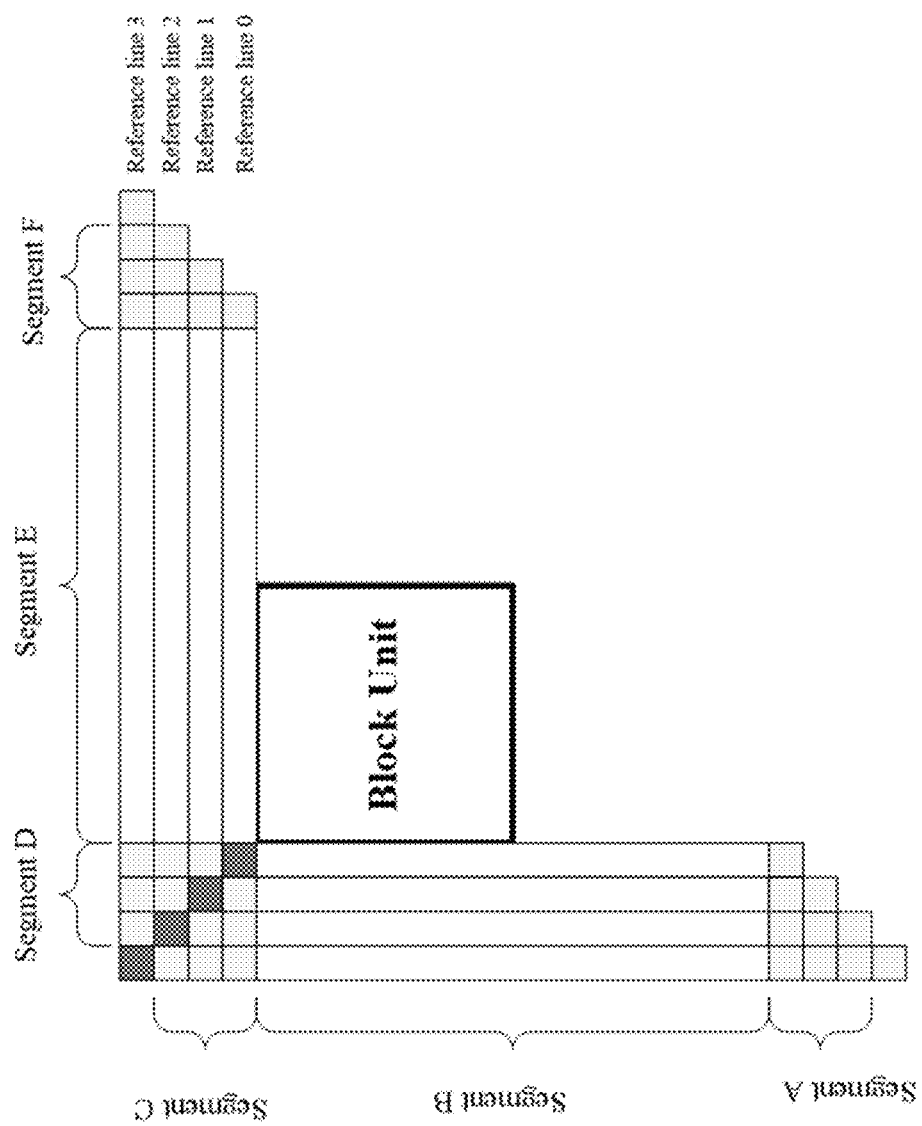
FIG. 4 shows an example of four reference lines neighboring a prediction block.

Multiple reference line (MRL) intra prediction uses more reference lines for intra prediction. In FIG. 4, an example of 4 reference lines is depicted, where the samples of segments A and F are not fetched from reconstructed neighbouring samples but padded with the closest samples from Segment B and E, respectively. HEVC intra-picture prediction uses encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 3

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (nTbW >= 4 && nTbW <= 16 ) ? DST-VII:DCT-II | (nTbH >= 4 && nTbH <= 16 ) ? |
| INTRA_ANGULAR33, INTRA_ANGULAR35 | DCT-II | DCT-II |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | (nTbW >= 4 && nTbW <= 16 ) ? DST-VII:DCT-II | DCT-II |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | DCT-II | (nTbH >= 4 && nTbH <= 16 ) ? DST-VII:DCT-II |

2.5 Affine Linear Weighted Ultra Prediction (ALWIP or Matrix-Based Intra Prediction)

Affine linear weighted intra prediction (ALWIP, a.k.a. Matrix based intra prediction (MIP)) is proposed in JVET-N0217.

2.5.1 Generation of the Reduced Prediction Signal by Matrix Vector Multiplication The neighboring reference samples are firstly downsampled via averaging to generate the reduced reference signal $bdry_{red}$. Then, the reduced prediction signal $pred_{red}$ is computed by calculating a matrix vector product and adding an offset:

$$pred_{red} = A \cdot bdry_{red} + b$$

Here, A is a matrix that has $W_{red} \cdot H_{red}$ rows and 4 columns if W=H=4 and 8 columns in all other cases. b is a vector of size $W_{red} \cdot H_{red}$.

2.5.2 Illustration of the Entire ALWIP Process

The entire process of averaging, matrix vector multiplication and linear interpolation is illustrated for different shapes in FIGS. 7-10. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical positions.

Finally for W×4 blocks with W>8, let A_kbe the matrix that arises by leaving out every row that corresponds to an odd entry along the horizontal axis of the downsampled block. Thus, the output size is 32 and again, only horizontal interpolation remains to be performed.

The transposed cases are treated accordingly.

2.6 Multiple Transform Set (MTS) in VVC
2.6.1 Explicit Multiple Transform Set (MTS)

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to DCT-II which has been employed in HEVC, a Multiple Transform Selection (MTS) scheme is used for residual coding both inter and intra coded blocks. It uses multiple selected transforms from the DCT8/DST7. The newly introduced transform matrices are DST-VII and DCT-VIII. The Table 4 below shows the basis functions of the selected DST/DCT.

TABLE 4

Basis functions of transform matrices used in VVC

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at SPS level for intra and inter, respectively. When MTS is enabled at SPS, a CU level flag is signalled to indicate whether MTS is applied or not. Here, MTS is applied only for luma. The MTS CU level flag is signalled when the following conditions are satisfied.

Both width and height smaller than or equal to 32
CBF flag is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 5

Mapping of decoded value of tu_mts_idx and corresponding transform matrices for the horizontal and vertical directions.

| Bin string of tu_mts_idx | tu_mts_idx | Intra/inter Horizontal | Vertical |
|---|---|---|---|
| 0 | 0 | DCT2 | DCT2 |
| 1 0 | 1 | DST7 | DST7 |

TABLE 5-continued

Mapping of decoded value of tu_mts_idx and corresponding transform matrices for the horizontal and vertical directions.

| Bin string of tu_mts_idx | tu_mts_idx | Intra/inter Horizontal | Vertical |
|---|---|---|---|
| 1 1 0 | 2 | DCT8 | DST7 |
| 1 1 1 0 | 3 | DST7 | DCT8 |
| 1 1 1 1 | 4 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case of MTS.

2.6.1.1 Syntax and Semantics

MTS index may be signaled in the bitstream and such a design is called explicit MTS. In addition, an alternative way which directly derive the matrix according to transform block sizes is also supported, as implicit MTS.

For the explicit MTS, it supports all coded modes. While for the implicit MTS, only intra mode is supported.

7.3.2.4 Picture Parameter Set RBSP Syntax

| | Descriptor |
|---|---|
| pic_parameter_set_rbsp( ) { | |
|   pps_pic_parameter_set_id | ue(v) |
|   pps_seq_parameter_set_id | ue(v) |
|   output_flag_present_flag | u(1) |
|   single_tile_in_pic_flag | u(1) |
|   ... | |
|   init_qp_minus26 | se(v) |
|   transform_skip_enabled_flag | u(1) |
|   if( transform_skip_enabled_flag) | |
|     log2_transform_skip_max_size_minus2 | ue(v) |
|   cu_qp_delta_enabled_flag | u(1) |
|   if( cu_qp_delta_enabled_flag) | |
|     cu_qp_delta_subdiv | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se (v) |
|       pps_tc_offset_div2 | se (v) |
|     } | |
|   } | |
|   pps_loop_filter_across_virtual_boundaries_disabled_flag | u(1) |
|   if( pps_loop_filter_across_virtual_boundaries_disabled_flag ) { | |
|     pps_num_ver_virtual_boundaries | u(2) |
|     for( i = 0; i < pps_num_ver_virtual_boundaries; i++) | |
|       pps_virtual_boundaries_pos_x[ i ] | u(v) |
|     pps_num_hor_virtual_boundaries | u(2) |
|     for( i = 0; i < pps_num_hor_virtual_boundaries; i++) | |

|  | Descriptor |
|---|---|
| pps_virtual_boundaries_pos_y[ i ] | u(v) |
| } | |
| pps_extension_flag | u(1) |
| if( pps_extension_flag ) | |
| while( more_rbsp_data( )) | |
| pps_extension_data_flag | u(1) |
| rbsp_trailing_bits( ) | |
| } | |

7.3.7.10 Transform Unit Syntax

|  | Descriptor |
|---|---|
| transform_unit( x0, y0, tbWidth, tbHeight, treeType, subTuIndex ) { | |
| ... | |
| if( ( tu_cbf_luma[ x0 ][ y0 ] \|\| tu_cbf_cb[ x0 ][ y0 ] \|\| tu_cbf_cr[ x0 ][ y0 ]) && | |
|  treeType != DUAL_TREE_CHROMA ) { | |
|  if( cu_qp_delta_enabled_flag && !IsCuQpDeltaCoded ) { | |
|   cu_qp_delta abs | ae(v) |
|   if( cu_qp_delta_abs ) | |
|    cu_qp_delta sign_flag | ae(v) |
|  } | |
| } | |
| if( tu_cbf_luma[ x0 ][ y0 ] && treeType != DUAL_TREE_CHROMA | |
|  && ( tbWidth <= 32) && ( tbHeight <= 32) | |
|  && ( IntraSubPartitionsSplit[ x0 ][ y0 ] == ISP_NO_SPLIT ) && ( !cu_sbt_flag) ) { | |
|  if( transform_skip_enabled_flag && tbWidth <= MaxTsSize && tbHeight <= MaxTsSize ) | |
|   transform_skip_flag[ x0 ][ y0 ] | ae(v) |
|  if( (( CuPredMode[ x0 ][ y0 ] != MODE_INTRA&& sps_explicit_mts_inter_enabled_flag) | |
|   \|\| ( CuPredMode[ x0 ][ y0 ] == MODE_INTRA&& sps_explicit_mts_intra_enabled_flag)) | |
|   && ( tbWidth <= 32) && ( tbHeight <= 32) && ( !transform_skip_flag[ x0 ][ y0 ] ) ) | |
|   tu_mts_idx[ x0 ][ y0 ] | ae(v) |
| } | |
| if( tu_cbf_luma[ x0 ][ y0 ]) | |
|  residual_coding( x0, y0, Log2(tbWidth), Log2(tbHeight), 0) | |
| if( tu_cbf_cb[ x0 ][ y0 ]) | |
|  residual_coding( xC, yC, Log2( wC ), Log2( hC ), 1) | |
| if( tu_cbf_cr[ x0 ][ y0 ]) | |
|  residual_coding( xC, yC, Log2( wC ), Log2( hC ), 2) | |
| } | |

TABLE 9-15

Assignment of ctxInc to syntax elements with context coded bins

| Syntax element | binIdx | | | | | |
|---|---|---|---|---|---|---|
|  | 0 | 1 | 2 | 3 | 4 | >=5 |
| transform_skip_flag[ ][ ] | 0 | na | na | na | na | na |
| tu_mts_idx[ ][ ] | cqtDepth | 6 | 7 | 8 | na | na | transform_skip_flag[x0][y0] specifies whether a transform is applied to the luma transform block or not. The array indices x0,y0 specify the location (x0,y0) of the top-left luma sample of the considered transform block relative to the top-left luma sample of the picture. transform_skip_flag [x0][y0] equal to 1 specifies that no transform is applied to the luma transform block. transform_skip_flag[x0][y0] equal to 0 specifies that the decision whether transform is applied to the luma transform block or not depends on other syntax elements. When transform_skip_flag[x0][y0] is not present, it is inferred to be equal to 0.

tu_mts_idx[x0][y0] specifies which transform kernels are applied to the residual samples along the horizontal and vertical direction of the associated luma transform block. The array indices x0, y0 specify the location (x0, y0) of the top-left luma sample of the considered transform block relative to the top-left luma sample of the picture.

When tu_mts_idx[x0][y0] is not present, it is inferred to be equal to 0.

In the CABAC decoding process, one context is used to decode transform_skip_flag, truncated unary is used to binarize the tu_mts_idx. Each bin of the tu_mts_idx is context coded, for the first bin, the quad-tree depth (i.e., cqtDepth) is used to select one context; and for the remaining bins, one context is used.

2.6.2 Implicit Multiple Transform Set (MTS)

It is noted that ISP, SBT, and MTS enabled but with implicit signaling are all treated as implicit MTS. In the specification, the implicitMtsEnabled is used to define whether implicit MTS is enabled.

8.7.4 Transformation Process for Scaled Transform Coefficients 8.7.4.1 General

The variable implicitMtsEnabled is derived as follows:

If sps_mts_enabled_flag is equal to 1 and one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32 sps_explicit_mts_intra_enabled_flag and sps_explicit_mts_inter_enabled_flag are both equal to 0 and CuPredMode[xTbY][yTbY] is equal to MODE_INTRA Otherwise, implicitMtsEnabled is set equal to 0.

The variable trTypeHor specifying the horizontal transform kernel and the variable trTypeVer specifying the vertical transform kernel are derived as follows:

If cIdx is greater than 0, trTypeHor and trTypeVer are set equal to 0.

Otherwise, if implicitMtsEnabled is equal to 1, the following applies:

If IntraSubPartitionsSplitType is not equal to ISP_NO_SPLIT, trTypeHor and trTypeVer are specified in Table 8-15 depending on intraPredMode.

Otherwise, if cu_sbt_flag is equal to 1, trTypeHor and trTypeVer are specified in Table 8-14 depending on cu_sbt_horizontal_flag and cu_sbt_pos_flag.

Otherwise (sps_explicit_mts_intra_enabled_flag and sps_explicit_mts_inter_enabled_flag are equal to 0), trTypeHor and trTypeVer are derived as follows:

trTypeHor=(nTbW>=4&&
  nTbW<=16&&nTbW<=nTbH)?1:0    (8-1030)

trTypeVer=(nTbH>=4&&nTbH<=16&&nTbH<=
  nTbW)?1:0    (8-1031)

Otherwise, trTypeHor and trTypeVer are specified in Table 8-13 depending on tu_mts_idx[xTbY][yTbY].

TABLE 8-13

Specification of trTypeHor and trTypeVer depending on tu_mts_idx[ x ][ y ]

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

TABLE 8-14

Specification of trTypeHor and trTypeVer depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

2.7 Reduced Secondary Transform (RST) proposed in JVET-N0193

2.7.1 Non-Separable Secondary Transform (NSST) in JEM

Figure 11:
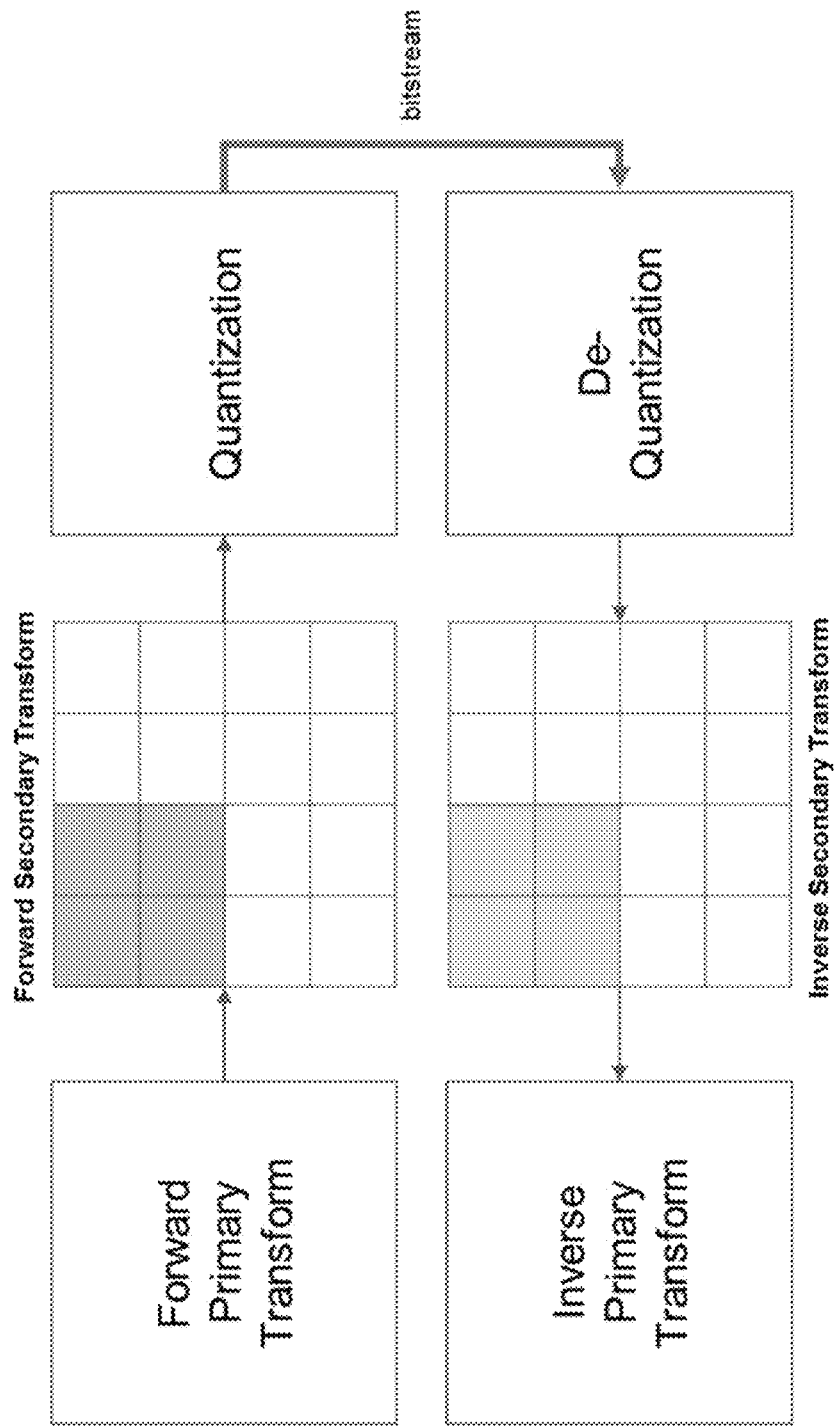
FIG. 11 shows an example of a secondary transform in JEM.

In JEM, secondary transform is applied between forward primary transform and quantization (at encoder) and between de-quantization and invert primary transform (at decoder side). As shown in FIG. 11, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}\, X_{01}\, X_{02}\, X_{03}\, X_{10}\, X_{11}\, X_{12}\, X_{13}\, X_{20}\, X_{21}\, X_{22}\, X_{23}\, X_{30}\, X_{31}\, X_{32}\, X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

2.7.2 Reduced Secondary Transform (RST) in JVET-N0193

Figure 12:
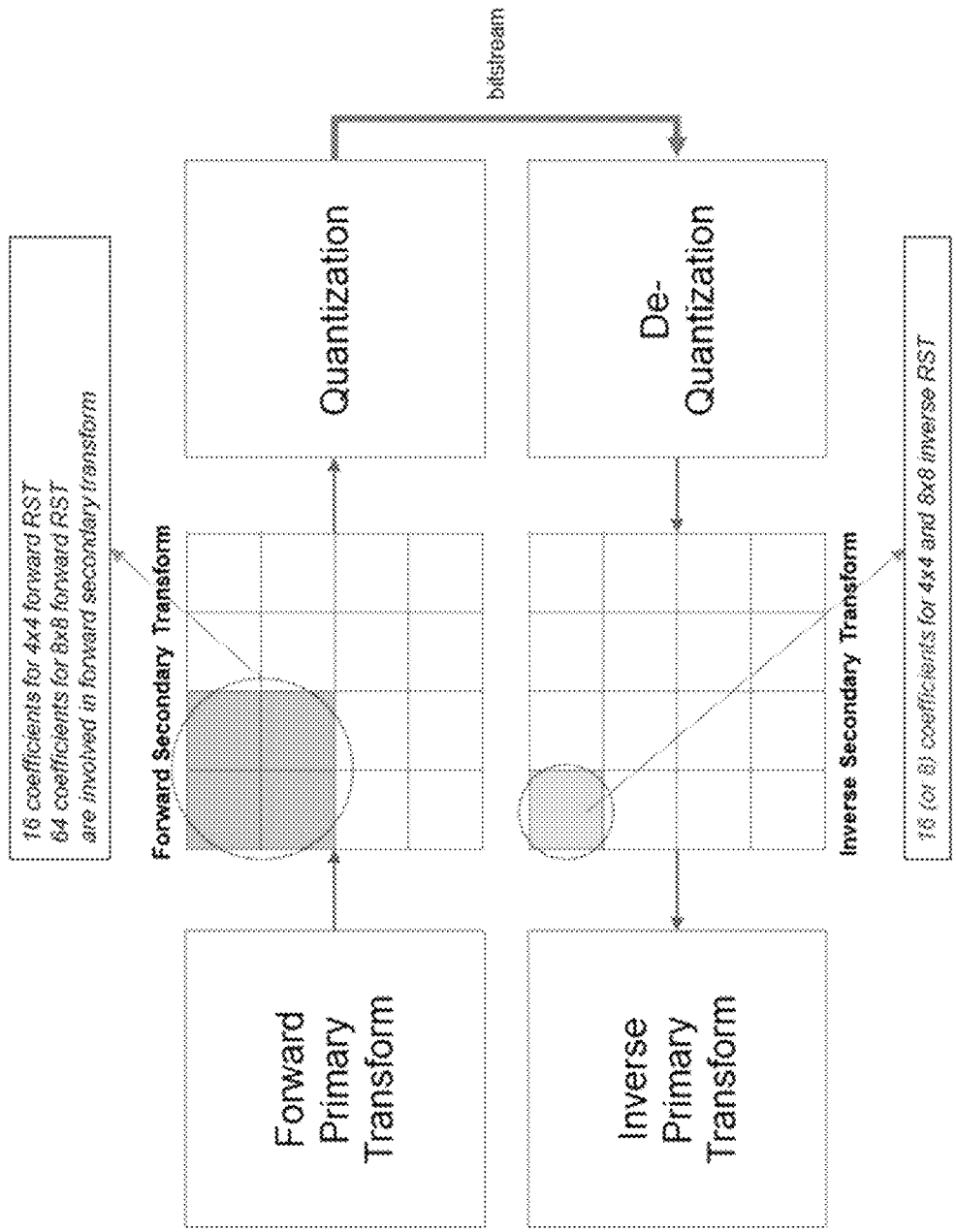
FIG. 12 shows an example of the proposed reduced secondary transform (RST).

The RST (a.k.a. Low Frequency Non-Separable Transform (LFNST)) was introduced in JVET-K0099 and 4 transform set (instead of 35 transform sets) mapping introduced in JVET-L0133. In this JVET-N0193, 16×64 (further reduced to 16×48) and 16×16 matrices are employed. For notational convenience, the 16×64 (reduced to 16×48) transform is denoted as RST8×8 and the 16×16 one as RST4×4. FIG. 12 shows an example of RST.

2.8 Sub-Block Transform

For an inter-predicted CU with cu_cbf equal to 1, cu_sbt_flag may be signaled to indicate whether the whole residual block or a sub-part of the residual block is decoded. In the former case, inter MTS information is further parsed to determine the transform type of the CU. In the latter case, a part of the residual block is coded with inferred adaptive transform and the other part of the residual block is zeroed out. The SBT is not applied to the combined inter-intra mode.

Figure 13:
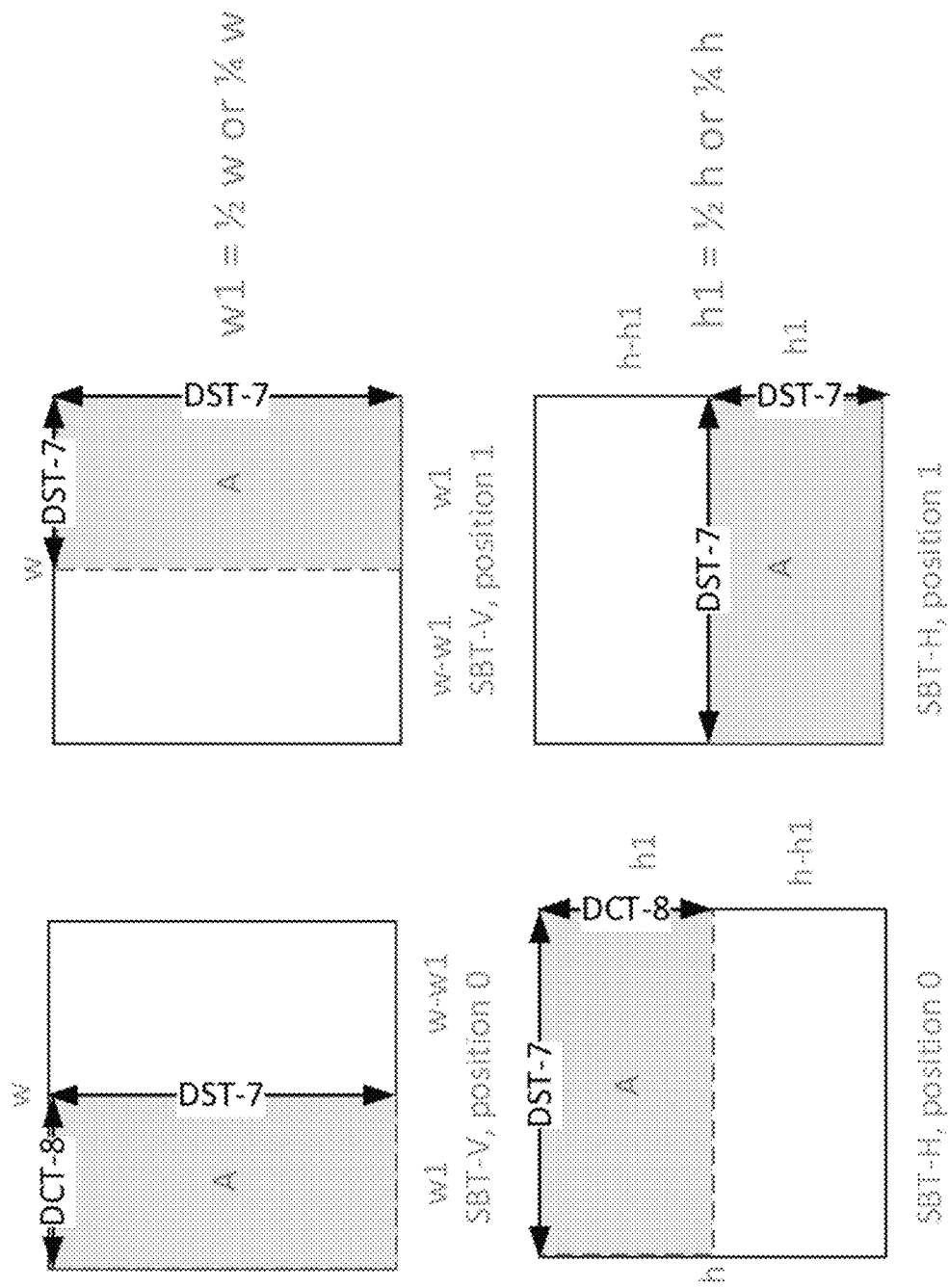
FIG. 13 shows an example of sub-block transform modes SBT-V and SBT-H.

In sub-block transform, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 13. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

2.8.1 Syntax Elements and Semantics
7.3.7.5 Coding Unit Syntax

| | Descriptor |
|---|---|
| coding_unit( x0, y0, cbWidth, cbHeight, treeType) { | |
|   if( slice_type != I \|\| sps_ibc_enabled_flag) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && slice_type != I ) | |
|       pred_mode_flag | ae(v) |
|     if( ( ( slice_type = = I && cu_skip_flag[ x0 ][ y0 ] = =0 ) \|\| | |
|       ( slice_type !=I && CuPredMode[ x0 ][ y0 ] != MODE_INTRA)) && | |
|       sps_ibc_enabled_flag) | |
|       pred_mode_ibc_flag | ae(v) |
|   } | |
|   if( CuPredMode[ x0 ][ y0 ] = = MODE_INTRA) { | |
|   ... | |
|   } else if( treeType != DUAL_TREE_CHROMA) {/* MODE_INTER or MODE_IBC */ | |
|   ... | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] = = 0 ) | |
|       cu_cbf | ae(v) |
|     if( cu_cbf) { | |
|       if( CuPredMode[ x0 ][ y0 ] = = MODE_INTER && sps_sbt_enabled_flag && | |
|         !ciip_flag[ x0 ][ y0 ] ) { | |
|         if( cbWidth <= MaxSbtSize && cbHeight <= MaxSbtSize) { | |
|           allowSbtVerH = cbWidth >= 8 | |
|           allowSbtVerQ = cbWidth >= 16 | |
|           allowSbtHorH = cbHeight >= 8 | |
|           allowSbtHorQ = cbHeight >= 16 | |
|           if( allowSbtVerH \|\| allowSbtHorH \|\| allowSbtVerQ \|\| allowSbtHorQ) | |
|             cu_sbt_flag | ae(v) |
|         } | |
|         if( cu_sbt_flag) { | |
|           if( ( allowSbtVerH \|\| allowSbtHorH) &&( allowSbtVerQ \|\| | |
|             allowSbtHorQ) ) | |
|             cu_sbt_quad_flag | ae(v) |
|           if( ( cu_sbt_quad_flag && allowSbtVerQ&& allowSbtHorQ) \|\| | |
|             ( !cu_sbt_quad_flag && allowSbtVerH&& allowSbtHorH) ) | |
|             cu_sbt_horizontal_flag | ae(v) |
|           cu_sbt_pos_flag | ae(v) |
|         } | |
|       } | |
|       transform_tree( x0, y0, cbWidth, cbHeight, tree Type ) | |
|     } | |
|   } | |
| } | |

7.3.7.11 Residual Coding Syntax

| | Descriptor |
|---|---|
| residual_coding( x0, y0, log2TbWidth, log2TbHeight, cIdx ) { | |
|   if( ( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbWidth > 4 ) | |
|     log2TbWidth = 4 | |
|   else | |
|     log2TbWidth = Min (log2TbWidth, 5 ) | |
|   if( tu_mts_idx[ x0 ][ y0 ] > 0 \|\| | |
|     ( cu_sbt_flag && log2TbWidth < 6 && log2TbHeight < 6 ) ) | |
|     && cIdx = = 0 && log2TbHeight > 4 ) | |
|     log2TbHeight = 4 | |
|   else | |
|     log2TbHeight = Min( log2TbHeight, 5 ) | |
|   if( log2TbWidth > 0) | |
|     last_sig_coeff_x_prefix | ae(v) |
|   if( log2TbHeight > 0) | |
|     last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   log2SbW = ( Min(log2TbWidth, log2TbHeight ) < 2 ? 1 : 2) | |
|   log2SbH = log2SbW | |

```
if (log2TbWidth < 2 && cIdx = = 0 ) {
   log2SbW = log2TbWidth
   log2SbH = 4 − log2SbW
} else if( log2TbHeight < 2 && cIdx = = 0 ) {
   log2SbH = log2TbHeight
   log2SbW = 4 − log2SbH
}
numSbCoeff = 1 << (log2SbW + log2SbH)
lastScanPos = numSbCoeff
lastSubBlock = ( 1 << ( log2TbWidth + log2TbHeight − ( log2SbW + log2SbH ) ) ) − 1
...
}
``` sps_sbt_max_size_64 flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

$$\text{MaxSbtSize}=\text{sps\_sbt\_max\_size\_64\_flag}?64:32 \qquad (7\text{-}33)$$

2.9 Quantized Residual Domain Block Differential Pulse-Code Modulation Coding (QR-BDPCM)

In JVET-N0413, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$, be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i=0,\ 0 \leq j \leq (N-1) \\ Q(r_{i,j}) - Q(r_{(i-1),j}), & 1 \leq i \leq (M-1),\ 0 \leq j \leq (N-1) \end{cases}$$

For horizontal prediction, similar rules apply, and the residual quantized samples are obtained by $$\tilde{r}_{i,j} = \begin{cases} Q(r_{i,j}), & 0 \leq i \leq (M-1),\ j=0 \\ Q(r_{i,j}) - Q(r_{i,(j-1)}), & 0 \leq i \leq (M-1),\ 1 \leq j \leq (N-1) \end{cases}$$

The residual quantized samples $\tilde{r}_{i,j}$ are sent to the decoder.

On the decoder side, the above calculations are reversed to produce $Q(\tilde{r}_{i,j})$, $0 \leq i \leq M-1$, $0 \leq j \leq N-1$. For vertical prediction case, $$Q(r_{i,j}) = \Sigma_{k=0}^{i} \tilde{r}_{k,j},\ 0 \leq i \leq (M-1),\ 0 \leq j \leq (N-1)$$

For horizontal case, $$Q(r_{i,j}) = \Sigma_{k=0}^{j} \tilde{r}_{i,k},\ 0 \leq i \leq (M-1),\ 0 \leq j \leq (N-1)$$

The invert quantized residuals, $Q^{-1}$ $(Q(r_{i,j}))$, are added to the intra block prediction values to produce the reconstructed sample values.

Transform skip is always used in the QR-BDPCM.

2.9.1 Coefficients Coding of TS-Coded Blocks and QR-BDPCM Coded Blocks

QR-BDPCM follows the context modeling method for TS-coded blocks.

A modified transform coefficient level coding for the TS residual. Relative to the regular residual coding case, the residual coding for TS includes the following changes:
(1) no signaling of the last x/y position
(2) coded_sub_block_flag coded for every subblock except for the last subblock when all previous flags are equal to 0;
(3) sig_coeff_flag context modelling with reduced template,
(4) a single context model for abs_level_gt1_flag and par_level_flag,
(5) context modeling for the sign flag, additional greater than 5, 7, 9 flags,
(6) modified Rice parameter derivation for the remainder binarization
(7) a limit for the number of context coded bins per sample, 2 bins per sample within one block.

2.9.2 Syntax and Semantics
7.3.6.5 Coding Unit Syntax

| | Descriptor |
|---|---|
| coding_unit( x0, y0, cbWidth, cbHeight, tree Type ) { | |
|   if( tile_group_type != I \|\| sps_ibc_enabled_flag) { | |
|     if( treeType !=DUAL_TREE_CHROMA) | |
|       cu_skip_flag[ x0 ][ y0 ] | ae(v) |
|     if( cu_skip_flag[ x0 ][ y0 ] = = 0 && tik_group_type != I ) | |
|       pred_mode_flag | ae(v) |
|     if( ( (tile_group_type == I && cu_skip_flag[ x0 ][ y0 ] = = 0 ) \|\| | |
|       ( tile_group_type !=I &&CuPredMode\| != MODE_INTRA) ) && | |
|       sps_ibc_enabled_flag) | |

-continued

| | Descriptor |
|---|---|
|       pred_mode_ibc_flag | ae(v) |
| }<br>if( CuPredMode[ x0 ][ y0 ] == MODE_INTRA) {<br>  if( pred_mode_flag == MODE_INTRA&& (cIdx = = 0 ) &&<br>    ( cbWidth <= 32 ) && ( CbHeight <= 32)) {<br>    bdpcm_flag[ x0 ][ y0 ] | ae(v) |
|     if( bdpcm_flag[ x0 ][ y0 ] ) {<br>      bdpcm_dir_flag[ x0 ][ y0 ] | ae(v) |
|     }<br>    else {<br>    if( sps_pcm_enabled_flag &&<br>      cbWidth >= MinIpcmCbSizeY && cbWidth <= MaxIpcmCb SizeY &&<br>      cbHeight >= MinIpcmCbSizeY && cbHeight <= MaxIpcmCbSizeY )<br>      pcm_flag[ x0 ][ y0 ] | ae(v) |
|     if( pcm_flag[ x0 ][ y0 ] ) {<br>      while( !byte_aligned( ) )<br>        pcm_alignment_zero_bit | f(1) |
|       pcm_sample ( cbWidth, cbHeight, treeType)<br>  } else {<br>    if( treeType == SINGLE_TREE \|\| treeType == DUAL_TREE_LUMA) {<br>      if( ( y0 % CtbSizeY ) > 0)<br>        intra_luma_ref_idx[ x0 ][ y0 ] | ae(v) |
|       if (intra_luma_ref_idx[ x0 ][ y0 ] = = 0 &&<br>        ( cbWidth <=MaxTbSizeY \|\| cbHeight <= MaxTbSizeY) &&<br>        ( cbWidth * cbHeight > MinTbSizeY * MinTbSizeY))<br>        intra_subpartitions_mode_flag[ x0 ][ y0 ] | ae(v) |
|       if( intra_subpartitions_mode_flag[ x0 ][ y0 ] = = 1 &&<br>        cbWidth <= MaxTbSizeY && cbHeight <= MaxTbSizeY)<br>        intra_subpartitions_split_flag[ x0 ][ y0 ] | ae(v) |
|       if( intra_luma_ref_idx[ x0 ][ y0 ] = = 0 &&<br>        intra_subpartitions_mode_flag[ x0 ][ y0 ] = = 0)<br>        infra_luma_mpm_flag[ x0 ][ y0 ] | ae(v) |
|       if( intra_luma_mpm_flag[ x0 ][ y0 ] )<br>        infra_luma_mpm_idx[ x0 ][ y0 ] | ae(v) |
|       else<br>        infra_luma_mpm_remainder[ x0 ][ y0 ] | ae(v) |
|       }<br>    }<br>    if( treeType = = SINGLE_TREE \|\| treeType == DUAL_TREE_CHROMA)<br>      intra_chroma_pred_mode[ x0 ][ y0 ] | ae(v) |
|   }<br>} else if( treeType != DUAL_TREE_CHROMA){/* MODE_INTER or MODE_IBC */<br>...<br>} | | bdpcm_flag[x0][y0] equal to 1 specifies that a bdpcm_dir_flag is present in the coding unit including the luma coding block at the location (x0, y0)
bdpcm_dir_flag[x0][y0] equal to 0 specifies that the prediction direction to be used in a bdpcm block is horizontal, otherwise it is vertical.

7.3.6.10 Transform Unit Syntax

| | Descriptor |
|---|---|
| transform_unit( x0, y0, tbWidth, tbHeight, treeType, subTuIndex ) {<br>...<br>  if( tu_cbf_luma[ x0 ][ y0 ] && treeType != DUAL_TREE_CHROMA<br>    && ( tbWidth <= 32 ) && ( tbHeight <= 32 )<br>    && ( Intra SubPartitionsSplit[ x0 ][ y0 ] = = ISP_NO_SPLIT ) && ( !cu_sbt_flag) ) {<br>    if( transform_skip_enabled_flag && tbWidth <= MaxTsSize && tbHeight <= MaxTsSize )<br>      transform_skip_flag[ x0 ][ y0 ] | ae(v) |
|     if( (( CuPredMode[ x0 ][ y0 ] != MODE_INTRA && sps_explicit_mts_inter_enabled_flag)<br>      \|\| ( CuPredMode[ x0 ][ y0 ] = = MODE_INTRA && sps_explicit_mts_intra_enabled_flag) )<br>      && ( tbWidth <= 32) && ( tbHeight <=32) && ( !transform_skip_flag[ x0 ][ y0 ] ) )<br>      tu_mts_idx[ x0 ][ y0 ] | ae(v) |
|   }<br>  if( tu_cbf_luma[ x0 ][ y0 ]<br>    if( !transform_skip_flag[ x0 ][ y0 ] )<br>      residual_coding( x0, y0, Log2(tbWidth), Log2(tbHeight), 0 )<br>    else<br>      residual_coding_ts( x0, y0, Log2(tbWidth), Log2(tbHeight ), 0)<br>} | |

| | Descriptor |
|---|---|
|     if(tu_cbf_cb[ x0 ][ y0 ] ) <br>         residual_coding(xC, yC, Log2(wC),Log2(hC), 1 ) <br>     if(tu_cbf_cr[ x0 ][ y0 ] ) <br>         residual_coding(xC, yC, Log2(wC), Log2(hC), 2 ) <br> } | |

| | Descriptor |
|---|---|
| residual_ts_coding( x0, y0, log2TbWidth, log2TbHeight, cIdx ) { <br>   log2SbSize = ( Min( log2Tb Width, log2TbHeight ) <2 ? 1 : 2) <br>   numSbCoeff = 1 << (log2 Sb Size <<1 ) <br>   lastSubBlock =( 1 << (log2TbWidth + log2TbHeight− 2 * log2SbSize ) ) − 1 <br> /* Loop over subblocks from top-left (DC) subblock to the last one */ <br>   inferSbCbf = 1 <br>   MaxCcbs = 2* ( 1 << log2TbWidth) * ( 1 << log2TbHeight ) <br>   for(i =0; i <= lastSubBlock; i++) { <br>     xS = DiagScanOrder[log2TbWidth − log2SbSize ][ log2TbHeight − log2SbSize ][ i ][ 0 ] <br>     yS = DiagScanOrder[log2TbWidth − log2SbSize ][ log2TbHeight − log2SbSize ][ i ][ 1 ] <br>     if( (i != lastSubBlock \|\| !inferSbCbf) <br>       coded_sub_block_flag[ xS ][ yS ] <br>       MaxCcbs− − <br>     if( coded_sub_block_flag[ xS ][ yS ] && i < lastSubBlock) <br>       inferSbCbf = 0 <br>   } <br> /* First scan pass */ <br>   inferSbSigCoeffFlag = 1 <br>   for(n = ( i = = 0; n <= numSbCoeff − 1; n++) { <br>     xC = ( xS << log2SbSize ) + DiagScanOrder[log2SbSize ][log2SbSize ][ n ][ 0 ] <br>     yC = (yS << log2SbSize ) + DiagScanOrder[log2SbSize ][log2SbSize ][ n ][ 1 ] <br>     if( coded_sub_block_flag[ xS ][ yS ] && <br>       ( n = = num SbCoeff − 1 \|\| !inferSbSigCoeffFlag ) ) { <br>       sig_coeff_flag[ xC ][ yC ] <br>       MaxCcbs− − <br>       if( sig_coeff_flag[ xC ][ yC ] ) <br>         inferSbSigCoeffFlag = 0 <br>     } <br>     if( sig_coeff_flag[ xC ][ yC ] ) { <br>       coeff_sign_flag[ n ] <br>       abs_level_gtx_flag[ n ][ 0 ] <br>       MaxCcbs = MaxCcbs − 2 <br>       if( abs_level_gtx_flag[ n ][ 0 ] ) { <br>         par_level_flag[ n ] <br>         MaxCcbs− − <br>       } <br>     } <br>     AbsLevelPassX[ xC ][ yC ] = <br>         sig_coeff_flag[ xC ][ yC ] + par_level_flag[ n ] + abs_level_gtx_flag[ n ][ 0 ] <br>   } <br> /* GreaterthanX scan passes (numGtXFlags=5)*/ <br>     for( i = 1; i <= 5 − 1 && abs_level_gtx_flag[n ][i − 1 ] ; i++ ) { <br>       for(n = 0; n <= num SbCoeff − 1; n++) { <br>         xC = ( xS << log2SbSize ) + DiagScanOrder[ log2SbSize ][ log2 SbSize ][ n ][ 0 ] <br>         yC = ( yS << log2SbSize ) + DiagScanOrder[ log2SbSize ][ log2 SbSize ][ n ][ 1 ] <br>         abs_level_gtx_flag[ n ][ i ] <br>         MaxCcbs− − <br>         AbsLevelPass[ xC ][ yC ] + = 2 * abs_level_gtx_flag[ n ][ i ] <br>       } <br>     } <br> /* remainderscanpass */ <br>     for(n = 0; n <= num SbCoeff − 1; n++) { <br>       xC = ( xS << log2Sb Size ) + DiagScanOrder[log2SbSize ][log2SbSize ][ n ][ 0 ] <br>       yC = ( yS << log2SbSize ) + DiagScanOrder[log2SbSize ][log2SbSize ][ n ][ 1 ] <br>       if( abs_level_gtx_flag[ n ][ num GtXFlags − 1 ] ) <br>         abs_remainder[ n ] <br>       TransCoeffLevel[ x0 ][ y0 ][ cIdx ][ xC ][ yC ] = ( 1 − 2 * coeff_sign_flag[ n ]) * <br>                       ( AbsLevelPassX[ xC ][ yC ] + abs_remainder[ n ]) <br>     } <br>   } <br> } | <br><br><br><br><br><br><br><br><br><br><br><br>ae(v)<br><br><br><br><br><br><br><br><br>ae(v)<br><br><br><br><br>ae(v)<br>ae(v)<br><br><br>ae(v)<br><br><br><br><br><br><br><br><br>ae(v)<br><br><br><br><br><br><br>ae(v) |

The number of context coded bins is restricted to be no larger than 2 bins per sample for each CG.

TABLE 9-15

Assignment of ctxInc to syntax elements with context coded bins

| Syntax element | binIdx | | | | | |
|---|---|---|---|---|---|---|
| | 0 | 1 | 2 | 3 | 4 | >=5 |
| last_sig_coeff_x_prefix | 0..23 (clause 9.5.4.2.4) | | | | | |
| last_sig_coeff_y_prefix | 0..23 (clause 9.5.4.2.4) | | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag[ ][ ] | (MaxCcbs > 0) ? (0..7 (clause 9.5.4.2.6)): bypass | na | na | na | na | na |
| sig_coeff_flag[ ][ ] | (MaxCcbs > 0) ? (0..93 (clause 9.5.4.2.8)): bypass | na | na | na | na | na |
| par_level_flag[ ] | (MaxCcbs > 0) ? (0..33 (clause 9.5.4.2.9)): bypass | na | na | na | na | na |
| abs_level_gtx_flag[ ][ i ] | 0..70 (clause 9.5.4.2.9) | na | na | na | na | na |
| abs_remainder[ ] | bypass | bypass | bypass | bypass | bypass | bypass |
| dec_abs_level[ ] | bypass | bypass | bypass | bypass | bypass | bypass |
| coeff_sign_flag[ ] transform_skip_flag[x0][y0] == 0 | bypass | na | na | na | na | na |
| coeff_sign_flag[ ] transform_skip_flag[x0][y0] == 1 | 0 | na | na | na | na | na |

2.10 In-Loop Reshaping (ILR) in JVET-M0427

The basic idea of in-loop reshaping (ILR) is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$).

ILR is also known as Luma Mapping with Chroma Scaling (LMCS) in VVC.

2.10.1 PWL Model

Conceptually, piece-wise linear (PWL) is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2FP\_PREC-1)>>FP\_PREC)+c$$

Herein, m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without precomputing the LUTs.

2.10.2 Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 14:
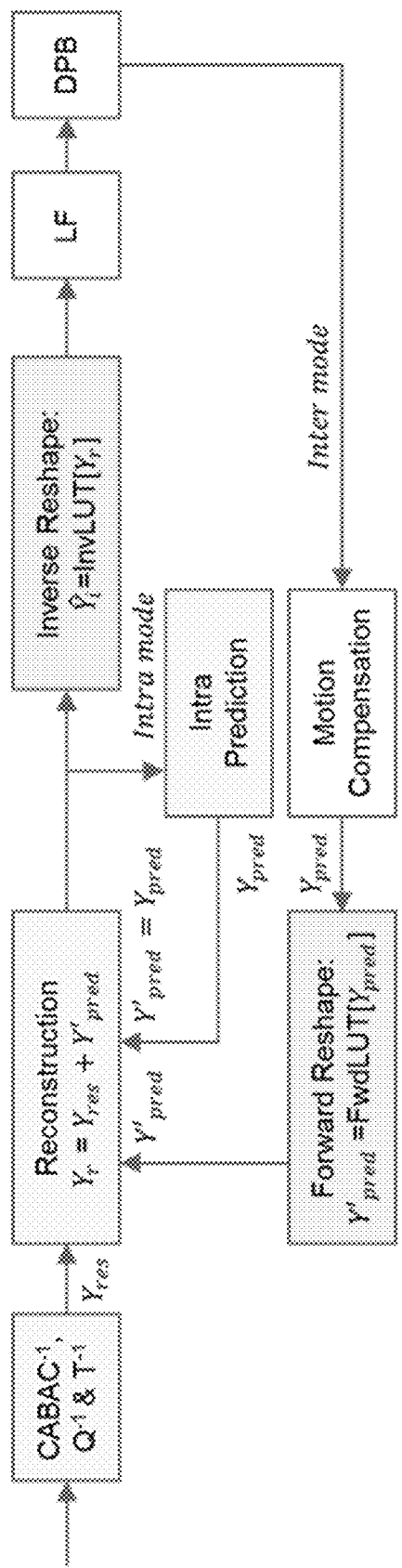
FIG. 14 shows a flowchart of a decoding flow with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 14 shows the block diagram of the CE12-2 decoding process based on mode.

CE12-2 also tests 16-piece piece-wise linear (PWL) models for luma and chroma residue scaling instead of the 32-piece PWL models of CE12-1.

Inter slice reconstruction with in-loop luma reshaper in CE12-2 (lighter shaded blocks indicate signal in reshaped domain: luma residue; intra luma predicted; and intra luma reconstructed)

2.10.3 Luma-Dependent Chroma Residue Scaling

Luma-dependent chroma residue scaling is a multiplicative process implemented with fixed-point integer operation. Chroma residue scaling compensates for luma signal interaction with the chroma signal. Chroma residue scaling is applied at the TU level. More specifically, the average value of the corresponding luma prediction block is utilized.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values.

2.10.4 Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual are generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:
  Current block is intra-coded
  Current block is coded as CPR (current picture referencing, aka intra block copy, IBC)
  Current block is coded as combined inter-intra mode (CIIP) and the forward reshaping is disabled for the intra prediction block 3 Drawbacks of Existing Implementations The current design has the following problems:
(1) LMCS may be still applied to a block coded with transform and quantization bypass mode (i.e., cu_transquant_bypass_flag equal to 1). However, the mapping from original domain to reshaped domain, or versa vice are lossy. Enabling both LMCS and cu_transquant_bypass_flag is not desirable.
(2) How to signal several new transform related coding tools (such as MTS indx or RST index or SBT), coding tools without transform (such as QR-DPCM) and cu_transquant_bypass_flag hasn't been studied.
(3) cu_transquant_bypass_flag in HEVC was signaled once and applied to all three-color components. How to handle dual tree needs to be studied.
(4) Certain coding tools (such as PDPC) may bring coding loss when lossless coding is applied.
(5) Some coding tools shall be disabled to make sure one block is lossless coded. However, it hasn't been taken into consideration.
(6) In the latest VVC draft, SBT and ISP is treated as implicit MTS. That is, for SBT and ISP coded blocks, implicit selection of transforms is applied. In addition, if the sps_mts_enbaled_flag is false, then SBT and ISP may still be enabled for a block, however, only DCT2 is allowed instead. With such design, the coding gain of SBT/ISP becomes less when the sps_mts_enbaled_flag is false.

In VVC D6, whether to enable implicit MTS is shown as follows:
  If sps_mts_enabled_flag is equal to 1 and one of the following conditions is true, implicitMtsEnabled is set equal to 1:
    IntraSubPartitionsSplitType is not equal to ISP_NO_SPLIT
    cu_sbt_flag is equal to 1 and Max(nTbW, nTbH)≤32
    sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0
  Otherwise, implicitMtsEnabled is set equal to 0.

4 Example Methods for Lossless Coding for Visual Media Coding

Embodiments of the presently disclosed technology overcome the drawbacks of existing implementations, thereby providing video coding with higher coding efficiencies. The methods for the lossless coding for visual media coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

Denote one block size by W*H wherein W is the block width and H is the block height. The maximum transform block size denoted by MaxTbW*MaxTbH wherein MaxTbW and MaxTbH are the maximum transform block width and height, respectively. The minimum transform block size denoted by MinTbW*MinTbH wherein MinTbW and MinTbH are the minimum transform block width and height, respectively.

TransQuantBypass mode is defined that transform and quantization process are skipped, such as cu_transquant_bypass_flag set to 1.

Usage of TransQuantBypass Mode for Multiple Color Components

1. Indications of TransQuantBypass mode (e.g., cu_transquant_bypass_flag) may be signaled separately for different color component.
   a. In one example, when dual tree is enabled, cu_transquant_bypass_flag for luma and chroma components or for each color component may be coded separately.
   b. In one example, usage of this mode may be context coded.
      i. In one example, the selection of context may depend on the color component.
   c. In one example, predictive coding of this flag may be applied.
   d. In one example, whether to signal multiple indications or just one for all color components may depend on the coding structure (e.g., single tree or dual tree).
   e. In one example, whether to signal multiple indications or just one for all color components may depend on color formats and/or color component coding methods (e.g., separate plane coding is enabled or not) and/or coding mode.
      i. In one example, when joint chroma residual coding is enabled for chroma blocks, the two chroma blocks may share the same enabling flag of TransQuantBypass.
   f. In one example, whether TransQuantBypass mode can be applied in a block of a first color component may depend on whether TransQuantBypass mode is applied to samples located in a corresponding region of a second color component.
      i. The size of corresponding region and top-left sample's coordinate of the second color component corresponding to the block of the first color component may depend on the color format. For example, if the top-left sample's coordinate of the first color component is (x0, y0) and the block size of the first color component is W*H, the size of corresponding region may be 2 W*2H and top-left sample's coordinate of the second color component is (2*x0, 2*y0) for 4:2:0 color format.
      ii. In one example, the first color component is a chroma component (e.g. Cb or Cr).
      iii. In one example, the second color component is the luma component.
      iv. In one example, TransQuantBypass mode can only be used in a block of a first color component if all samples in the region of a second color component corresponding to the block of the first color component is TransQuantBypass coded.
      v. In one example, TransQuantBypass mode can only be used in a block of a first color component at least one sample in the region of a second color component corresponding to the block of the first color component is TransQuantBypass coded.
      vi. In the above examples, if TransQuantBypass cannot be used, TransQuantBypass may not be signaled and inferred to be 0.

vii. In one example, whether to signal the side information of TransQuantBypass for the first color component may depend on the usage of TransQuantBypass in one or multiple blocks in the corresponding region of the 2nd color component.
1) If TransQuantBypass is applied to all blocks in the corresponding region, TransQuantBypass can be enabled and the side information of TransQuantBypass for the first color component may be signaled. Otherwise, the signaling is skipped and inferred to be disabled.
2) If TransQuantBypass is applied to one or more blocks (e.g., a block covering the center position of the corresponding region) in the corresponding region, TransQuantBypass can be enabled and the side information of TransQuantBypass for the first color component may be signaled. Otherwise, the signaling is skipped and inferred to be disabled.
viii. Alternatively, furthermore, the above methods may be enabled when the dual tree coding structure is enabled.
2. Indications of TransQuantBypass mode (e.g., cu_transquant_bypass_flag) for chroma blocks may be derived from the corresponding luma region.
a. In one example, if a chroma block corresponds to a luma region which covers one or multiple blocks such as coding units (CU) or prediction unit (PU) or transform unit (TU), and at least one luma block is coded with TransQuantBypass mode, then the chroma block should be coded with TransQuantBypass mode.
i. Alternatively, if a chroma block corresponds to a luma region which covers one or multiple blocks and all these luma blocks is coded with TransQuantBypass mode, then the chroma block should be coded with TransQuantBypass mode.
ii. Alternatively, a chroma block may be divided into sub-blocks. If a sub-block corresponds to a luma region which covers one or multiple blocks and at all these luma blocks is coded with TransQuantBypass mode, then the chroma sub-block should be coded with TransQuantBypass mode.
3. TransQuantBypass mode may be enabled for a block larger than a VPDU.
a. A block is defined to be larger than a VPDU if its width or height is larger than the width or height of a VPDU.
i. Alternatively, a block is defined to be larger than a VPDU if both its width and height are larger than the width and height of a VPDU, respectively.
b. In one example, indications of TransQuantBypass mode (e.g., cu_transquant_bypass_flag) cu_transquant_bypass_flag may be signaled for a block larger than a VPDU.
c. In one example, for CTUs larger than a VPDU, it may be split via quad-tree until reaching multiple VPDUs or it may not be split. When not split, the cu_transquant_bypass_flag may be inferred to be 1 without being signaled.
i. Alternatively, intra prediction mode may be allowed for those large blocks.
d. Alternatively, transQuantBypass mode may be enabled for a block larger than the maximum allowed transform block size (e.g., MaxTbSizeY*MaxTbSizeY) or either width/height is greater than maximum allowed transform block size (e.g., MaxTbSizeY).
i. Alternatively, sub-bullets a-c may be applied by replacing VPDU by MaxTbSizeY.
4. Transform skip mode and/or other coding methods which didn't apply transform may be enabled for a block larger than a VPDU.
a. A block is defined to be larger than a VPDU if its width or height is larger than the width or height of a VPDU.
i. Alternatively, a block is defined to be larger than a VPDU if both its width and height are larger than the width and height of a VPDU, respectively.
b. In one example, indications of Transform skip mode may be signaled for a block larger than a VPDU.
c. In one example, for CTUs larger than a VPDU, it may be split via quad-tree until reaching multiple VPDUs or it may not be split. When not split, the Transform skip flag may be inferred to be 1 without being signaled.
i. Alternatively, intra prediction mode may be allowed for those large blocks.
d. Alternatively, transform skip mode and/or other coding methods which didn't apply transform may be enabled for a block larger than the maximum allowed transform block size (e.g., MaxTbSizeY*MaxTbSizeY) or either width/height is greater than maximum allowed transform block size (e.g., MaxTbSizeY).
i. Alternatively, sub-bullets a-c may be applied by replacing VPDU by MaxTbSizeY.
e. Other coding methods which do not apply transform may include Transform skip mode, DPCM, QR-DPCM etc.

Block Dimension Settings of TransQuantBypass Mode
5. The allowed block dimensions for TransQuantBypass mode may be the same as that TS may be enabled.
a. TransQuantBypass mode may be applicable to same block dimensions that QR-BDPCM may be enabled.
b. TransQuantBypass mode may be applicable to same block dimensions that TS may be enabled.
c. TS mode may be applicable to different block dimensions that QR-BDPCM may be enabled.
i. Alternatively, QR-BDPCM may be enabled for a video unit (e.g., sequence) even when TS mode is disabled/disallowed.
d. Whether to enable QR-BDPCM may depend on whether either TS or TransQuantBypass mode is enabled.
i. In one example, the signaling of on/off control flags for QR-BDPCM in a video unit (e.g, sequence/TU/PU/CU/picture/slice) may be under the conditional check of whether either TS or TransQuantBypass is allowed.
ii. In one example, if TransQuantBypass is allowed, QR-BDPCM may still be enabled even when TS is disallowed.
e. Maximum and/or minimum block dimensions for blocks with TransQuantBypass mode may be signaled in sequence/view/picture/slice/tile group/tile/CTUs/video units-level.
i. In one example, indications of Maximum and/or minimum block dimensions for blocks with cu_transquant_bypass_flag may be signaled in SPS/VPS/PPS/slice header/tile group header/tile etc.

6. It is proposed to align the allowed block dimensions for all kinds of coding modes that transform is disabled, such as TS, TransQuantBypass mode, QR-BDPCM, BDPCM, etc.
    a. Alternatively, a single indication of the allowed maximum and/or minimum size for those cases may be signaled to control usage of all of those modes.
    b. In one example, indication of allowed maximum and/or minimum size for those cases may be signaled when one of the coding tools that doesn't rely on non-identity transform is enabled.
        i. In one example, log 2_transform_skip_max_size_minus2 may be signaled when either TS or QR-BDPCM is enabled.
        ii. In one example, log 2_transform_skip_max_size_minus2 may be signaled when either TS or TransQuantBypass is enabled.
7. Maximum transform block size for blocks that transform is skipped, such as TS, TransQuantBypass mode, QR-BDPCM, BDPCM, etc. al may be set differently from that used for the non-TS case wherein transform is applied.

Interaction Between TransQuantBypass Mode and Other Coding Tools

8. For TransQuantBypass-coded block, luma reshaping and/or chroma scaling may be disabled.
    a. When TransQuantBypass is applied to a block, the residual is coded in the original domain instead of reshaped domain regardless the enabling/disabling flag of the LMCS. For example, the enabling/disabling flag of the LMCS may be signaled in slice/sequence level.
    b. In one example, for an intra and TransQuantBypass-coded block, the prediction signal/reference samples used in intra prediction may be firstly mapped from reshaped domain to original domain.
    c. In one example, for an IBC and TransQuantBypass-coded block, the prediction signal/reference samples used in IBC prediction may be firstly mapped from reshaped domain to original domain.
    d. In one example, for a CIIP and TransQuantBypass-coded block, the following may apply:
        i. The prediction signal of intra prediction/reference samples used in intra prediction may be firstly mapped from reshaped domain to original domain.
        ii. The mapping of prediction signal of inter prediction from original domain to the reshaped domain is skipped.
    e. In one example, for the palette mode, the palette table may be generated in the original domain instead of reshaped domain.
    f. Alternatively, two buffers may be allocated, one of which is to store the summation of prediction signal and residual signal (a.k.a. the reconstructed signal); and the other is to store the reshaped summation, that is, the summation of prediction signal and residual signal need to be firstly mapped from original domain to reshaped domain and may be further utilized for coding succeeding blocks.
        i. Alternatively, only the reconstructed signal in the original domain is stored. The reconstructed signal in the reshaped domain may be converted from the reconstructed signal in the original domain when required by succeeding blocks.
    g. The above methods may be applicable to other coding methods which rely on reference samples within current tile/slice/tile group/picture.
        i. In one example, inverse reshaping process (i.e., conversion from the reshaped domain to the original domain) may be applied on the prediction signal generated from reference samples within current tile/slice/tile group/picture.
        ii. Alternatively, furthermore, the forward reshaping process (i.e., conversion from the original domain to the reshaped domain) is not allowed to be applied on the prediction signal generated from reference samples in a different picture, such as in a reference picture.
    h. Whether to enable the above methods may rely on the enabling/disabling status of TransQuantBypass/TS/QR-BDPCM/BDPCM/PCM/other tools that don't apply transform for those blocks that include the required reference samples to be utilized.
        i. In one example, whether and/or how to apply intra-prediction (such as normal intra-prediction, intra block copy or inter-intra prediction such as CIIP in VVC) may depend on whether the current block is TransQuantBypass-coded and/or whether one or multiple neighbouring blocks providing the intra-prediction (or reference samples) is (are) TransQuantBypass-coded.
        ii. In one example, if current block is TransQuantBypass-coded, and for those reference samples located in TransQuantBypass-coded blocks, the reference samples are not converted (i.e., no need to apply forward or inverse reshaping process) and may be directly used to derive the prediction signal.
        iii. In one example, if the current block is TransQuantBypass-coded, and for those reference samples NOT located in TransQuantBypass-coded blocks, the reference samples may firstly need to be converted to the original domain (e.g., via applying inverse reshaping process), and then used to derive the prediction signal.
        iv. In one example, if the current block is NOT TransQuantBypass-coded, and for those reference samples NOT located in TransQuantBypass-coded blocks, the reference samples are not converted (i.e., no need to apply forward or inverse reshaping process) and may be directly used to derive the prediction signal.
        v. In one example, if current block is NOT TransQuantBypass-coded, and for those reference samples located in TransQuantBypass-coded blocks, the reference samples may firstly need to be converted to the reshaping domain (e.g., via applying inverse reshaping process), and then used to derive the prediction signal.
        vi. In one example, the above methods may be applied when those reference samples are from blocks in the same tile/brick/slice/picture, such as when current block is coded with intra/IBC/CIIP etc. al.
        vii. In one example, the above methods may be applied to a specific color component, such as Y component or G component, but not to other color components.
    i. In one example, luma reshaping and/or chroma scaling may be disabled for blocks coded with methods which don't apply transform (e.g., TS mode).

i. Alternatively, furthermore, the above claims (e.g., bullets 7a-h) may be applied by replacing the TransQuantBypass mode with a different coding mode (e.g., TS).
9. The indication of TransQuantBypass mode may be signaled before signaling one or multiple transform matrices related coding tools.
   a. In one example, transform matrices related coding tools may be one or multiple of the following tools (related syntax elements are included in the bracelet):
      i. Transform skip mode (e.g., transform_skip_flag)
      ii. Explicit MTS (e.g., tu_mts_idx)
      iii. RST (e.g., st_idx)
      iv. SBT (e.g., cu_sbt_flag, cu_sbt_quad_flag, cu_sbt_pos_flag)
      v. QR-BDPCM (e.g., bdpcm_flag, bdpcm_dir_flag)
   b. How to code the residual may be dependent on the usage of TransQuantBypass mode.
      i. In one example, whether to code residual_coding or residual_coding_ts may depend on the usage of TransQuantBypass mode.
      ii. In one example, when TransQuantBypass is disabled and transform_skip_flag is disabled, the residual coding method which is designed for blocks with transform applied to (e.g., residual_coding) may be utilized for residual coding.
      iii. In one example, when TransQuantBypass is enabled or transform_skip_flag is enabled, the residual coding method which is designed for blocks without transform applied (e.g., residual_coding_ts) may be utilized for residual coding.
      iv. TransQuantBypass mode may be treated as a special TS mode.
         1) Alternatively, furthermore, when TransQuantBypass mode is enabled for a block, the transform_skip_flag may not be signaled, and/or it may be inferred to be 1.
            a. Alternatively, furthermore, residual_coding_ts may be used.
   c. Alternatively, side information of other kinds of transform matrices related coding tools may be signaled under the condition of usage of TransQuantBypass mode.
      i. When TransQuantBypass mode is applied, side information of usage of Transform skip mode, QR-BDPCM, BDPCM may be further signaled.
      ii. When TransQuantBypass mode is applied, side information of usage of SBT, RST, MTS may NOT be signaled.
10. The indication of TransQuantBypass mode may be signaled after signaling one or multiple transform matrices related coding tools.
   a. Alternatively, indications of TransQuantBypass mode may be coded when certain coding tool is applied, such as the Transform skip mode, QR-BDPCM, BDPCM.
   b. Alternatively, indications of TransQuantBypass mode may NOT be coded when certain coding tool is applied, such as the SBT, RST, MTS.
11. The indication of TransQuantBypass mode may be conditionally signaled after signaling indications of quantization parameters.
   a. Alternatively, indications of quantization parameters may be conditionally signaled after signaling the indication of TransQuantBypass mode.
   b. In one example, when TransQuantBypass is applied to one block, signaling of the quantization parameter and/or delta of quantization parameters (e.g. cu_qp_delta_abs, cu_qp_delta_sign_flag) may be skipped.
      i. For example, cu_qp_delta_abs may be inferred to be 0.
   c. Alternatively, when delta of quantization parameters (e.g. cu_qp_delta_abs, cu_qp_delta_sign_flag) is unequal to 0, signaling of TransQuantBypass mode may be skipped, and TransQuantBypass is inferred to be disabled.
      i. In one example, the signaling of TransQuantBypass may depend on indications of quantization parameters only for a specific color component, such as the luma component.
12. When TransQuantBypass mode is enabled for one block, ALF or non-linear ALF is disabled for samples in that block.
13. When TransQuantBypass mode is enabled for one block, bilateral filter or/and diffusion filter and/or other kinds of post-reconstruction filters that may modify the reconstruction block may be disabled for samples in that block.
14. When TransQuantBypass mode is enabled for one block, PDPC may be disabled.
15. The transform selection method in Implicit MTS is not applicable if a block is coded with the TransQuantBypass mode.
16. The scaling approach for chroma samples in LMCS is not applied if a block is coded with the TransQuantBypass mode.
17. LMCS may be disabled for CU/CTU/slice/tile/tile group/picture/sequence wherein TransQuantBypass is allowed.
   a. In one example, when a SPS/VPS/PPS/slice-level flag indicates that transform and quantization bypass mode may be applied to one block within the sequence/view/picture/slice, LMCS may be disabled.
   b. Alternatively, the signaling of LMCS related syntax elements may be skipped.
   c. In sequence/picture/slice/tile group/tile/brick-level, TransQuantBypass mode may be disabled when LMCS is enabled.
      i. For example, the signaling of enabling/disabling TransQuantBypass may depend on the usage of LMCS.
         1) In one example, The indication of TransQuantBypass is not signaled if LMCS is applied. E.g. TransQuantBypass is inferred to be not used.
         2) Alternatively, the signaling of usage of LMCS may depend on the enabling/disabling of TransQuantBypass.
   d. In one example, a conformance bitstream shall satisfy that TransQuantBypass and LMCS shall not be enabled for the same slice/tile/brick/tile group/picture.
18. Side information of QR-BDPCM may be signaled after the signaling of TS mode (e.g., transform_skip_flag).
   a. In one example, QR-BDPCM is treated as a special case of TS mode.

i. Alternatively, when QR-BCPCM is allowed for one block, the TS mode shall be enabled too, that is, the signaled/derived transform_skip_flag shall be equal to 1.
ii. Alternatively, when the signaled/derived transform_skip_flag shall be equal to 1, the side information of QR-BDPCM may be further signaled.
iii. Alternatively, when the signaled/derived transform_skip_flag shall be equal to 0, the side information of QR-BDPCM may NOT be signaled.
b. In one example, QR-BDPCM is treated as a different mode from the TS mode.
i. Alternatively, when the signaled/derived transform_skip_flag is equal to 0, the side information of QR-BDPCM may be further signaled.
ii. Alternatively, when the signaled/derived transform_skip_flag is equal to 1, the side information of QR-BDPCM may NOT be further signaled.
19. TransQuantBypass mode and/or TS mode and/or other coding methods that transform are not applied (e.g., palette mode) may be enabled in a sub-block level instead of whole block (e.g., CU/PU).
a. In one example, for the dual-tree case, a chroma block may be split to multiple sub-blocks, each block may determine the usage of TransQuantBypass mode and/or TS mode and/or other coding methods that transform are not applied according to the corresponding luma block's coded information.
20. Whether to apply the inverse reshaping process (i.e., conversion from the reshaped domain to the original domain) to the reconstructed blocks before loop filtering processes may be changed from block to block.
a. In one example, the inverse reshaping process may not be applied to blocks coded with TransQuantBypass mode but applied to other blocks coded with non-TransQuantBypass mode.
21. Whether to and/or how to apply coding tools of decoder-side motion derivation or decoder-side intra mode decision or CIIP or TPM may depend on whether identify transform and/or none of transforms is applied to a block.
a. In one example, when TransQuantBypass/TS/QR-BDPCM/DPCM/PCM/other coding tools with identify transform applied and/or without transform applied is enabled for a block, coding tools of decoder-side motion derivation or decoder-side intra mode decision or CIIP or TPM may be disabled.
b. In one example, the Prediction Refinement with Optical Flow (PROF) or CIIP or TPM may be disabled for those blocks on which identify transform or none of transforms is applied.
c. In one example, the Bi-directional Optical Flow (BDOF) or CIIP or TPM may be disabled for those blocks on which identify transform is applied.
d. In one example, the decode-side motion vector refinement (DMVR) or CIIP or TPM may be disabled for those blocks on which identify transform is applied.
22. TransQuantBypass may be enabled in a video unit (e.g., picture/slice/tile/brick) level. That is, all blocks in the same video unit will share the same on/off control of TransQuantBypass. The signaling of TransQuantBypass in smaller video blocks (e.g., CU/TU/PU) is skipped.
a. Alternatively, furthermore, the video unit-level indication of usage of TransQuantBypass may be signaled under the condition of usage of another tool X.
b. Alternatively, furthermore, the indication of usage of another tool X may be signaled under the condition of the video unit-level usage of TransQuantBypass.
c. Alternatively, furthermore, a conformance bitstream shall satisfy that when TransQuantBypass is enabled, another tool X shall be disabled.
d. Alternatively, furthermore, a conformance bitstream shall satisfy that when another tool X is enabled, TransQuantBypass shall be disabled.
e. For above examples, the 'another tool X' may be:
i. LMCS
ii. decoder-side motion derivation (e.g., DMVR, BDOF, PROF)
iii. decoder-side intra mode decision
iv. CIIP
v. TPM
23. The side information of TransQuantBypass may be signaled in TU level, however, the controlling of usage of TransQuantBypass may be done in a higher level (e.g., PU/CU).
a. In one example, when one CU/PU includes multiple TUs, side information of TransQuantBypass may be signaled once (e.g., associated with the first TU in the CU) and the other TUs within the CU share the same side information.
24. Indication of coding tools may be signaled in a video unit level which is larger than a CU, however, it may be NOT applied for certain samples within the video unit even the indication tells the tool is applied.
a. In one example, for samples within a lossless coded block (e.g., with the TransQuantBypass mode), the coding tool may be NOT applied even the indication tells the tool is enabled.
b. In one example, the video unit may be a Sequence/picture/view/slice/tile/brick/subpicture/CTB/CTU.
c. In one example, the coding tool may be a filtering method (e.g., ALF/clipping process in the non-linear ALF/SAO/bilateral filter/Hadamard transform domain filter)/scaling matrices/decoder side derivation methods etc. al.
d. Alternatively, a conformance bitstream shall obey the rule that if all or partial samples are lossless coded within the video unit, the indication of the coding tools shall tell such tools are disabled.
25. The above methods may be applicable to lossless coded blocks (e.g., TransQuantBypass mode, both transform and quantization are bypassed) or near lossless coded blocks.
a. In one example, if one block is coded with QPs in certain ranges (e.g., [4, 4]), the block is treated as near lossless coded blocks.
26. One or multiple separate flags (different from the sps_mts_enabled_flag) that controls whether non-DCT2 transforms are allowed for ISP/SBT may be signaled.
a. Alternatively, furthermore, the separate flag may be signaled when either ISP or SBT is enabled.
i. Alternatively, furthermore, the separate flag may be signaled when both ISP and SBT is enabled.
ii. Alternatively, furthermore, when the flag is equal to true, non-DCT2 transforms are allowed for ISP/SBT.
b. Alternatively, furthermore, one flag (e.g., sps_ISP_implicit_transform) to indicate whether non-DCT2 (e.g, DST7/DCT8) is allowed for ISP coded blocks may be signaled when ISP is enabled.

c. Alternatively, furthermore, one flag (e.g., sps_SBT_implicit_transform) to indicate whether non-DCT2 (e.g, DST7/DCT8) is allowed for SBT coded blocks may be signaled when SBT is enabled.

d. Alternatively, furthermore, sps_explicit_mts_intra_enabled_flag may control the usage of the explicit MTS (e.g., tu_mts_idx may be present in the bitstream) or the selection of transforms on intra block dimension (e.g., the implicit MTS applied to non-ISP coded intra blocks).

e. In one example, when sps_explicit_mts_intra_enabled_flag is disabled, ISP with non-DCT2 transforms may still be applied.

f. In one example, when sps_explicit_mts_inter_enabled_flag is disabled, SBT with non-DCT2 transforms may still be applied.

The examples described above may be incorporated in the context of the methods described below, e.g., methods 1500, 1510, 1520, 1530, 1540, 1550, 1560, and 2100-3800, which may be implemented at a video decoder or a video encoder.

Figure 15A:
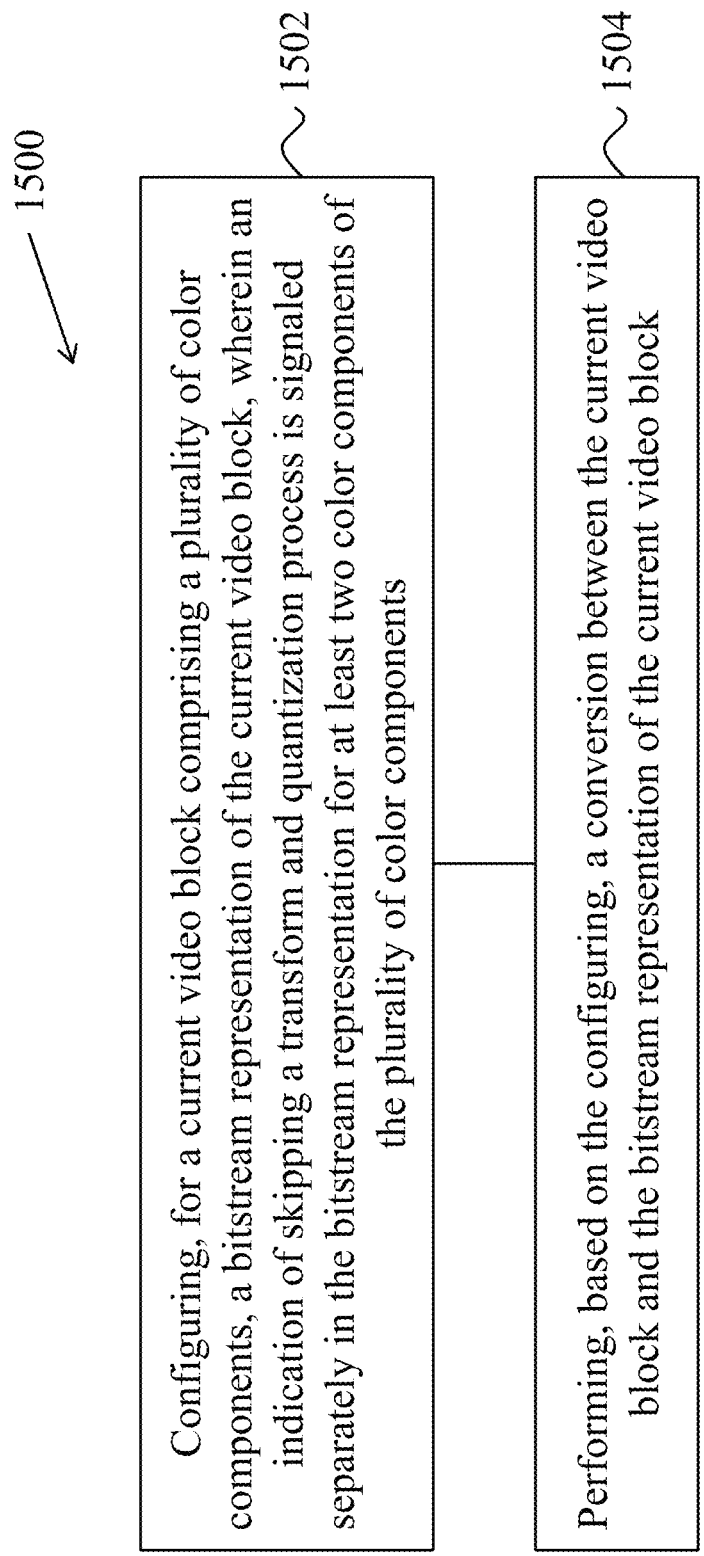
FIGS. 15A-15G show flowcharts of example methods for video processing.

FIG. 15A shows a flowchart of an exemplary method for video processing. The method 1500 includes, at step 1502, configuring, for a current video block comprising a plurality of color components, a bitstream representation of the current video block, wherein an indication of skipping a transform and quantization process is signaled separately in the bitstream representation for at least two color components of the plurality of color components.

The method 1500 includes, at step 1504, performing, based on the configuring, a conversion between the current video block and the bitstream representation of the current video block. In some embodiments, the current video block comprises a luma component and a plurality of chroma components, and wherein the indication for at least one of the plurality of chroma components is based on the indication for the luma component.

In some embodiments, the indication of skipping the transform and quantization process is denoted as cu_transquant_bypass_flag. In an example, a dual tree partitioning process is enabled for the current video block, and wherein the cu_transquant_bypass_flag is coded separately for a luma component and at least one chroma component of the current video block. In another example, a usage of skipping the transform and quantization process denoted by the cu_transquant_bypass_flag is coded based on a context. In yet another example, the context is selected based on at least one of the plurality of color components.

In some embodiments, signaling the indication separately for the at least two color components is based on at least one of a color format, a color component coding method or a coding mode of the current video block.

In some embodiments, a first of the at least two components is a chroma component, and wherein a second of the at least two components is a luma component. For example, the chroma component is Cb or Cr.

In some embodiments, a usage of skipping the transform and quantization process in a block of a first of the at least two color components is based on the usage of skipping the transform and quantization process on all samples in a region of a second of the at least two color components corresponding to the first of the at least two color components.

In some embodiments, a usage of skipping the transform and quantization process in a block of a first of the at least two color components is based on the usage of skipping the transform and quantization process on at least one sample in a region of a second of the at least two color components corresponding to the first of the at least two color components.

Figure 15B:
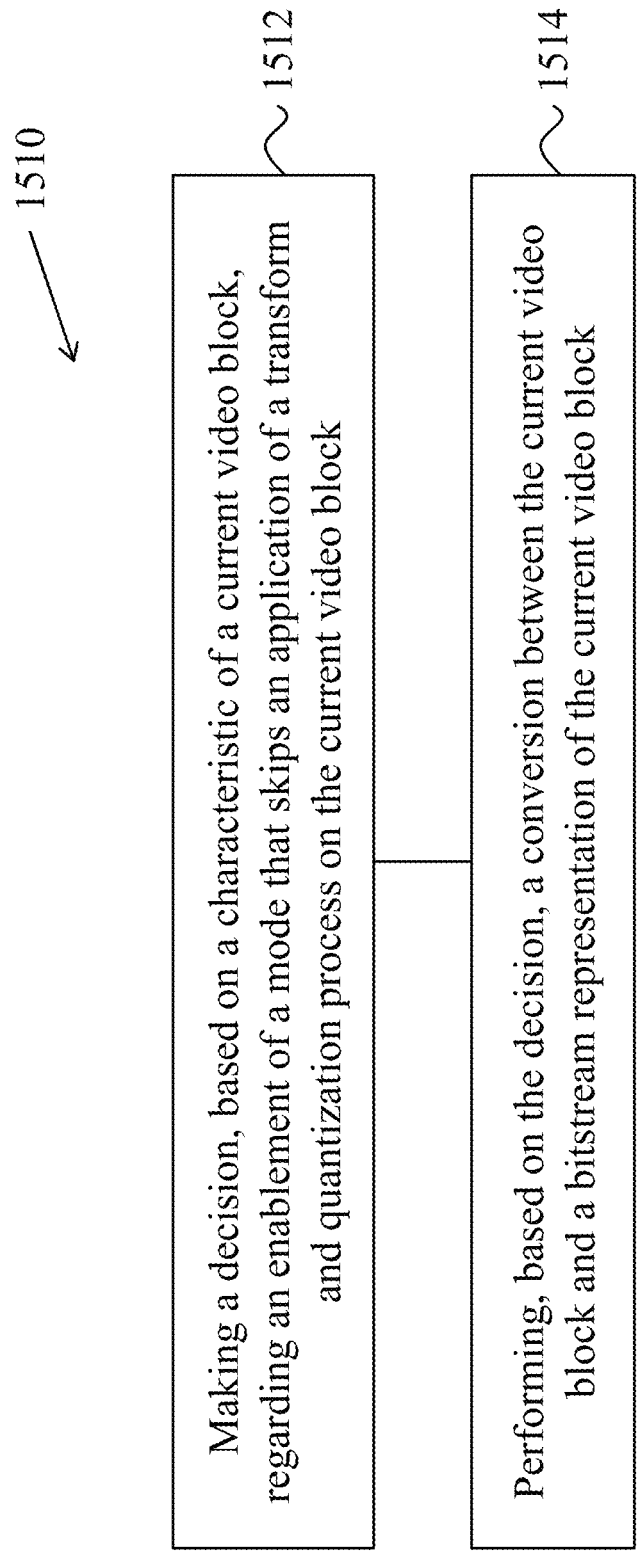

FIG. 15B shows a flowchart of another exemplary method for video processing. The method 1510 includes, at step 1512, making a decision, based on a characteristic of a current video block, regarding an enablement of a mode that skips an application of a transform and quantization process on the current video block.

The method 1510 includes, at step 1514, performing, based on the decision, a conversion between the current video block and a bitstream representation of the current video block.

In some embodiments, the characteristic is a size of the current video block, wherein the mode is enabled, and wherein the size of the current video block is larger than a size of a virtual pipelining data unit (VPDU). In an example, a height or a width of the current video block is greater than a height or a width of the VPDU, respectively.

In some embodiments, a coding mode that does not apply a transform is enabled for the current video block. In an example, the coding mode is a transform skip mode, a differential pulse-code modulation (DPCM) mode or a quantized residual DPCM mode.

Figure 15C:
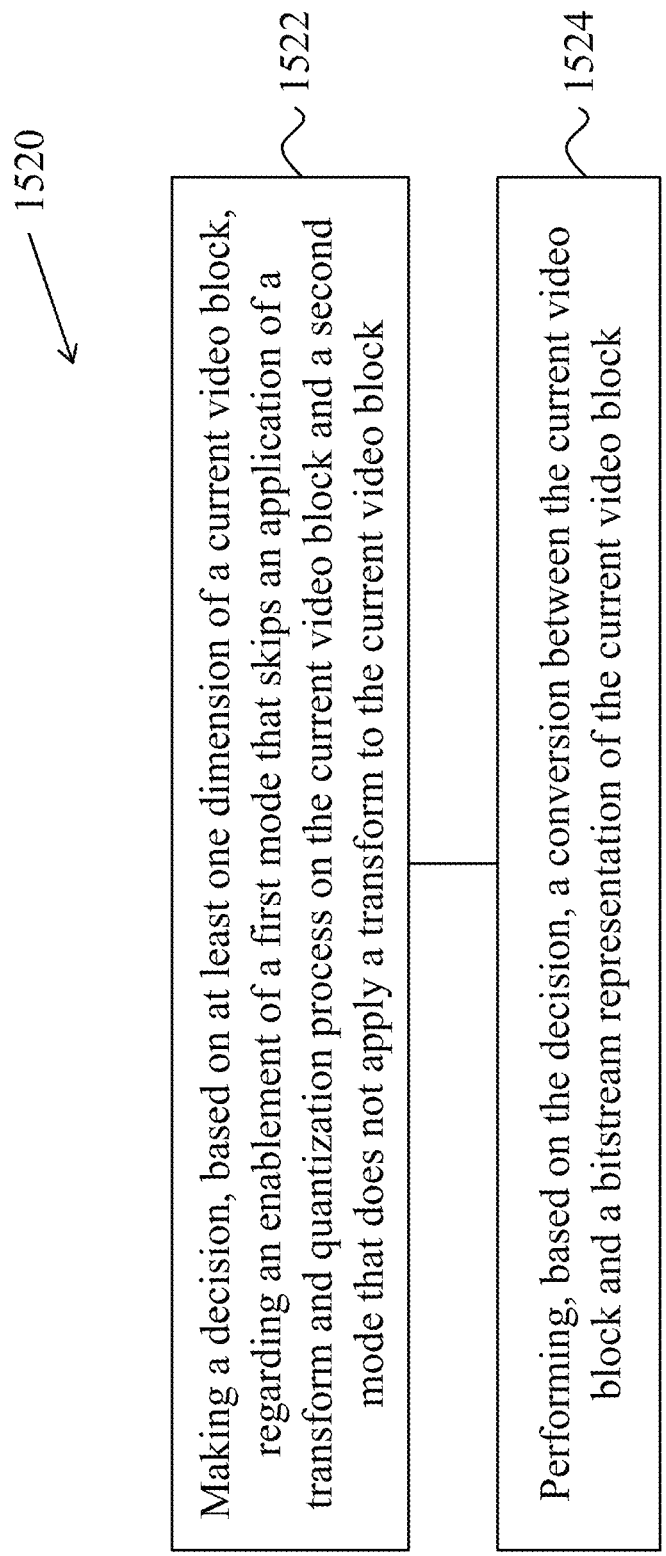

FIG. 15C shows a flowchart of an exemplary method for video processing. The method 1520 includes, at step 1522, making a decision, based on at least one dimension of a current video block, regarding an enablement of a first mode that skips an application of a transform and quantization process on the current video block and a second mode that does not apply a transform to the current video block.

The method 1520 includes, at step 1524, performing, based on the decision, a conversion between the current video block and a bitstream representation of the current video block. In some embodiments, the second mode is a transform skip (TS) mode. In other embodiments, the second mode is a quantized residual block differential pulse-code modulation (QR-BDPCM) mode.

In some embodiments, a maximum value or a minimum value of the at least one dimension of the current video block is signaled in a sequence parameter set (SPS), a video parameter set (VPS), a picture parameter set (PPS), a slice header, a tile group header or a tile header.

In some embodiments, an allowed value of the at least one dimension is identical for the first mode and the second mode. In an example, the second mode is one of a transform skip mode, a block differential pulse-code modulation (BDPCM) mode or a quantized residual BDPCM mode.

Figure 15D:
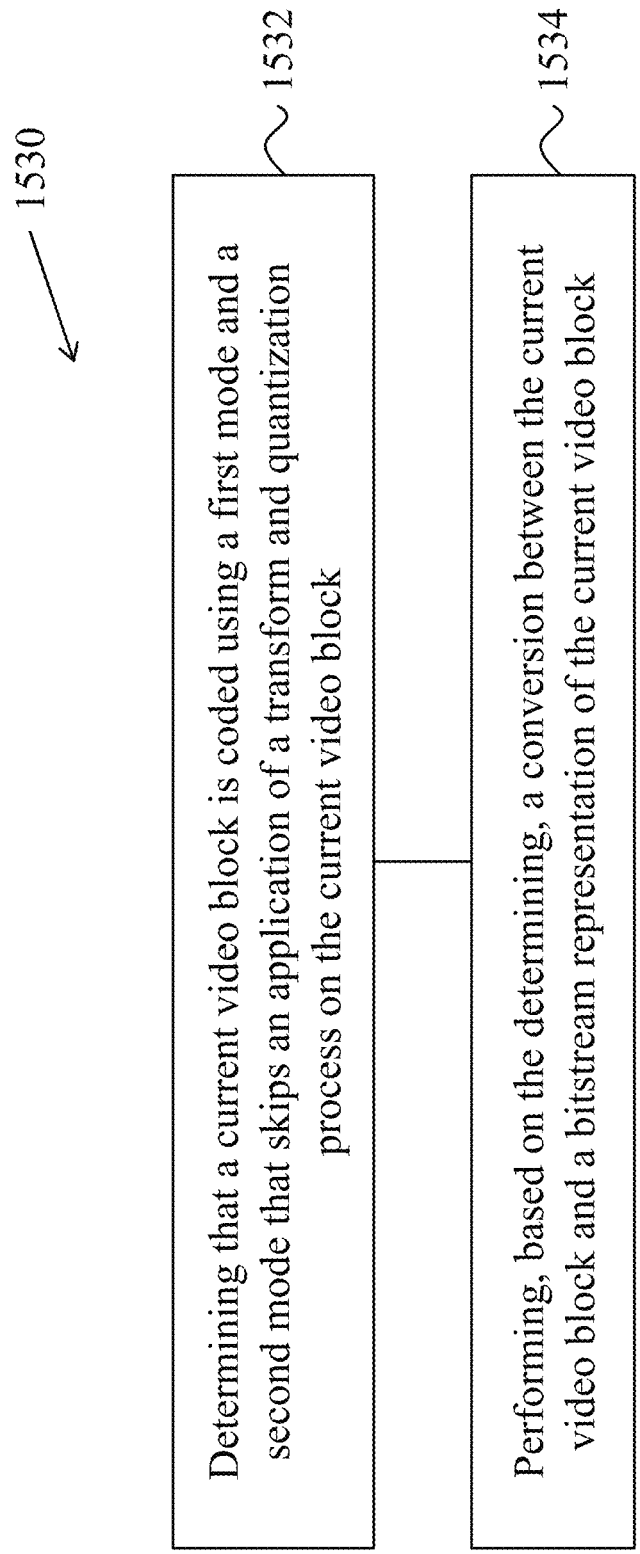

FIG. 15D shows a flowchart of an exemplary method for video processing. The method 1530 includes, at step 1532, determining that a current video block is coded using a first mode and a second mode that skips an application of a transform and quantization process on the current video block.

The method 1530 includes, at step 1534, performing, based on the determining, a conversion between the current video block and a bitstream representation of the current video block. In some embodiments, the current video block comprises a luma component and a chroma component, and wherein at least one of a reshaping of the luma component or a scaling of the chroma component is disabled.

In some embodiments, the first mode is an intra prediction mode. In other embodiments, the first mode is an intra block copy (IBC) mode. In yet other embodiments, the first mode is a combined inter-intra prediction (CIIP) mode. In an example, reference samples used in the first mode are mapped from a reshaped domain to an original domain.

In some embodiments, the current video block comprises a luma component and a chroma component, wherein the first mode does not apply a transform to the current video block, and wherein an application of a luma mapping with chroma scaling (LMCS) process is disabled for the current video block.

Figure 15E:
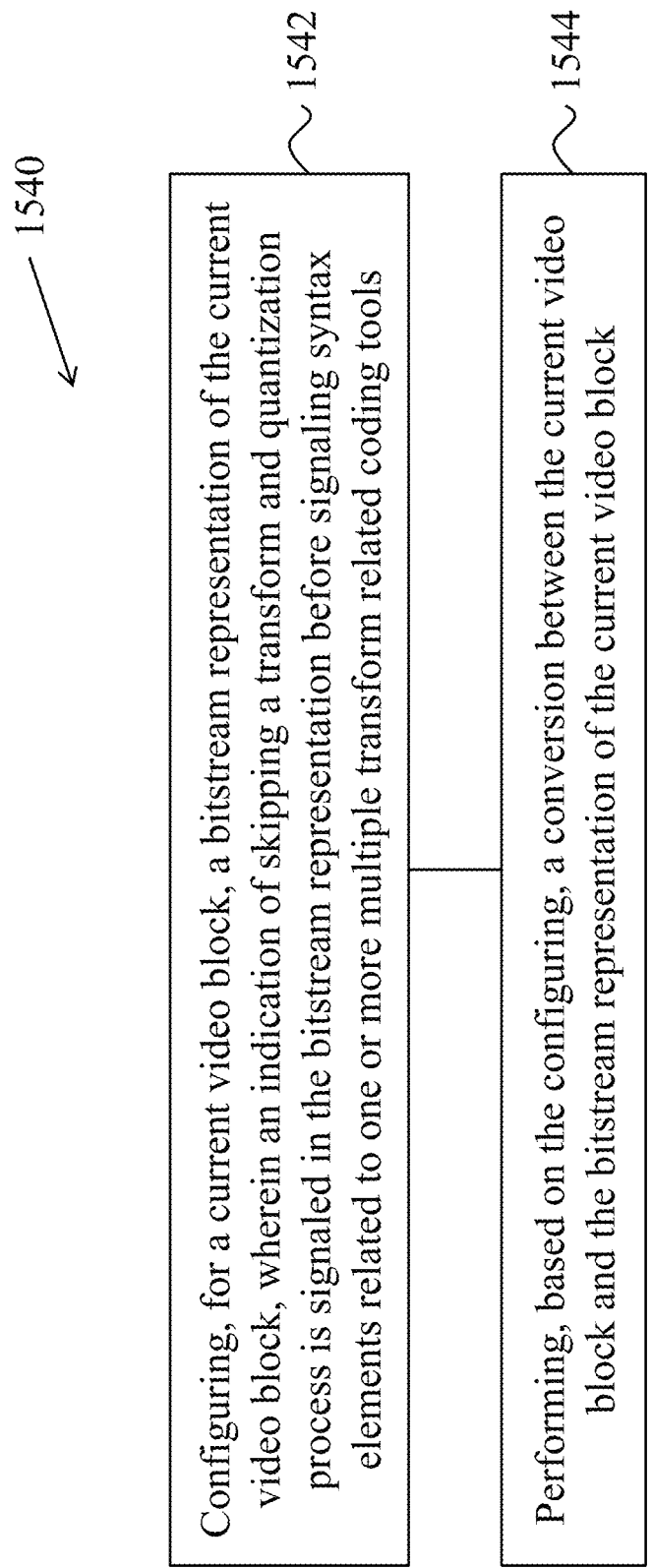

FIG. 15E shows a flowchart of an exemplary method for video processing. The method 1540 includes, at step 1542, configuring, for a current video block, a bitstream representation of the current video block, wherein an indication of skipping a transform and quantization process is signaled in the bitstream representation before signaling syntax elements related to one or more multiple transform related coding tools.

The method 1540 includes, at step 1544, performing, based on the configuring, a conversion between the current video block and the bitstream representation of the current video block. In some embodiments, the one or more multiple transform related coding tools include at least one of a transform skip mode, an explicit multiple transform set (MTS) scheme, a reduced secondary transform (RST) mode, a sub-block transform (SBT) mode or a quantized residual block differential pulse-code modulation (QR-BDPCM) mode.

Figure 15F:
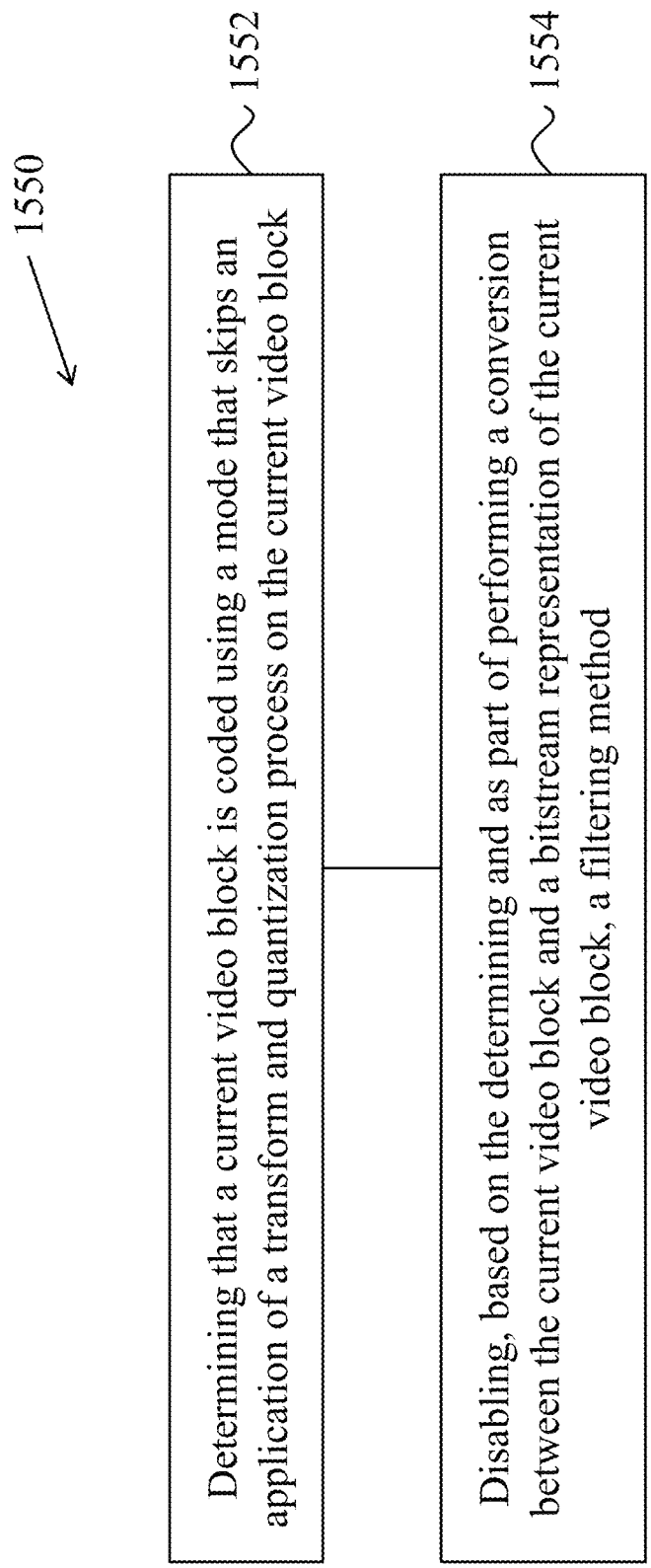

FIG. 15F shows a flowchart of an exemplary method for video processing. The method 1550 includes, at step 1552, determining that a current video block is coded using a mode that skips an application of a transform and quantization process on the current video block.

The method 1550 includes, at step 1554, disabling, based on the determining and as part of performing a conversion between the current video block and a bitstream representation of the current video block, a filtering method.

In some embodiments, the filtering method comprises an adaptive loop filtering (ALF) method or a nonlinear ALF method.

In some embodiments, the filtering method uses at least one of a bilateral filter, a diffusion filter or a post-reconstruction filter that modifies a reconstructed version of the current video block.

In some embodiments, the filtering method comprises a position dependent intra prediction combination (PDPC) method.

In some embodiments, the filtering method comprises a loop filtering method, and the method 1550 further includes the step of making a decision, prior to an application of the filtering method, regarding a selective application of an inverse reshaping process to a reconstructed version of the current video block.

Figure 15G:
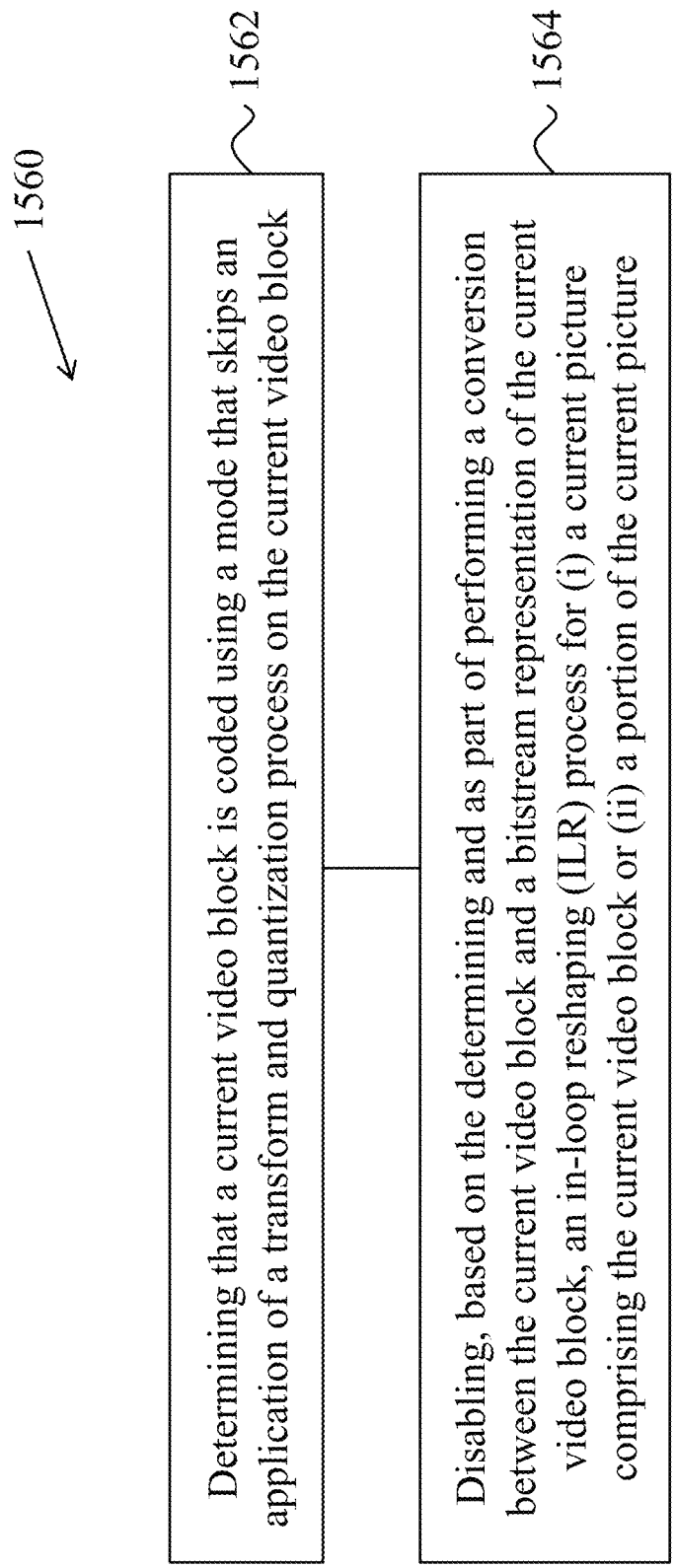

FIG. 15G shows a flowchart of an exemplary method for video processing. The method 1560 includes, at step 1562, determining that a current video block is coded using a mode that skips an application of a transform and quantization process on the current video block.

The method 1560 includes, at step 1564, disabling, based on the determining and as part of performing a conversion between the current video block and a bitstream representation of the current video block, an in-loop reshaping (ILR) process for (i) a current picture comprising the current video block or (ii) a portion of the current picture.

In some embodiments, the portion of the current picture is a coding unit (CU), a coding tree unit (CTU), a slice, a tile or a tile group.

In some embodiments, an indication of the disabling is signaled in a sequence parameter set (SPS), a video parameter set (VPS), a picture parameter set (PPS) or a slice header.

In some embodiments, the bitstream representation of the current video block excludes signaling of syntax elements related to the ILR process.

Yet another method for video processing includes configuring, for a current video block, a bitstream representation of the current video block, wherein an indication of skipping a transform and quantization process is selectively signaled in the bitstream representation after signaling one or more indications of quantization parameters; and performing, based on the configuring, a conversion between the current video block and the bitstream representation of the current video block.

In some embodiments, the indication of skipping the transform and quantization process is excluded from the bitstream representation when a delta of the quantization parameters is not equal to zero.

In some embodiments, selectively signaling the indication of skipping the transform and quantization process is based on the quantization parameters for a luma component of the current video block.

Yet another method for video processing includes configuring, for a current video block, a bitstream representation of the current video block, wherein an indication of an application of a coding tool to the current video block is signaled in the bitstream representation at a level of a video unit that is larger than a coding unit (CU), and performing, based on the configuring, a conversion between the current video block and the bitstream representation of the current video block, wherein performing the conversion comprises refraining from applying the coding tool to at least some samples of the current video block despite the indication of the application of the coding tool in the bitstream representation.

In some embodiments, the at least some samples are within a lossless coded block.

In some embodiments, the video unit comprises a sequence, a picture, a view, a slice, a tile, a brick, a subpicture, a coding tree block (CTB) or a coding tree unit (CTU).

In some embodiments, the coding tool comprises one or more of a filtering method, a scaling matrix or a decoder side derivation method.

In some embodiments, the filtering methods comprises at least one of an adaptive loop filter (ALF), a bilateral filter, a sample adaptive offset filter or a Hadamard transform domain filter.

5 Example Implementations of the Disclosed Technology

Figure 16:
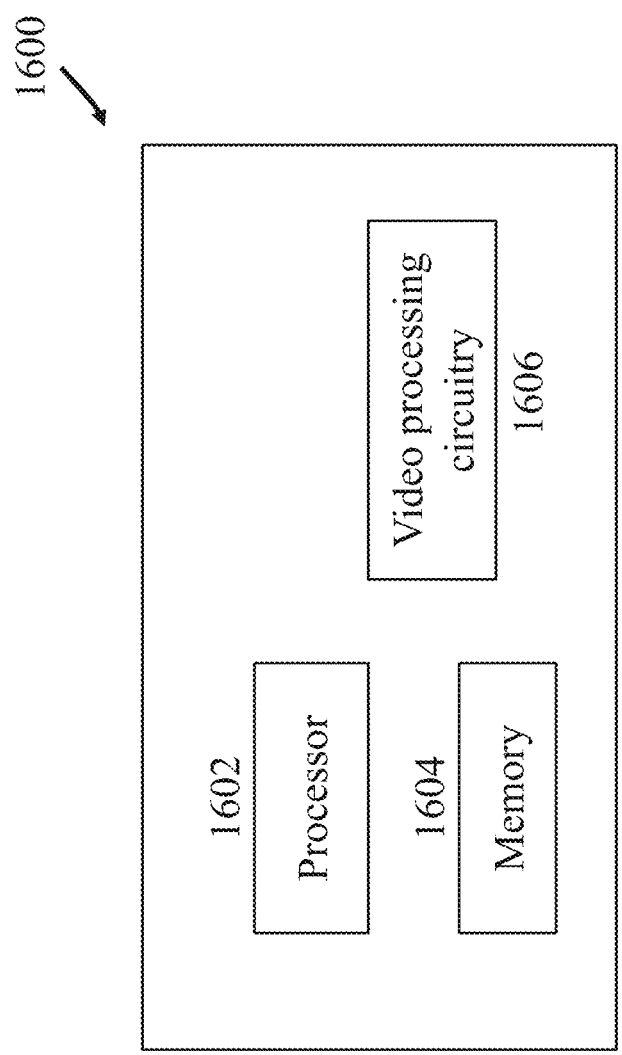
FIG. 16 is a block diagram of an example of a hardware platform for implementing a visual media decoding or a visual media encoding technique described in the present document.

FIG. 16 is a block diagram of a video processing apparatus 1600. The apparatus 1600 may be used to implement one or more of the methods described herein. The apparatus 1600 may be embodied in a smartphone, tablet, computer, Internet of Things (IoT) receiver, and so on. The apparatus 1600 may include one or more processors 1602, one or more memories 1604 and video processing hardware 1606. The processor(s) 1602 may be configured to implement one or more methods (including, but not limited to, methods 1500, 1510, 1520, 1530, 1540, 1550, 1560 and 2100-3800) described in the present document. The memory (memories) 1604 may be used for storing data and code used for implementing the methods and techniques described herein. The video processing hardware 1606 may be used to implement, in hardware circuitry, some techniques described in the present document.

In some embodiments, the video coding methods may be implemented using an apparatus that is implemented on a hardware platform as described with respect to FIG. 16.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

Figure 17:
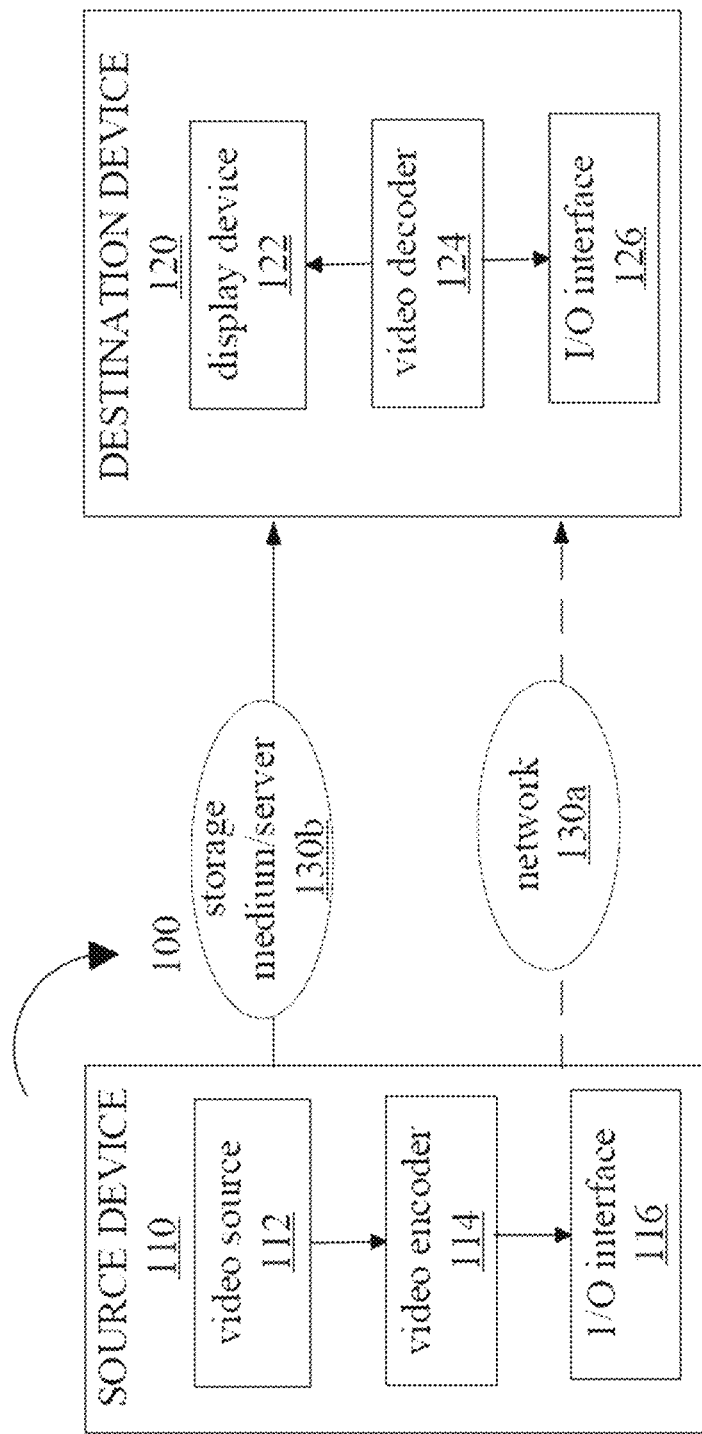
FIG. 17 is a block diagram that illustrates an example video coding system that may utilize the techniques of this disclosure.

FIG. 17 is a block diagram that illustrates an example video coding system 100 that may utilize the techniques of this disclosure. As shown in FIG. 17, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 18:
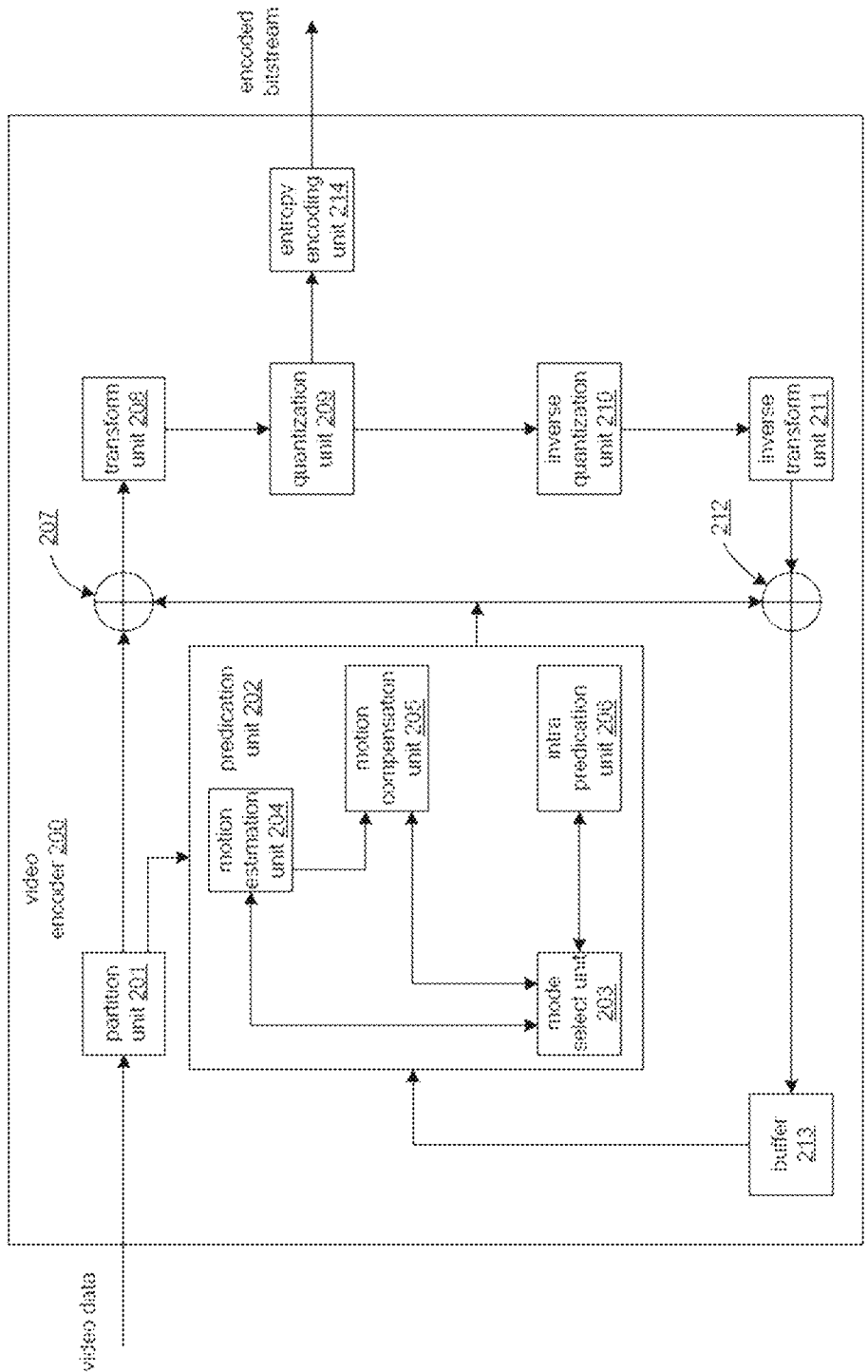
FIG. 18 is a block diagram illustrating an example of video encoder.

FIG. 18 is a block diagram illustrating an example of video encoder 200, which may be video encoder 114 in the system 100 illustrated in FIG. 17.

Video encoder 200 may be configured to perform any or all of the techniques of this disclosure. In the example of FIG. 18, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 18 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 19:
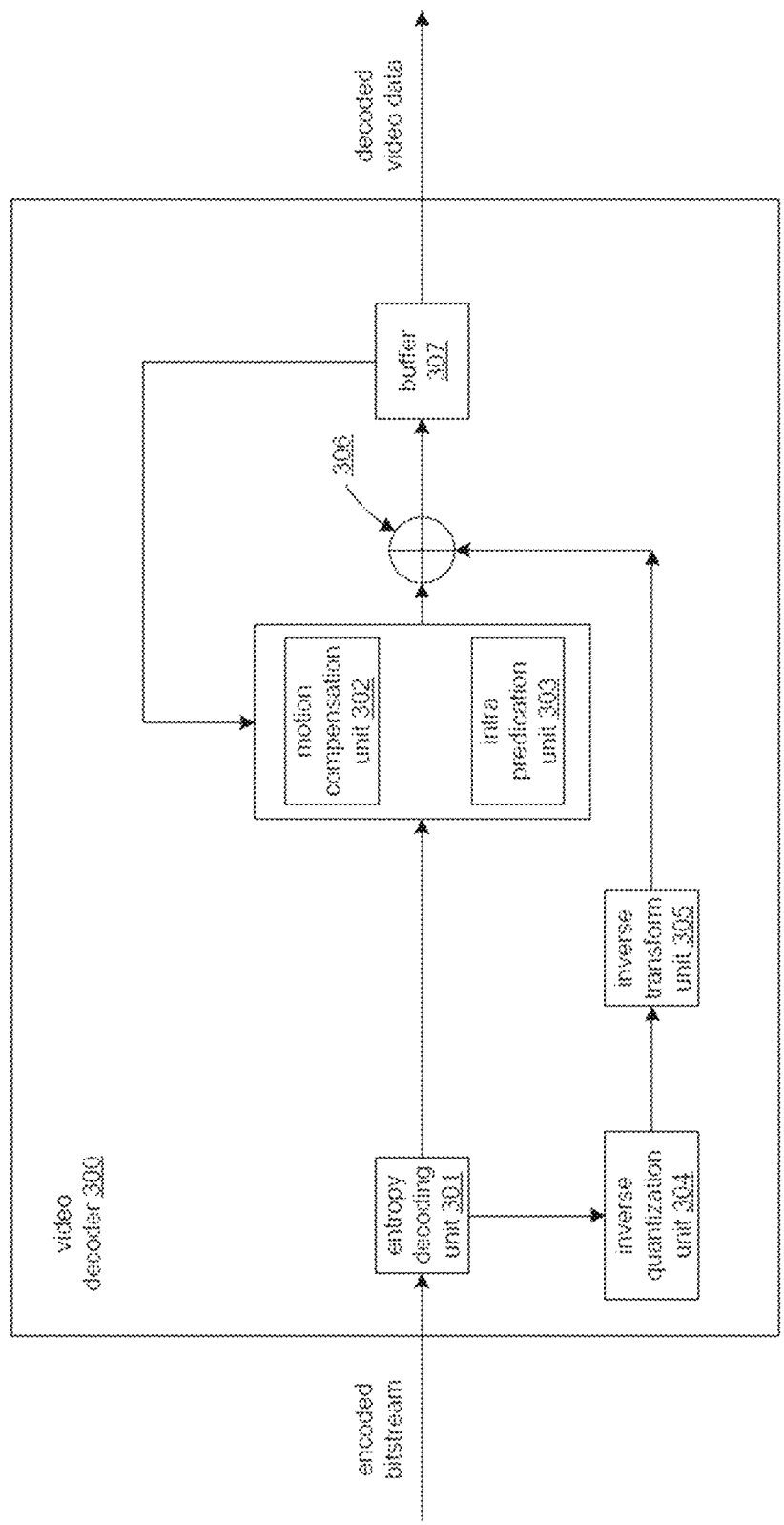
FIG. 19 is a block diagram illustrating an example of video decoder.

FIG. 19 is a block diagram illustrating an example of video decoder 300 which may be video decoder 114 in the system 100 illustrated in FIG. 17.

The video decoder 300 may be configured to perform any or all of the techniques of this disclosure. In the example of FIG. 19, the video decoder 300 includes a plurality of functional components. The techniques described in this disclosure may be shared among the various components of the video decoder 300. In some examples, a processor may be configured to perform any or all of the techniques described in this disclosure.

In the example of FIG. 19, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 18).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

Figure 20:
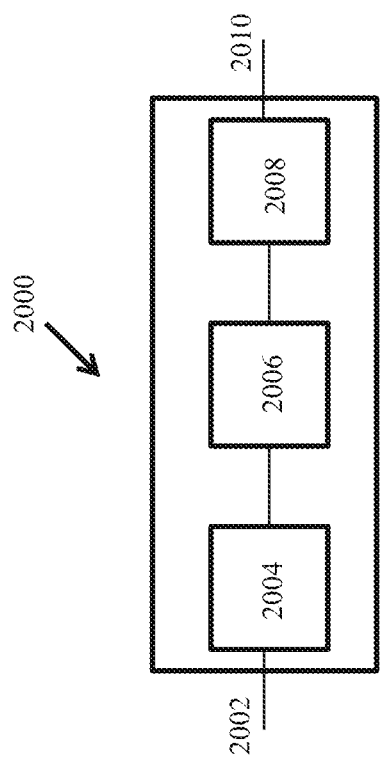
FIG. 20 is a block diagram showing an example video processing system in which various techniques disclosed herein may be implemented.

FIG. 20 is a block diagram showing an example video processing system 2000 in which various techniques disclosed herein may be implemented. Various implementations may include some or all of the components of the system 2000. The system 2000 may include input 2002 for receiving video content. The video content may be received in a raw or uncompressed format, e.g., 8 or 10 bit multi-component pixel values, or may be in a compressed or encoded format. The input 2002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2000 may include a coding component 2004 that may implement the various coding or encoding methods described in the present document. The coding component 2004 may reduce the average bitrate of video from the input 2002 to the output of the coding component 2004 to produce a coded representation of the video. The coding techniques are therefore sometimes called video compression or video transcoding techniques. The output of the coding component 2004 may be either stored, or transmitted via a communication connected, as represented by the component 2006. The stored or communicated bitstream (or coded) representation of the video received at the input 2002 may be used by the component 2008 for generating pixel values or displayable video that is sent to a display interface 2010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

FIG. 21 shows a flowchart of an exemplary method for video processing. The method 2100 includes performing 2102 a conversion between a video comprising multiple color components and a bitstream representation of the video, wherein the bitstream representation conforms to a rule that specifies that one or more syntax elements are included in the bitstream representation for two color components to indicate whether a transquant bypass mode is applicable for representing video blocks of the two color components in the bitstream representation, and wherein, when the transquant bypass mode is applicable to a video block, the video block is represented in the bitstream representation without use of a transform and quantization process or the video block is obtained from the bitstream representation without use of an inverse transform and inverse quantization process.

In some embodiments for method 2100, the one or more syntax elements that indicates whether the transquant bypass mode is applicable is denoted by one or more cu_transquant_bypass_flags. In some embodiments for method 2100, in response to a dual tree partitioning process being enabled for the two video blocks, a first cu_transquant_bypass_flag for a first video block of a luma component is coded separately from a second cu_transquant_bypass_flag for a second video block of at least one chroma component, and the video blocks comprise the first video block and the second video block. In some embodiments for method 2100, a usage of the one or more cu_transquant_bypass_flags is coded based on a context. In some embodiments for method 2100, the context is selected based on at least one of the multiple color components. In some embodiments for method 2100, one cu_transquant_bypass_flag from the one or more cu_transquant_bypass_flags is predictively coded using another cu_transquant_bypass_flag from the one or more cu_transquant_bypass_flags. In some embodiments for method 2100, a coding structure of the two video blocks determines whether one cu_transquant_bypass_flag is indicated in the bitstream representation for the multiple color components or whether a plurality of cu_transquant_bypass_flags are indicated in the bitstream representation for the multiple color components.

In some embodiments for method 2100, the coding structure includes a single tree coding structure or a dual tree coding structure. In some embodiments for method 2100, whether the transquant bypass mode is applicable to a first video block of a first color component is determined based on whether the transform and quantization process or whether the inverse transform and inverse quantization process is not used for samples located in a corresponding region of a second video block of a second color component, wherein the corresponding region of the second video block corresponds to a region of the first video block, and wherein the video blocks comprise the first video block and the second video block. In some embodiments for method 2100, a size of the corresponding region of the second video block and a coordinate of a top-left sample of the second video block of the second color component depends of a color format. In some embodiments for method 2100, the size of the corresponding region of the second video block is denoted by 2 W*2H and the coordinate of the top left sample is (2*x0, 2*y0) in response to the first video block having another size of W*H and another top-left sample located at (x0,y0) and in response to the color format being 4:2:0, wherein W denotes a width of the block associated with the first color component, and wherein H denotes a height of the block associated with the first color component.

In some embodiments for method 2100, the first color component is a chroma component. In some embodiments for method 2100, the chroma component is a blue-difference component or a red-difference component. In some embodiments for method 2100, the second color component is a luma component. In some embodiments for method 2100, the transform and quantization process or the inverse transform and inverse quantization process is not used for the first video block in response to all samples located in the corresponding region of the second video block either being coded without use of the transform and quantization process or being derived without use of the inverse transform and inverse quantization process. In some embodiments for method 2100, the transform and quantization process or the inverse transform and inverse quantization process is not used for the first video block of a first color component in response to at least one sample located in the corresponding region of the second video block of the second color component either being coded without use of the transform and quantization process or being derived without use of the inverse transform and inverse quantization process.

In some embodiments for method 2100, the bitstream representation excludes a cu_transquant_bypass_flag for the first video block or the second video block in response to the transform and quantization process or the inverse transform and inverse quantization process not being used for the first video block or the second video block. In some embodiments for method 2100, whether a side information of a usage of the transform and quantization process or the inverse transform and inverse quantization process is indicated in the bitstream representation for the first video block of the first color component is determined based on whether the transform and quantization process or the inverse transform and inverse quantization process is not used for one or more video blocks in the corresponding region of the second color component. In some embodiments for method 2100, the side information of the transform and quantization process or the inverse transform and inverse quantization process is indicated in the bitstream representation for the first video block of the first color component in response to the transform and quantization process or the inverse transform and inverse quantization process not being used for all of the one or more video blocks in the corresponding region of the second color component.

In some embodiments for method 2100, the side information of the transform and quantization process or the inverse transform and inverse quantization process is excluded from the bitstream representation for the first video block of the first color component in response to the transform and quantization process or the inverse transform and inverse quantization process not being used for only some of the one or more video blocks in the corresponding region of the second color component. In some embodiments for method 2100, the side information of the transform and quantization process or the inverse transform and inverse quantization process is indicated in the bitstream representation for the first video block of the first color component in response to the transform and quantization process or the inverse transform and inverse quantization process not being used for the one or more video blocks in the corresponding region of the second color component. In some embodiments for method 2100, the one or more video blocks includes a video block that covers a center position of the corresponding region of the second color component.

In some embodiments for method 2100, the side information of the transform and quantization process or the inverse transform and inverse quantization process is excluded from the bitstream representation for the first video block of the first color component in response to the transform and quantization process or the inverse transform and inverse quantization process not being used for the one or more video blocks in the corresponding region of the second color component. In some embodiments for method 2100, a dual tree coding structure is enabled for the first video block and the second video block. In some embodiments for method 2100, the multiple color components comprises a luma component and a plurality of chroma component, wherein a first syntax element for at least one chroma component of the plurality of chroma component is based on a second syntax for the luma component, and wherein the one or more syntax elements that indicate whether the transquant bypass mode is applicable includes the first syntax element and the second syntax element. In some embodiments for method 2100, transform and quantization process or the inverse transform and inverse quantization process is not used on a video block of the at least one chroma component in response to the transform and quantization process or the inverse transform and inverse quantization process not being used for one or more video blocks associated with the luma component, and wherein at least one video block associated with the luma component corresponds to the video block associated with the at least one chroma component.

In some embodiments for method 2100, the one or more video blocks of the luma component comprises coding units (CU), a prediction unit (PU), or a transform unit (TU). In some embodiments for method 2100, the transform and quantization process or the inverse transform and inverse quantization process is not used on all of the one or more video blocks of the luma component. In some embodiments for method 2100, a video block of the at least one chroma component is divided into sub-blocks, wherein the transform and quantization process or the inverse transform and inverse quantization process is not used for a sub-block from the sub-blocks in response to the transform and quantization process or the inverse transform and inverse quantization process not being used for all of one or more video blocks of the luma component, and wherein the one or more video blocks associated with the luma component corresponds to the sub-block associated with the at least one chroma component.

Figure 22:
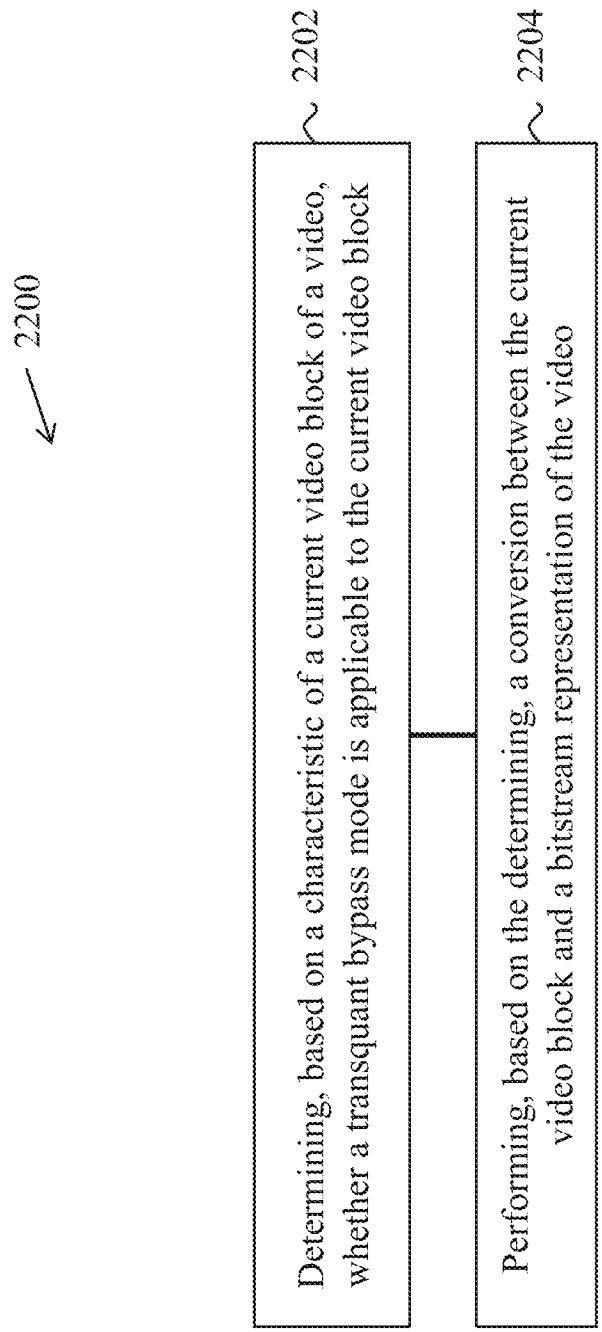

FIG. 22 shows a flowchart of an exemplary method for video processing. The method 2200 includes determining 2202, based on a characteristic of a current video block of a video, whether a transquant bypass mode is applicable to the current video block, where, when the transquant bypass mode is applicable to the current video block, the current video block is represented in the bitstream representation without use of a transform and quantization process or the current block is obtained from the bitstream representation without use of an inverse transform and inverse quantization process; and performing 2204, based on the determining, a conversion between the current video block and a bitstream representation of the video.

In some embodiments for method 2200, the characteristic is a first size of the current video block, wherein the transquant bypass mode is applicable to the current video block in response to the first size of the current video block being larger than a second size of a virtual pipelining data unit (VPDU). In some embodiments for method 2200, a height or a width of the current video block is greater than a height or a width of the VPDU, respectively. In some embodiments for method 2200, a height and a width of the current video block are greater than a height and a width of the VPDU, respectively. In some embodiments for method 2200, a syntax element that indicates that the transform and quantization process or the inverse transform and inverse quantization process is not used for the current video block is included in the bitstream representation. In some embodiments for method 2200, the method further comprises splitting the current video block into multiple VPDUs in response to a size of the coding tree unit (CTUs) of the current video block being greater than the second size of the VPDU. In some embodiments for method 2200, wherein a size of the coding tree unit (CTUs) of the current video block is greater than the second size of the VPDU, wherein the current video block is not split into multiple VPDUs, wherein the transquant bypass mode in which the transform and quantization process or the inverse transform and inverse quantization process is not used for the current video block is applicable to the current video block, and wherein a syntax element that indicates that the transform and quantization process or the inverse transform and inverse quantization process is not used is not included in the bitstream representation.

In some embodiments for method 2200, an intra prediction mode is allowed for the CTUs of the current video block. In some embodiments for method 2200, the characteristic is a first size of the current video block, wherein the transquant bypass mode is applicable to the current video block in response to the first size of the current video block being larger than a second size of a maximum allowed transform block. In some embodiments for method 2200, a height or a width of the current video block is greater than a dimension of the maximum allowed transform block. In some embodiments for method 2200, a height and a width of the current video block are greater than a dimension of the maximum allowed transform block. In some embodiments for method 2200, a syntax element that indicates that the transform and quantization process or the inverse transform and inverse quantization process is not used for the current video block is included in the bitstream representation. In some embodiments for method 2200, the method further comprises splitting the current video block into multiple maximum allowed transform blocks in response to a size of the coding tree unit (CTUs) of the current video block being greater than the second size of the maximum allowed transform block.

In some embodiments for method 2200, wherein a size of the coding tree unit (CTUs) of the current video block is greater than the second size of the maximum allowed transform block, wherein the current video block is not split into multiple maximum allowed transform blocks, wherein the transform and quantization process or the inverse transform and inverse quantization process is not used for the current video block, and wherein a syntax element that indicates that the transform and quantization process or the inverse transform and inverse quantization process is not used is not included in the bitstream representation. In some embodiments for method 2200, an intra prediction mode is allowed for the CTUs of the current video block. In some embodiments for method 2200, a coding mode that does not apply a transform to the current video block is enabled in response to a first size of the current video block being larger than a second size of a virtual pipelining data unit (VPDU).

In some embodiments for method 2200, a height or a width of the current video block is greater than a height or a width of the VPDU, respectively. In some embodiments for method 2200, a height and a width of the current video block are greater than a height and a width of the VPDU, respectively. In some embodiments for method 2200, a syntax element that indicates that the coding mode does not apply a transform for the current video block is included in the bitstream representation. In some embodiments for method 2200, the method further comprises splitting the current video block into multiple VPDUs in response to a size of the coding tree unit (CTUs) of the current video block being greater than the second size of the VPDU. In some embodiments for method 2200, wherein a size of the coding tree unit (CTUs) of the current video block is greater than the second size of the VPDU, wherein the current video block is not split into multiple VPDUs, wherein the transform is not applied to the current video block, and wherein a syntax element that indicates that the coding mode does not apply the transform to the current video block is not included in the bitstream representation.

In some embodiments for method 2200, an intra prediction mode is allowed for the CTUs of the current video block. In some embodiments for method 2200, a coding mode that does not apply a transform to the current video block is enabled in response to a first size of the current video block being larger than a second size of a maximum allowed transform block. In some embodiments for method 2200, a height or a width of the current video block is greater than a dimension of the maximum allowed transform block. In some embodiments for method 2200, a height and a width of the current video block are greater than a dimension of the maximum allowed transform block. In some embodiments for method 2200, a syntax element that indicates that the coding mode does not apply a transform for the current video block is included in the bitstream representation. In some embodiments for method 2200, the method further comprises splitting the current video block into multiple maximum allowed transform blocks in response to a size of the coding tree unit (CTUs) of the current video block being greater than the second size of the maximum allowed transform block.

In some embodiments for method 2200, wherein a size of the coding tree unit (CTUs) of the current video block is greater than the second size of the maximum allowed transform block, wherein the current video block is not split into multiple maximum allowed transform blocks, wherein the transform and quantization process or the inverse transform and inverse quantization process is not used for the current video block, and wherein a syntax element that indicates that the coding mode does not apply a transform for the current video block is not included in the bitstream representation. In some embodiments for method 2200, an intra prediction mode is allowed for the CTUs of the current video block. In some embodiments for method 2200, the coding mode is a transform skip mode, a differential pulse-code modulation (DPCM) mode or a quantized residual DPCM (QR-DPCM) mode, and wherein, in the QR-DPCM mode a difference between a quantized residual of an intra prediction of the current video block and a prediction of the quantized residual is represented in the bitstream representation for the current video block using a differential pulse coding modulation (DPCM) representation.

Figure 23:
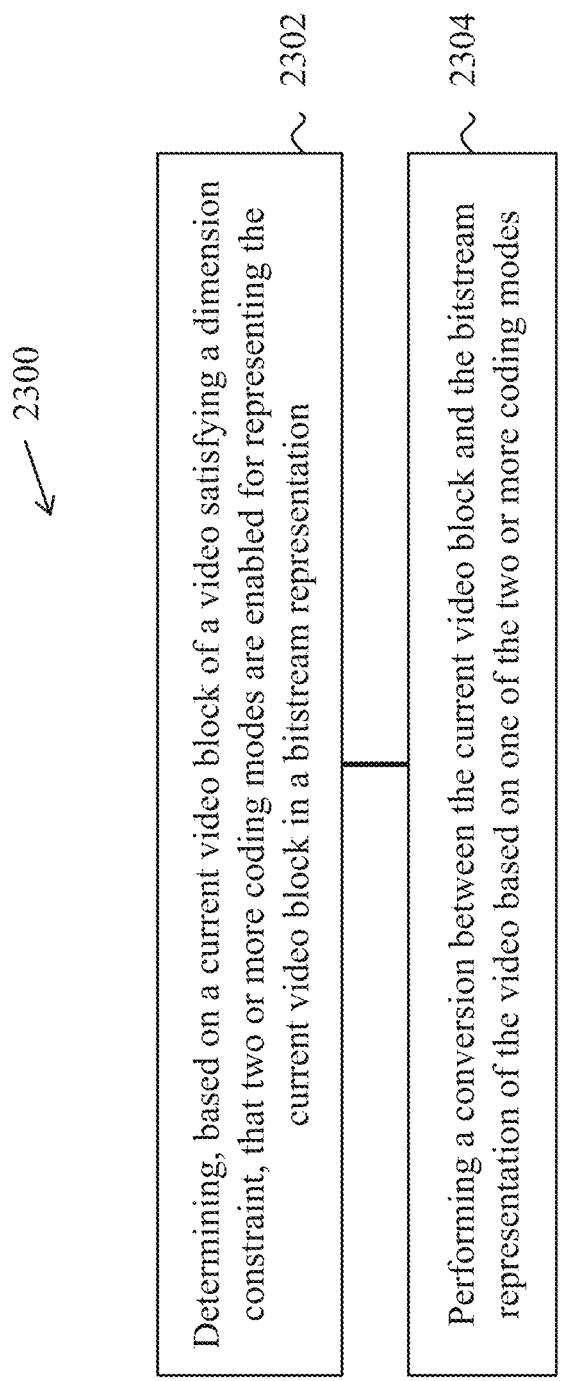

FIG. 23 shows a flowchart of an exemplary method for video processing. The method 2300 includes determining 2302, based on a current video block of a video satisfying a dimension constraint, that two or more coding modes are enabled for representing the current video block in a bitstream representation, wherein the dimension constraint states that a same set of allowed dimensions for the current video block is disabled for the two or more coding modes, and wherein, for an encoding operation, the two or more coding modes represent the current video block in the bitstream representation without using a transform operation on the current video block, or wherein, for a decoding operation, the two or more coding modes are used to obtain the current video block from the bitstream representation without using an inverse transform operation; and performing 2304 a conversion between the current video block and the bitstream representation of the video based on one of the two or more coding modes.

In some embodiments for method 2300, wherein the two or more coding modes include any two or more of a transform skip (TS) mode, a transquant bypass mode, a block differential pulse-code modulation (BDPCM) mode, and a quantized residual BDPCM (QR-BDPCM) mode, wherein, in the transquant bypass mode, during an encoding operation, a transform and quantization process is not applied to the current video block, wherein, in the transquant bypass mode, during a decoding operation, an inverse transform and inverse quantization process is not applied to obtain the current video block, and wherein, in the QR-BDPCM mode, a difference between a quantized residual of an intra prediction of the current video block and a prediction of the quantized residual is represented in the bitstream representation. In some embodiments for method 2300, a single syntax element that indicates an allowed maximum value and/or an allowed minimum value of dimensions for the two or more coding modes is signaled in the bitstream representation. In some embodiments for method 2300, a syntax element that indicates an allowed maximum value and/or an allowed minimum value of dimensions for the two or more coding modes is signaled in the bitstream representation in response to one of the two or more coding modes being enabled, and wherein the one coding mode does not rely on a non-identity transform.

In some embodiments for method 2300, the syntax element is a log 2_transform_skip_max_size_minus2 value. In some embodiments for method 2300, the one coding mode is a transform skip (TS) mode, transquant bypass mode, or a QR-BDPCM mode. In some embodiments for method 2300, the one coding mode is enabled at a level which is not a coding unit level. In some embodiments for method 2300, the one coding mode includes a transform skip (TS) mode or a quantized residual block differential pulse-code modulation (QR-BDPCM) mode, and wherein the syntax element is included in a log 2_transform_skip_max_size_minus2 value in response to either the TS mode or the QR-BDPCM mode being enabled.

In some embodiments for method 2300, the one coding mode includes a transform skip (TS) mode or a transquant bypass mode, and wherein the syntax element is included in a log 2_transform_skip_max_size_minus2 value in response to either enabling the TS mode or the transquant bypass mode. In some embodiments for method 2300, a coding mode that is enabled from the two or more coding modes, and wherein an indication of a usage of the coding mode is included in the bitstream representation. In some embodiments for method 2300, the method further comprises determining, based on the current video block of the video not satisfying the dimension constraint, that the two or more coding modes are not enabled for the current video block. In some embodiments for method 2300, an indication of a usage of a coding mode from the two or more coding modes is not included in the bitstream representation in response to the coding mode not being enabled for the current video block.

Figure 24:
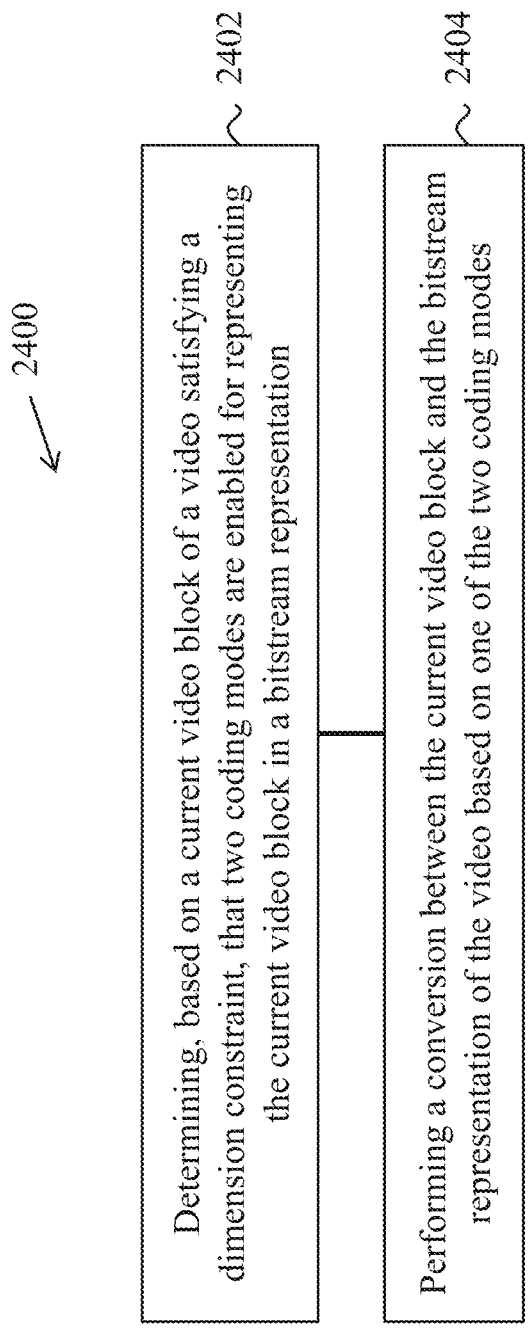

FIG. 24 shows a flowchart of an exemplary method for video processing. The method 2400 includes determining 2402, based on a current video block of a video satisfying a dimension constraint, that two coding modes are enabled for representing the current video block in a bitstream representation, wherein the dimension constraint states that a same set of allowed dimensions are used for enabling the two coding modes, and wherein, for an encoding operation, the two coding modes represent the current video block in the bitstream representation without using a transform operation on the current video block, or wherein, for a decoding operation, the two coding modes are used to obtain the current video block from the bitstream representation without using an inverse transform operation; and performing 2404 a conversion between the current video block and the bitstream representation of the video based on one of the two coding modes.

In some embodiments for method 2400, wherein the two coding modes includes a transquant bypass mode and a transform skip (TS) mode, wherein, in the transquant bypass mode, during an encoding operation, a transform and quantization process is not applied to the current video block, and wherein, in the transquant bypass mode, during a decoding operation, an inverse transform and inverse quantization process is not applied to obtain the current video block. In some embodiments for method 2400, wherein the two coding modes includes a transquant bypass mode and a quantized residual block differential pulse-code modulation (QR-BDPCM) mode, wherein, in the transquant bypass mode, during an encoding operation, a transform and quantization process is not applied to the current video block, wherein, in the transquant bypass mode, during a decoding operation, an inverse transform and inverse quantization process is not applied to obtain the current video block, and wherein, in the QR-BDPCM mode, a difference between a quantized residual of an intra prediction of the current video block and a prediction of the quantized residual is represented in the bitstream representation. In some embodiments for method 2400, a set of dimensions for enabling the TS mode are different from that associated with the QR-BDPCM mode. In some embodiments for method 2400, the QR-BDPCM mode is enabled for a video unit of the video when the TS mode is disallowed or disabled for the video unit.

In some embodiments for method 2400, the two coding modes includes a quantized residual block differential pulse-code modulation (QR-BDPCM) mode and a transform skip (TS) mode. In some embodiments for method 2400, whether to enable the QR-BDPCM mode that does not apply the transform to the current video block is based on whether a transform skip (TS) mode is enabled for the current video block or based on whether the transquant bypass mode is enabled in which the transform and quantization process or the inverse transform and inverse quantization process is not used for the current video block. In some embodiments for method 2400, the method further comprises performing a determination whether the bitstream representation includes, for a current video unit of the video, a syntax element that indicates whether the QR-BDPCM mode is enabled, and wherein the performing the determination is based on whether the TS mode is enabled or whether the transquant bypass mode is enabled for the current video block.

In some embodiments for method 2400, the current video unit includes a sequence, a transform unit (TU), a prediction unit (PU), a coding unit (CU), a picture, or a slice of the current video block. In some embodiments for method 2400, the QR-BDPCM mode that does not apply the transform to the current video block is enabled in response to the transquant bypass mode being enabled and in response to the TS mode being disabled for the current video block. In some embodiments for method 2400, an allowed maximum value or an allowed minimum value of dimensions for the two coding modes is signaled in a sequence, a view, a picture, a slice, a tile group, a tile, a coding tree unit (CTU), or video units level in the bitstream representation. In some embodiments for method 2400, the allowed maximum value or the allowed minimum value of the dimensions for the two coding modes is signaled in a sequence parameter set (SPS), a video parameter set (VPS), a picture parameter set (PPS), a slice header, a tile group header or a tile header in the bitstream representation. In some embodiments for method 2400, for the two coding modes which are enabled for the current video block, an indication of a usage of the two coding methods are present in the bitstream representation.

In some embodiments for method 2400, the method further comprises determining, based on the current video block of the video not satisfying a dimension constraint, that the two coding modes are not enabled for the current video block. In some embodiments for method 2400, an indication of a usage of the two coding modes is not included in the bitstream representation in response to the two coding modes not being enabled for the current video block.

Figure 25:
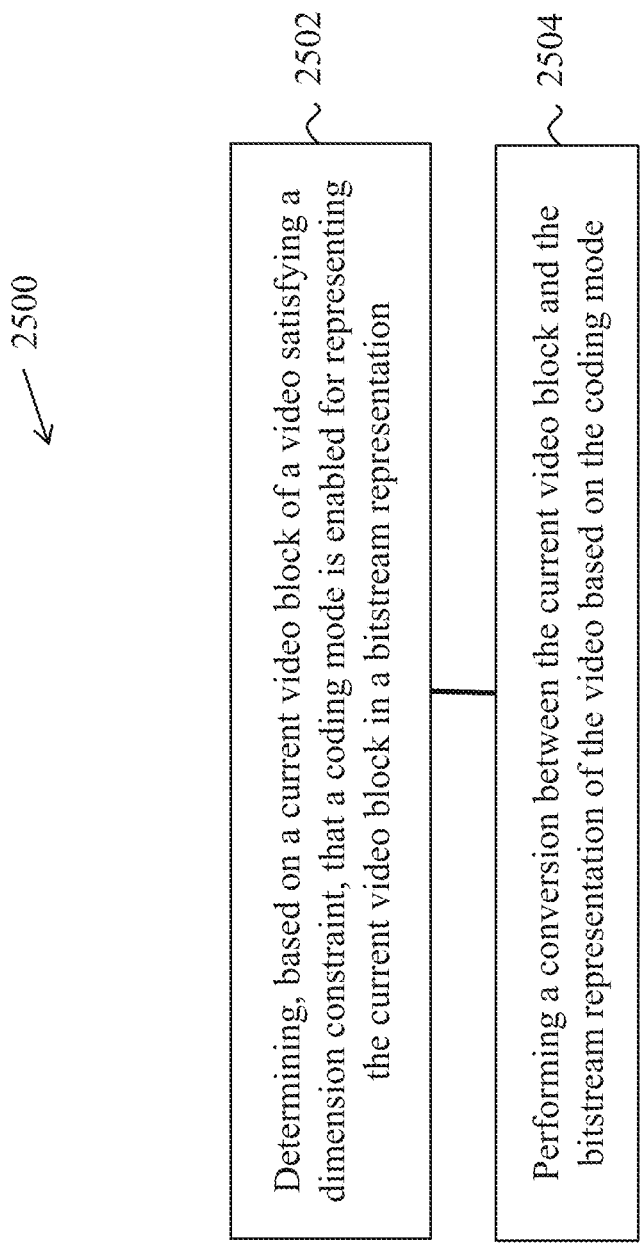

FIG. 25 shows a flowchart of an exemplary method for video processing. The method 2500 includes determining 2502, based on a current video block of a video satisfying a dimension constraint, that a coding mode is enabled for representing the current video block in a bitstream representation, wherein, during an encoding operation, the coding mode represents the current video block in the bitstream representation without using a transform operation on the current video block, or wherein, during an decoding operation, the current video block is obtained from the bitstream representation without using an inverse transform operation, and wherein the dimension constraint states that a first maximum transform block size for the current video block for which the transform operation or the inverse transform operation is not applied using the coding mode is different from a second maximum transform block size for the current video block for which the transform operation or the inverse transform operation is applied using another coding modes; and performing 2504 a conversion between the current video block and the bitstream representation of the video based on the coding mode.

In some embodiments for method 2500, wherein the coding mode include a transform skip (TS) mode, a transquant bypass mode, a quantized residual block differential pulse-code modulation (QR-BDPCM) mode, or a block differential pulse-code modulation (BDPCM) mode, wherein, in the transquant bypass mode, during an encoding operation, a transform and quantization process is not applied to the current video block, wherein, in the transquant bypass mode, during a decoding operation, an inverse transform and inverse quantization process is not applied to obtain the current video block, and wherein, in the QR-BDPCM mode, a difference between a quantized residual of an intra prediction of the current video block and a prediction of the quantized residual is represented in the bitstream representation.

FIG. 26 shows a flowchart of an exemplary method for video processing. The method 2600 includes performing 2602 a conversion between a current video block of a video and a bitstream representation of the video, wherein the current video block is coded in the bitstream representation using a quantized residual block differential pulse-code modulation (QR-BDPCM) mode in which a difference between a quantized residual of an intra prediction of the current video block and a prediction of the quantized residual is represented in the bitstream representation, wherein the bitstream representation conforms to a format rule that specifies whether the bitstream representation includes a side information of QR-BDPCM mode and/or a syntax element indicating applicability of a transform skip (TS) mode to the current video block, and wherein the side information includes at least one of an indication of usage of the QR-BDPCM mode or a prediction direction of the QR-BDPCM mode.

In some embodiments for method 2600, the TS mode is applied to the current video block in response to the QR-BDPCM mode being used for the current video block. In some embodiments for method 2600, the syntax element is not present in the bitstream and derived to be applying the TS mode to the current video block. In some embodiments for method 2600, the format rule specifies that the side information is included in the bitstream representation after the syntax element. In some embodiments for method 2600, the syntax element indicates that the TS mode is applied to the current video block. In some embodiments for method 2600, the format rule specifies that the side information of the QR-BDPCM mode is included in the bitstream representation in response to the TS mode being applied to the current video block. In some embodiments for method 2600, the format rule specifies that the side information of the QR-BDPCM mode is not included in the bitstream representation in response to the TS mode not applied for the current video block.

In some embodiments for method 2600, the format rule specifies that the side information of the QR-BDPCM mode is included in the bitstream representation in response to the TS mode not applied to for the current video block. In some embodiments for method 2600, the format rule specifies that the side information of the QR-BDPCM mode is not included in the bitstream representation in response to the TS mode applied to the current video block.

Figure 27:
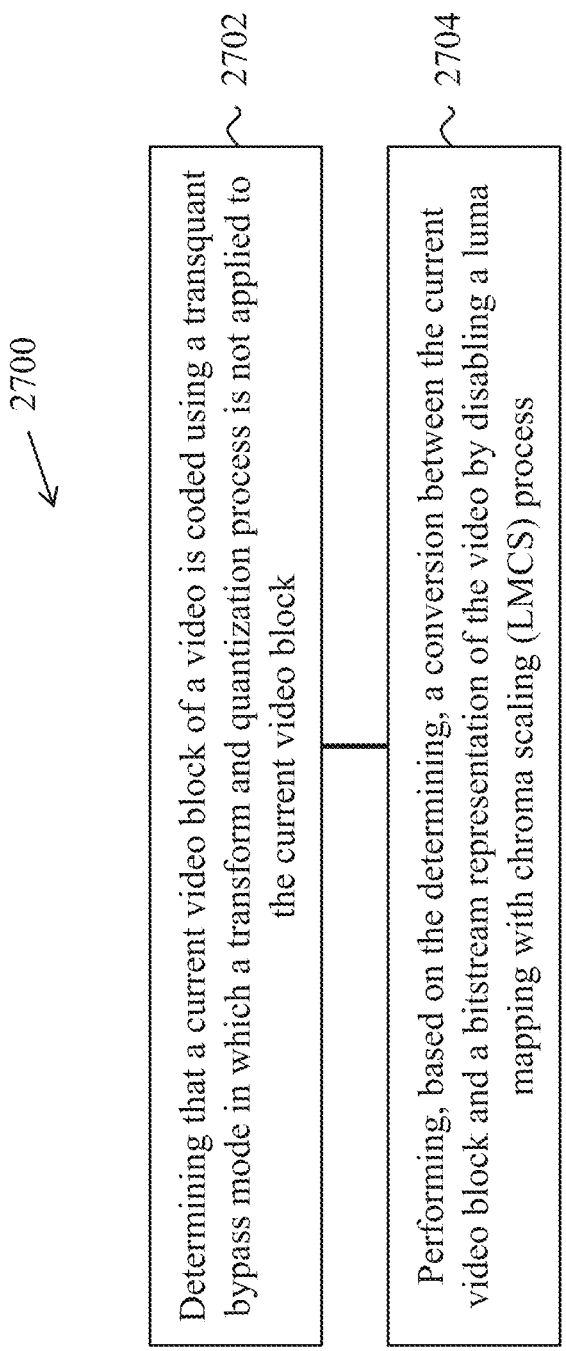

FIG. 27 shows a flowchart of an exemplary method for video processing. The method 2700 includes determining 2702 that a current video block of a video is coded using a transquant bypass mode in which a transform and quantization process is not applied to the current video block; and performing 2704, based on the determining, a conversion between the current video block and a bitstream representation of the video by disabling a luma mapping with chroma scaling (LMCS) process, wherein the disabling the LMCS process disables a performance of switching between samples a reshaped domain and an original domain for the current video block in case that the current video block is from a luma component, or wherein the disabling the LMCS process disables a scaling of a chroma residual of the current video block in case that the current video block is from a chroma component.

In some embodiments for method 2700, wherein an intra prediction mode is applied to the current video block, and wherein a prediction signal or reference samples used in the intra prediction mode for the current video block is mapped from a reshaped domain to an original domain. In some embodiments for method 2700, wherein an intra block copy (IBC) mode is applied to the current video block, and wherein a prediction signal or reference samples used in the IBC mode for the current video block is mapped from a reshaped domain to an original domain. In some embodiments for method 2700, wherein a combined inter-intra prediction (CIIP) mode is applied to the current video block, and wherein a prediction signal or reference samples used in the CIIP mode for the current video block is mapped from a reshaped domain to an original domain. In some embodiments for method 2700, wherein a combined inter-intra prediction (CIIP) mode is applied to the current video block, and wherein a mapping of a prediction signal used in the CIIP mode for the current video block from an original domain to a reshaped domain is not performed.

In some embodiments for method 2700, the method further comprises generating, in a palette mode and in an original domain, a palette table for the current video block. In some embodiments for method 2700, the method further comprises allocating a first buffer and a second buffer to the current video block, wherein the first buffer is configured to store a summation of a prediction signal and a residual signal, and wherein the second buffer is configured to store a reshaped summation that is obtained by mapping the summation of the prediction signal and the residual signal from an original domain to a reshaped domain.

In some embodiments for method 2700, the method further comprises allocating, to the current video block, a buffer that is configured to store a summation of a prediction signal and a residual signal in an original domain, wherein a reshaped summation is derived by mapping the summation of the prediction signal and the residual signal from the original domain to a reshaped domain. In some embodiments for method 2700, the method further comprises applying, to the current video block, a coding mode that uses reference samples within a current title, a slice, a tile group, or a picture of the current video block.

Figure 28:
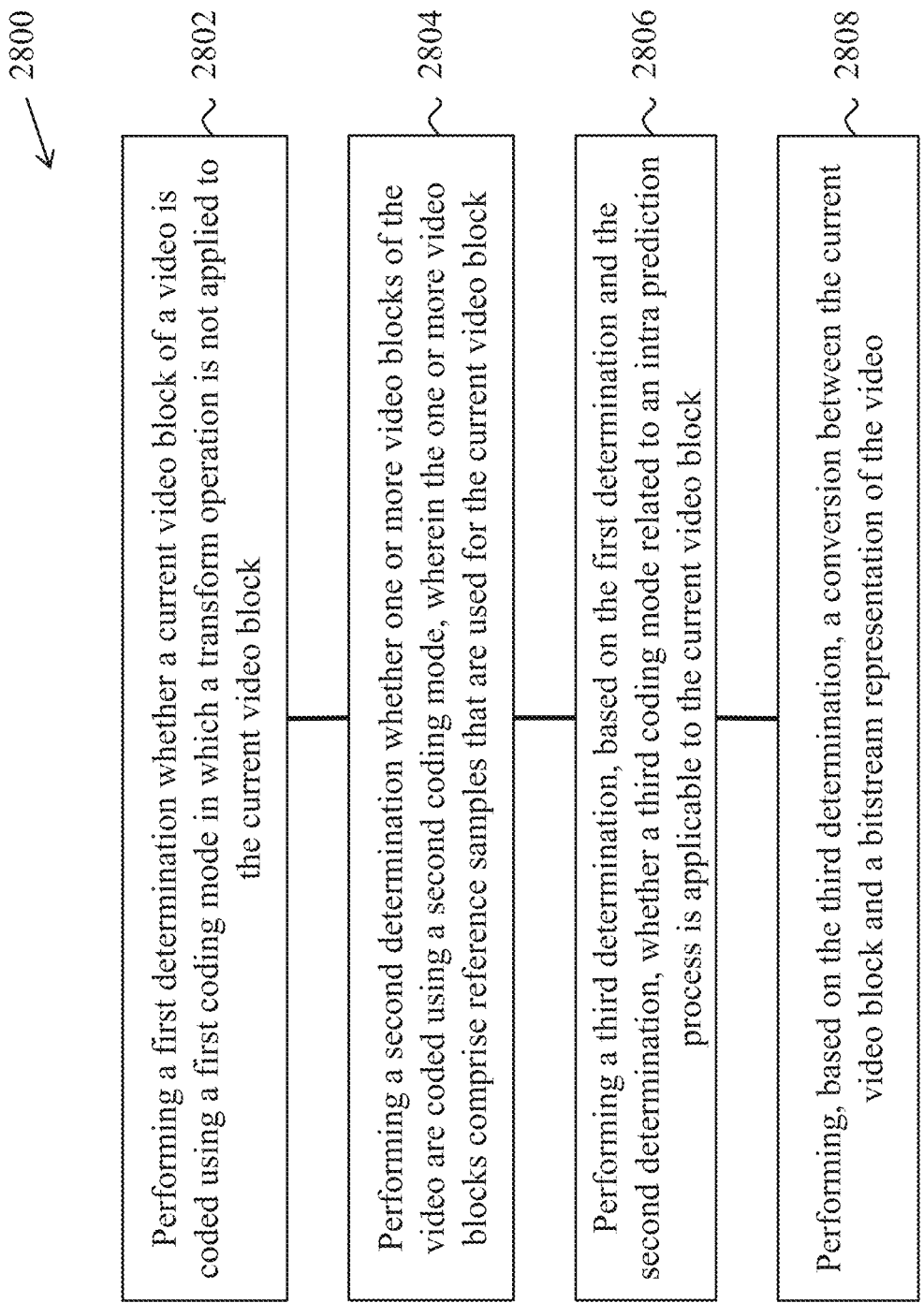

FIG. 28 shows a flowchart of an exemplary method for video processing. The method 2800 includes performing 2802 a first determination whether a current video block of a video is coded using a first coding mode in which a transform operation is not applied to the current video block; performing 2804 a second determination whether one or more video blocks of the video are coded using a second coding mode, wherein the one or more video blocks comprise reference samples that are used for the current video block; performing 2806 a third determination, based on the first determination and the second determination, whether a third coding mode related to an intra prediction process is applicable to the current video block; and performing 2808, based on the third determination, a conversion between the current video block and a bitstream representation of the video.

In some embodiments for method 2800, wherein the second coding mode includes a transquant bypass mode, a transform skip (TS) mode, a quantized residual block differential pulse-code modulation (QR-BDPCM) mode, a block differential pulse-code modulation (BDPCM) mode, or a pulse-code modulation (PCM) mode, wherein, in the transquant bypass mode, a transform and quantization process is not applied to the current video block, and wherein, in the QR-BDPCM mode, a difference between a quantized residual of an intra prediction of the current video block and a prediction of the quantized residual is represented in the bitstream representation. In some embodiments for method 2800, wherein the first coding mode and the second coding mode is a transquant bypass mode in which a transform and quantization process is not applied to a video block of the video, wherein the third determination of whether the third coding mode is applicable to the current video block is performed based on whether the current video block is coded using the transquant bypass mode and based on whether the transquant bypass mode is used to code one or more neighboring video blocks of the current video block that provide reference samples. In some embodiments for method 2800, the third coding mode includes an intra-prediction mode, an intra block copy (IBC) mode, or a combined inter-intra prediction (CIIP) mode.

In some embodiments for method 2800, wherein the first coding mode is a transquant bypass mode in which a transform and quantization process is not applied to a video block of the video, wherein in response to the current video block being coded using the transquant bypass mode and in response to reference samples being located in the current video block, a prediction signal is derived using the reference samples that are not converted in a forward reshaping process or an inverse reshaping process. In some embodiments for method 2800, wherein the first coding mode is a transquant bypass mode in which a transform and quantization process is not applied to a video block of the video, wherein in response to the current video block being coded using the transquant bypass mode and in response to reference samples located outside the current video block, a prediction signal is derived using converted reference samples that are obtained by an inverse reshaping process in which the reference samples are converted to the original domain. In some embodiments for method 2800, wherein the first coding mode is a transquant bypass mode in which a transform and quantization process is not applied to a video block of the video, wherein in response to the current video block not being coded using the transquant bypass mode and in response to reference samples located outside the current video block, a prediction signal is derived using the reference samples that are not converted in a forward reshaping process or an inverse reshaping process.

In some embodiments for method 2800, wherein the first coding mode is a transquant bypass mode in which a transform and quantization process is not applied to a video block of the video, wherein in response to the current video block not being coded using the transquant bypass mode and in response to reference samples being located in the current video block, a prediction signal is derived using converted reference samples that are obtained by an inverse reshaping process in which the reference samples are converted to the reshaping domain. In some embodiments for method 2800, wherein the current video block is coded using the third coding mode, wherein the reference samples are from the one or more video blocks in a same tile, brick, slice, or picture as the current video block, and wherein the intra prediction process is performed on the current video block by using the third coding mode. In some embodiments for method 2800, the current video block is associated with a luma component or a green color component.

FIG. 29 shows a flowchart of an exemplary method for video processing. The method 2900 includes performing 2902 a conversion between a current video block of a video and the bitstream representation of the video, wherein the bitstream representation conforms to a format rule that specifies whether the bitstream representation includes a syntax element that indicates whether the current video block is coded using a transquant bypass mode, and wherein, when the transquant bypass mode is applicable to the current video block, the current video block is represented in the bitstream representation without use of a transform and quantization process.

In some embodiments for method 2900, wherein the format rule specifies that the syntax element is included in the bitstream representation, and wherein the format rule specifies that the syntax element is included in the bitstream representation before a signaling of a usage of one or more transform matrices related coding tools for the current video block. In some embodiments for method 2900, wherein the one or more transform matrices related coding tools include a transform skip (TS) mode, an explicit multiple transform set (MTS) scheme, a reduced secondary transform (RST) mode, a sub-block transform (SBT) mode, or a quantized residual block differential pulse-code modulation (QR-BDPCM) mode, and wherein, in the QR-BDPCM mode, a difference between a quantized residual of an intra prediction of the current video block and a prediction of the quantized residual is represented in the bitstream representation. In some embodiments for method 2900, wherein a second syntax element for a residual coding technique is included in the bitstream representation based on whether the current video block is coded using the transquant bypass mode. In some embodiments for method 2900, wherein the residual coding technique applies a transform to the current video block or does not apply the transform on the current video block.

In some embodiments for method 2900, wherein, in response to the transquant bypass mode being not applicable to the current video block and in response to a transform skip (TS) mode being not applied to the current video block, the second syntax element indicates in the bitstream representation the residual coding technique in which a transform is applied to the current video block. In some embodiments for method 2900, wherein, in response to the transquant bypass mode being applicable to the current video block and in response to a transform skip (TS) mode being applied to the current video block, the second syntax element indicates in the bitstream representation the residual coding technique in which a transform is not applied to the current video block. In some embodiments for method 2900, wherein, in response to the transquant bypass mode being applicable to the current video block, the bitstream representation does not include a signaling for a transform skip (TS) mode for the current video block.

In some embodiments for method 2900, wherein a residual coding technique that does not apply a transform is applied to the current video block. In some embodiments for method 2900, wherein the bitstream representation includes a side information associated with a transform matrices related coding tool based on whether the transquant bypass mode is applicable to the current video block. In some embodiments for method 2900, wherein, in response to the transquant bypass mode being applicable to the current video block, the bitstream representation includes the side information that indicates usage of a transform skip (TS) mode, a quantized residual block differential pulse-code modulation (QR-BDPCM) mode, or a block differential pulse-code modulation (BDPCM) mode. In some embodiments for method 2900, wherein, in response to the transquant bypass mode being applicable to the current video block, the bitstream representation does not include the side information that indicates usage of a sub-block transform (SBT) mode, a reduced secondary transform (RST) mode, or an explicit multiple transform set (MTS) scheme.

In some embodiments for method 2900, wherein the format rule specifies that the syntax element is included in the bitstream representation, and wherein the format rule specifies that the syntax element is included in the bitstream representation after a signaling for one or more transform matrices related coding tools. In some embodiments for method 2900, wherein the syntax element is coded in the bitstream representation when a transform matrices related coding tool from the one or more transform matrices related coding tools is applied to the current video block. In some embodiments for method 2900, wherein the one or more transform matrices related coding tools includes a transform skip (TS) mode, a quantized residual block differential pulse-code modulation (QR-BDPCM) mode, or a block differential pulse-code modulation (BDPCM) mode. In some embodiments for method 2900, wherein the format rule specifies that the syntax element is not included in the bitstream representation in response to a sub-block transform (SBT) mode, or a reduced secondary transform (RST) mode, or an explicit multiple transform set (MTS) scheme being applied to the current video block.

Figure 30:
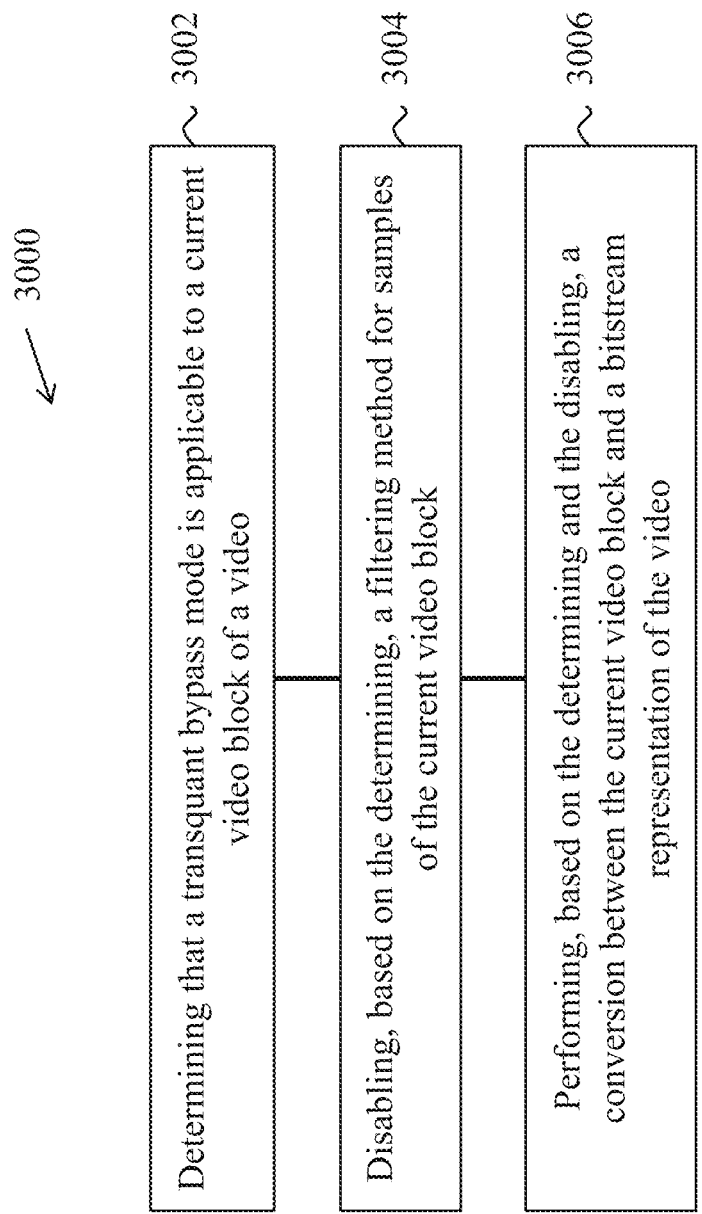

FIG. 30 shows a flowchart of an exemplary method for video processing. The method 3000 includes determining 3002 that a transquant bypass mode is applicable to a current video block of a video, wherein, in the transquant bypass mode, a transform and quantization process is not used on the current video block; disabling 3004, based on the determining, a filtering method for samples of the current video block; and performing 3006, based on the determining and the disabling, a conversion between the current video block and a bitstream representation of the video.

In some embodiments for method 3000, wherein the filtering method comprises an adaptive loop filtering (ALF) method or a nonlinear ALF method. In some embodiments for method 3000, wherein the filtering method includes a bilateral filter, or a diffusion filter, or a post-reconstruction filter that modifies reconstructed samples of the current video block. In some embodiments for method 3000, wherein the filtering method comprises a position dependent intra prediction combination (PDPC) method.

Figure 31:
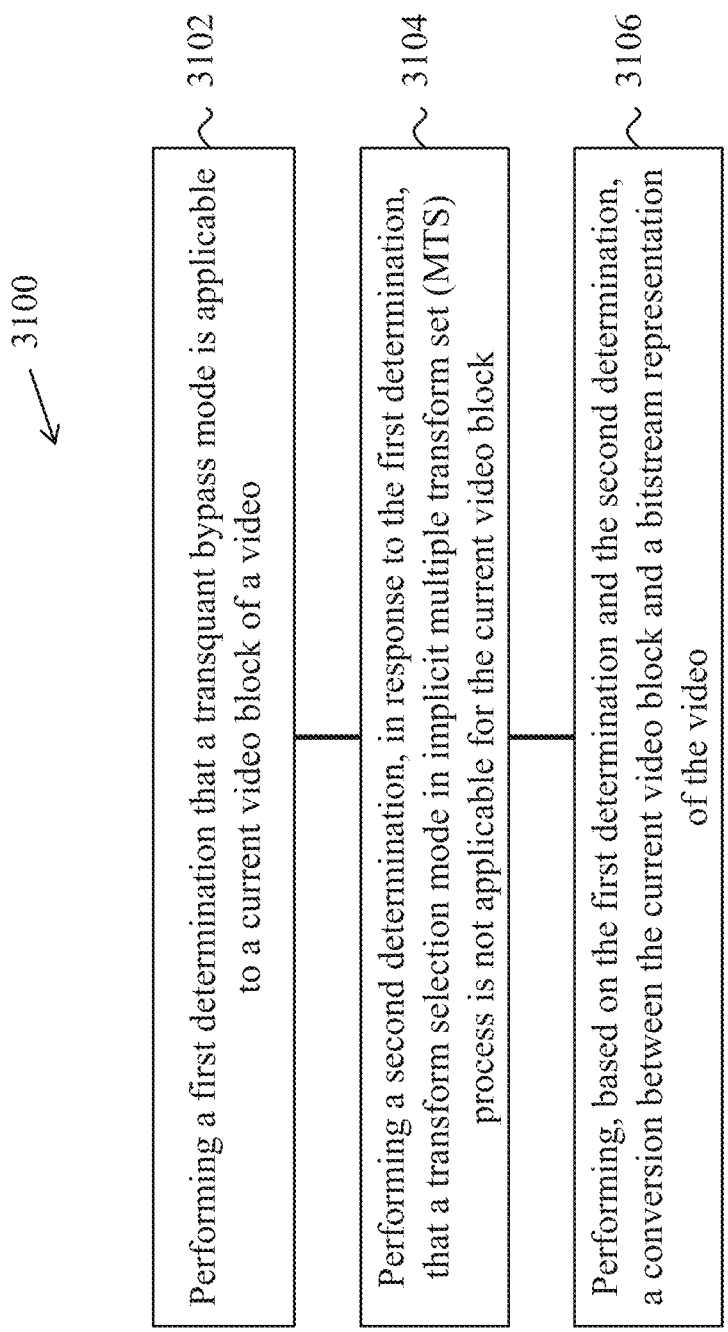

FIG. 31 shows a flowchart of an exemplary method for video processing. The method 3100 includes performing 3102 a first determination that a transquant bypass mode is applicable to a current video block of a video, wherein, in the transquant bypass mode, a transform and quantization process is not used on the current video block; performing 3104 a second determination, in response to the first determination, that a transform selection mode in implicit multiple transform set (MTS) process is not applicable for the current video block; and performing 3106, based on the first determination and the second determination, a conversion between the current video block and a bitstream representation of the video.

Figure 32:
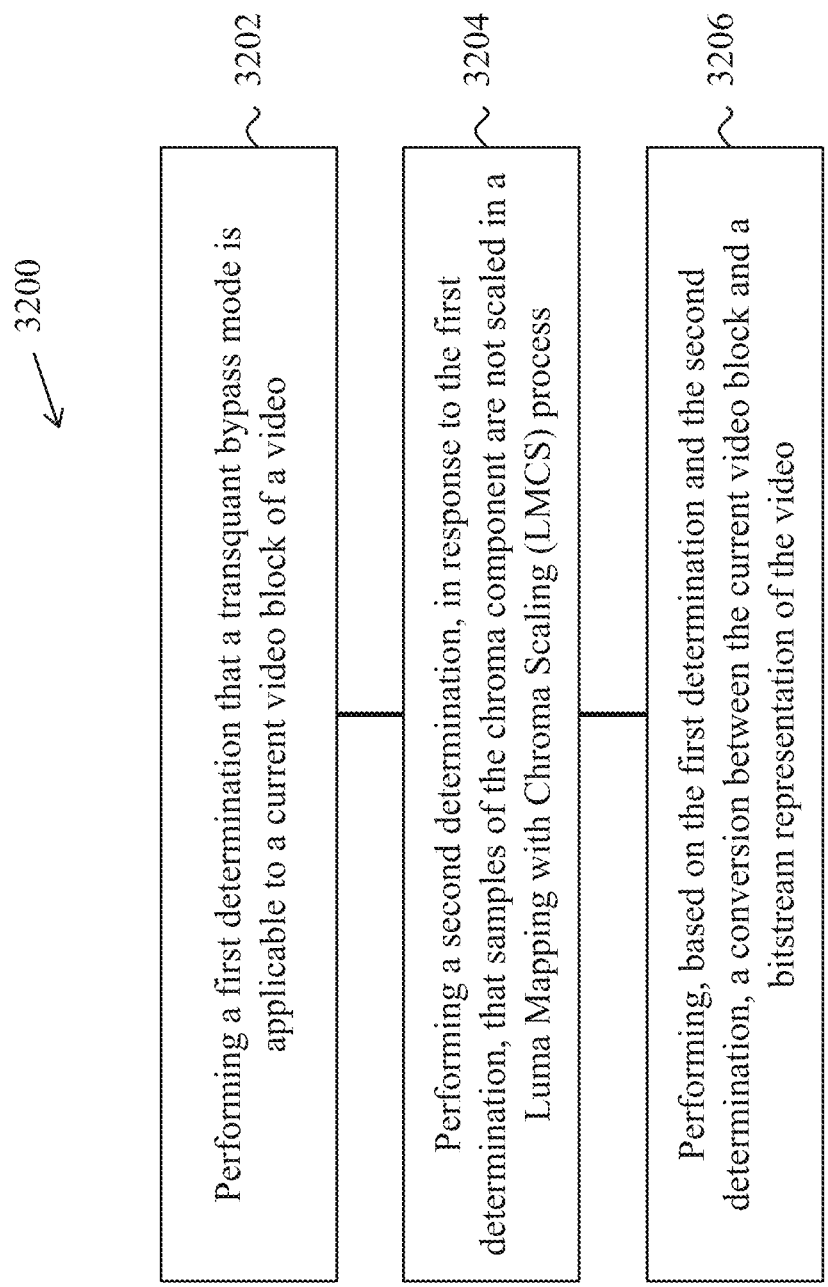

FIG. 32 shows a flowchart of an exemplary method for video processing. The method 3200 includes performing 3202 a first determination that a transquant bypass mode is applicable to a current video block of a video, wherein, in the transquant bypass mode, a transform and quantization process is not used on the current video block, wherein the current video block is associated with a chroma component; performing 3204 a second determination, in response to the first determination, that samples of the chroma component are not scaled in a Luma Mapping with Chroma Scaling (LMCS) process; and performing 3206, based on the first determination and the second determination, a conversion between the current video block and a bitstream representation of the video.

Figure 33:
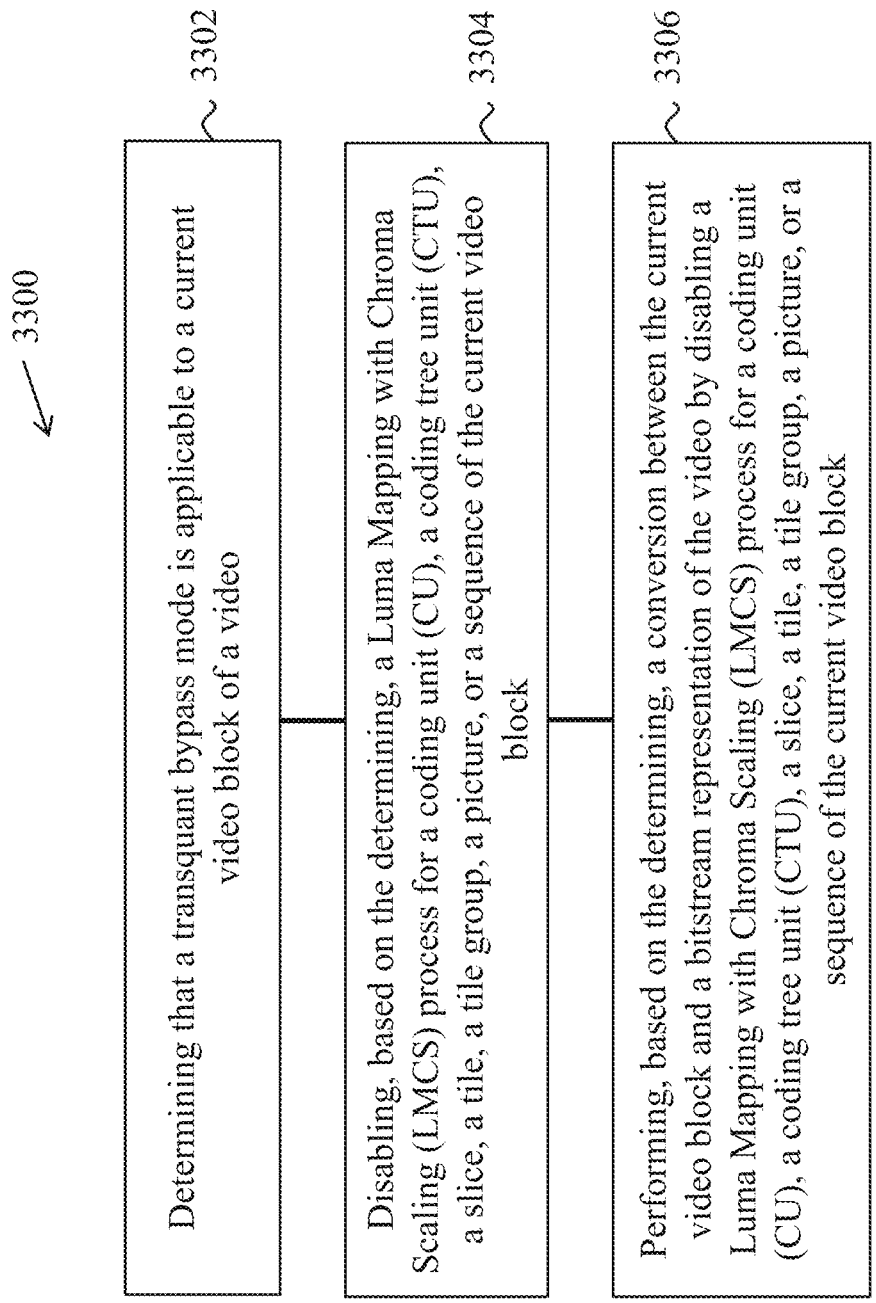

FIG. 33 shows a flowchart of an exemplary method for video processing. The method 3300 includes determining 3302 that a transquant bypass mode is applicable to a current video block of a video, wherein, in the transquant bypass mode, a transform and quantization process is not used on the current video block; disabling 3304, based on the determining, a Luma Mapping with Chroma Scaling (LMCS) process for a coding unit (CU), a coding tree unit (CTU), a slice, a tile, a tile group, a picture, or a sequence of the current video block; and performing 3306, based on the determining, a conversion between the current video block and a bitstream representation of the video by disabling a Luma Mapping with Chroma Scaling (LMCS) process for a coding unit (CU), a coding tree unit (CTU), a slice, a tile, a tile group, a picture, or a sequence of the current video block, wherein the disabling the LMCS process disables performance of switching between samples in a reshaped domain and an original domain for the current video block in case that the current video block is from a luma component, or wherein the disabling the LMCS process disables a scaling of a chroma residual of the current video block in case that the current video block is from a chroma component.

In some embodiments for method 3300, wherein a sequence parameter set (SPS), a video parameter set (VPS), a picture parameter set (PPS) or a slice header indicates that the transform and quantization process on the current video block is not used for the current video block. In some embodiments for method 3300, wherein the bitstream representation of the video excludes a signaling of a syntax element related to the LMCS process.

Figure 34:
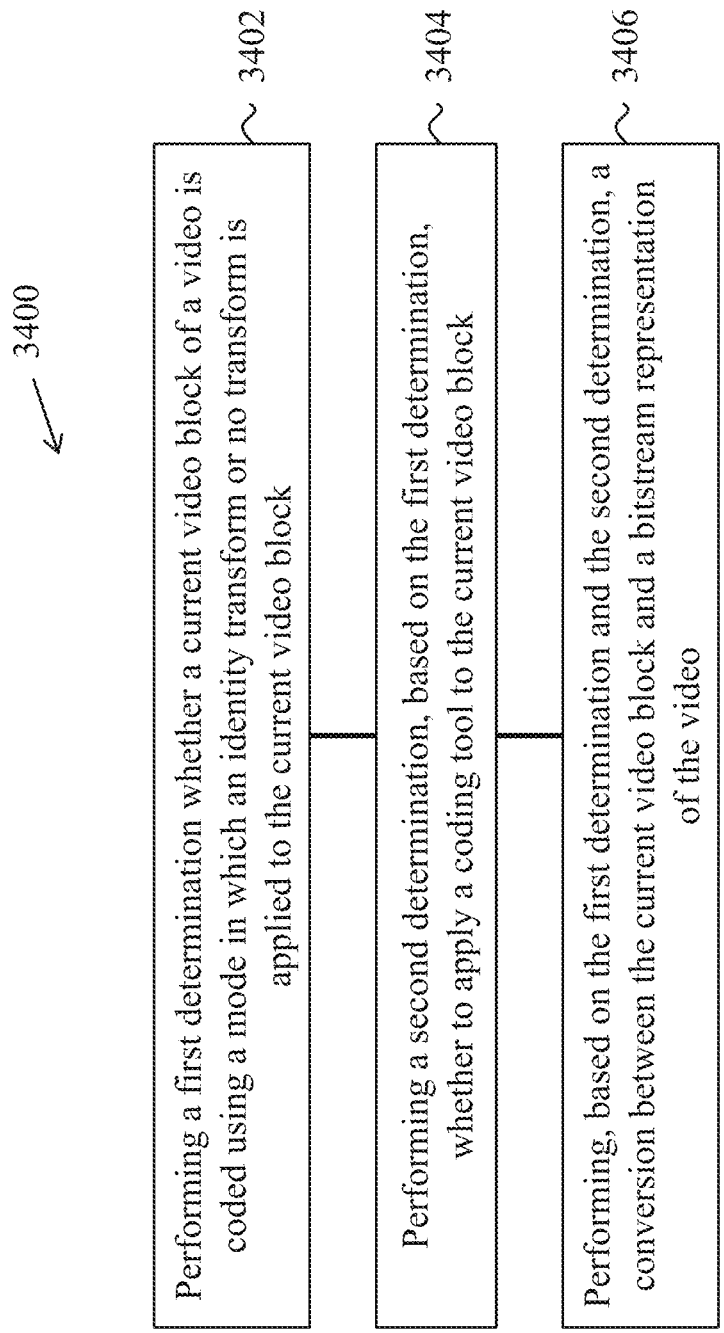

FIG. 34 shows a flowchart of an exemplary method for video processing. The method 3400 includes performing 3402 a first determination whether a current video block of a video is coded using a mode in which an identity transform or no transform is applied to the current video block; performing 3404 a second determination, based on the first determination, whether to apply a coding tool to the current video block; and performing 3406, based on the first determination and the second determination, a conversion between the current video block and a bitstream representation of the video.

In some embodiments for method 3400, wherein second determination includes determining that the coding tool is not applied to the current video block based on the first determination that the identity transform or no transform is applied to the current video block. In some embodiments for method 3400, wherein the mode includes a transquant bypass mode, a transform skip (TS) mode, a quantized residual block differential pulse-code modulation (QR-BDPCM) mode, a differential pulse-code modulation (DPCM) mode, or a pulse-code modulation (PCM) mode, wherein the coding tool includes a decoder-side motion derivation tool, a decoder-side intra mode decision tool, a combined inter-intra prediction (CIIP) mode, a triangular partition mode (TPM), wherein, in the transquant bypass mode, a transform and quantization process is not applied to the current video block, and wherein, in the QR-BDPCM mode, a difference between a quantized residual of an intra prediction of the current video block and a prediction of the quantized residual is represented in the bitstream representation. In some embodiments for method 3400, wherein second determination includes determining that the coding tool is not applied to the current video block based on the first determination that the identity transform or no transform is applied to the current video block, and wherein the coding tool includes a Prediction Refinement with Optical Flow (PROF) tool, a combined inter-intra prediction (CIIP) mode, or a triangular partition mode (TPM).

In some embodiments for method 3400, wherein second determination includes determining that the coding tool is not applied to the current video block based on the first determination that the identity transform is applied to the current video block, and wherein the coding tool includes a Bi-directional Optical Flow (BDOF) tool, a combined inter-intra prediction (CIIP) mode, or a triangular partition mode (TPM). In some embodiments for method 3400, wherein second determination includes determining that the coding tool is not applied to the current video block based on the first determination that the identity transform is applied to the current video block, and wherein the coding tool includes a decode-side motion vector refinement (DMVR) tool, a combined inter-intra prediction (CIIP) mode, or a triangular partition mode (TPM).

FIG. 35 shows a flowchart of an exemplary method for video processing. The method 3500 includes performing 3502 a conversion between a current video block of a video and a bitstream representation of the video, wherein the bitstream representation includes a syntax element that indicates whether a transquant bypass mode is applicable for representing the current video block, wherein, when the transquant bypass mode is applicable to the current video block, the current video block is represented in the bitstream representation without use of a transform and quantization process, wherein the transquant bypass mode is applicable at a first video unit level for the current video block, and wherein the bitstream representation excludes a signaling of the transquant bypass mode at a second video unit level in which video blocks of the current video block that are smaller than that at the first video unit level.

In some embodiments for method 3500, wherein the first video unit level includes a picture level, a slide level, a tile level, or a brick level of the current video block, and wherein the second video unit level includes a coding unit (CU), a transform unit (TU), or a prediction unit (PU). In some embodiments for method 3500, wherein the bitstream representation includes a signaling of whether the transquant bypass mode is applicable at the first video unit level based on whether a coding tool is applied to the current video block. In some embodiments for method 3500, wherein the bitstream representation includes a signaling of whether a coding tool is applied to the current video block based on whether the transquant bypass mode is applicable at the first video unit level. In some embodiments for method 3500, wherein a coding tool is not applied to the current video block in response to the bitstream representation includes a signaling of the transquant bypass mode being applicable at the first video unit level. In some embodiments for method 3500, wherein the transquant bypass mode is not applicable at the first video unit level in response to the bitstream representation indicating that a coding tool is applied to the current video block. In some embodiments for method 3500, wherein the coding tool includes a Luma Mapping with Chroma Scaling (LMCS) process, a decoder-side motion derivation, a decoder-side intra mode decision, a combined inter-intra prediction (CIIP) mode, or a triangular partition mode (TPM). In some embodiments for method 3500, wherein the decoder-side motion derivation process includes a decode-side motion vector refinement (DMVR) tool, a Bi-directional Optical Flow (BDOF) tool, or a Prediction Refinement with Optical Flow (PROF) tool.

FIG. 36 shows a flowchart of an exemplary method for video processing. The method 3600 includes performing 3602 a conversion between a current video block of a video and a bitstream representation of the video, wherein the bitstream representation includes a syntax element that indicates whether a transquant bypass mode is applicable for representing the current video block, wherein, when the transquant bypass mode is applicable to the current video block, the current video block is represented in the bitstream representation without use of a transform and quantization process, wherein the transquant bypass mode is applicable at a first video unit level for the current video block, and wherein the bitstream representation includes a side information of a usage of the transquant bypass mode at a second video unit level of the current video block.

In some embodiments for method 3600, wherein the first video unit level includes a prediction unit (PU) or a coding unit (CU) of the current video block, and wherein the second video unit level includes a transform unit (TU) of the current video block. In some embodiments for method 3600, wherein the side information is included once in the bitstream representation for the current video block in response to the PU or the CU including a plurality of TUs. In some embodiments for method 3600, wherein the side information is associated with a first TU in the CU, and wherein remaining one or more TUs share the side information.

Figure 37:
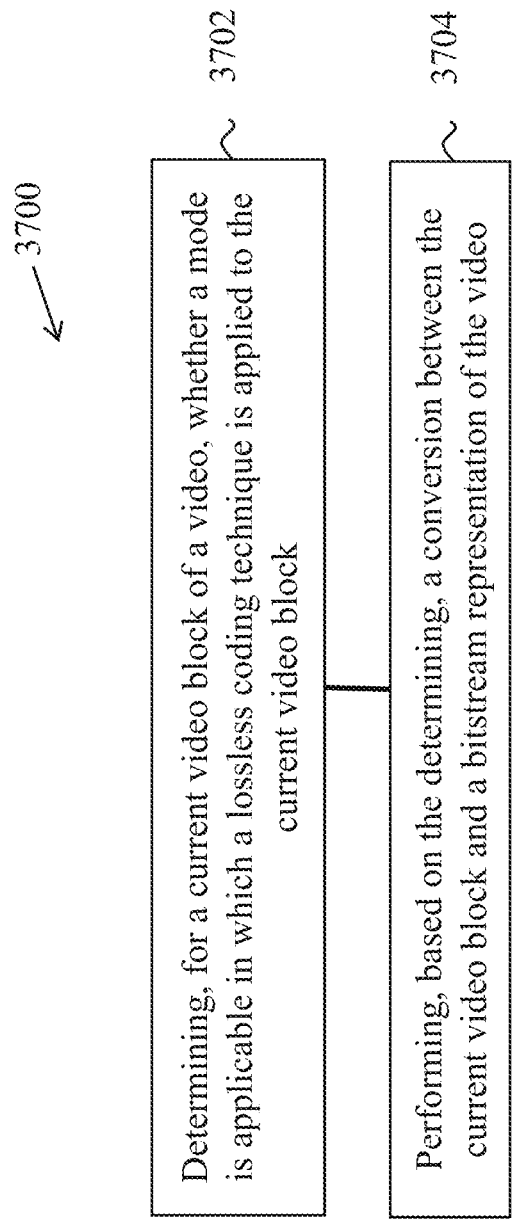

FIG. 37 shows a flowchart of an exemplary method for video processing. The method 3700 includes determining 3702, for a current video block of a video, whether a mode is applicable in which a lossless coding technique is applied to the current video block; and performing 3704, based on the determining, a conversion between the current video block and a bitstream representation of the video, wherein the bitstream representation includes a syntax element that indicates whether a coding tool is applicable at a video unit level of the current video block, wherein the video unit level is larger than a coding unit (CU), and wherein the coding tool is not applied to samples within the video unit level.

In some embodiments for method 3700, wherein the coding tool is not applied to samples within the video unit level when the syntax element of the coding tool indicates that the coding tool is applicable to be applied to the video unit level. In some embodiments for method 3700, wherein the video unit level includes a sequence, a picture, a view, a slice, a tile, a brick, a sub-picture, a coding tree block (CTB), or a coding tree unit (CTU) of the current video block. In some embodiments for method 3700, wherein the coding tool includes a filtering process that includes an adaptive loop filtering (ALF) method, a clipping process in a non-linear ALF, a sample adaptive offset (SAO), a bilateral filter, a Hamdard transform domain filter, scaling matrices, a decoder side derivation technique. In some embodiments for method 3700, wherein the syntax element of the coding tool indicates that the coding tool is not applicable for the video unit level in response to some or all of the samples of the video unit level being coded using the mode that is applicable. In some embodiments for method 3700, wherein the lossless coding technique includes a TransQuantBypass mode in which a transform and quantization process are not applied to the current video block, or wherein the lossless coding technique includes a near lossless coding technique. In some embodiments for method 3700, wherein the near lossless coding technique includes the current video block having quantization parameters within a certain range. In some embodiments for method 3700, wherein the certain range is [4, 4].

Figure 38:
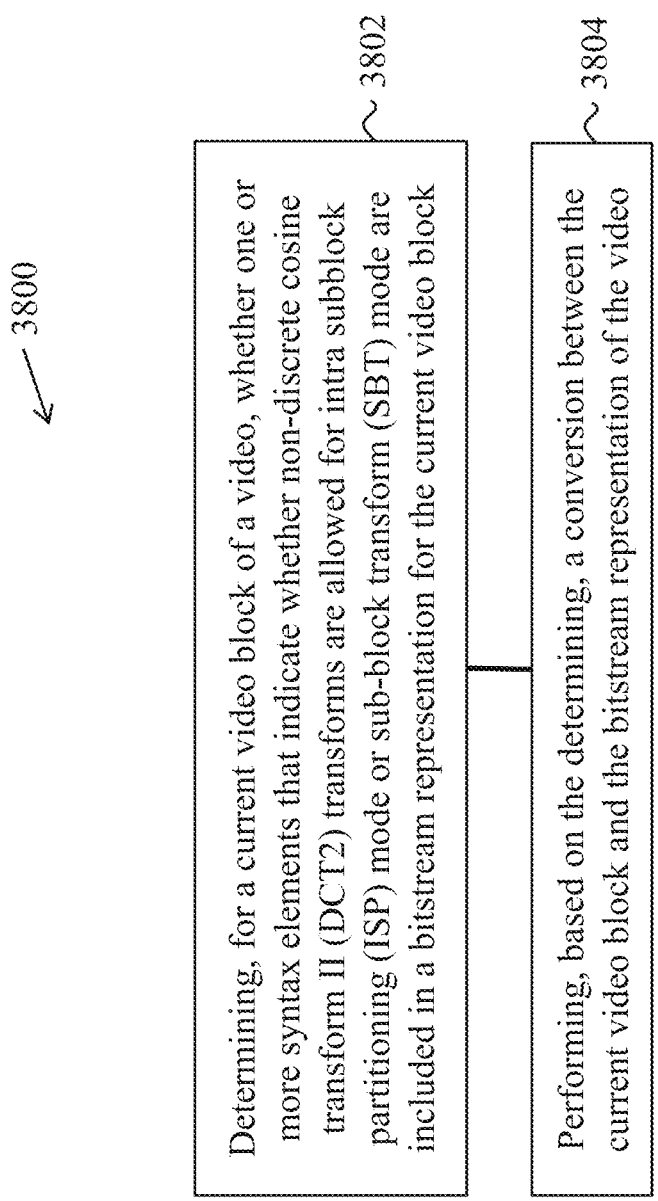

FIG. 38 shows a flowchart of an exemplary method for video processing. The method 3800 includes determining 3802, for a current video block of a video, whether one or more syntax elements that indicate whether non-discrete cosine transform II (DCT2) transforms are allowed for intra subblock partitioning (ISP) mode or sub-block transform (SBT) mode are included in a bitstream representation for the current video block; and performing 3804, based on the determining, a conversion between the current video block and the bitstream representation of the video.

In some embodiments for method 3800, wherein the one or more syntax elements are signaled in the bitstream representation in response to either the ISP mode or the SBT mode being applied to the current video block. In some embodiments for method 3800, wherein the one or more syntax elements are signaled in the bitstream representation in response to both the ISP mode and the SBT mode being applied to the current video block. In some embodiments for method 3800, wherein the non-DCT2 transforms are allowed in response to the one or more syntax elements indicating a true condition. In some embodiments for method 3800, wherein one syntax element is signaled in the bitstream representation in response to both the ISP mode being applied to the current video block. In some embodiments for method 3800, wherein one syntax element is signaled in the bitstream representation in response to both the SBT mode being applied to the current video block. In some embodiments for method 3800, wherein the bitstream representation includes another syntax element that indicates a usage of an explicit multiple transform set (MTS) process for the current video block or a selection of transforms on intra block dimension for the current video block. In some embodiments for method 3800, wherein the intra block dimension includes an implicit MTS applied to non-ISP coded intra blocks of the current video block. In some embodiments for method 3800, wherein the ISP mode with non-DCT2 transform are applied to the current video block in response to the another syntax element indicating that the explicit MTS process is not applied to the current video block. In some embodiments for method 3800, wherein the SBT mode with non-DCT2 transform are applied to the current video block in response to the another syntax element indicating that the explicit MTS process is not applied to the current video block.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   determining, for a conversion between a video region of a video and a bitstream of the video, whether a first coding mode associated with a first block of the video region and a second coding mode associated with a second block of the video region are enabled based on a dimension constraint;
   wherein the dimension constraint states a same allowed maximum dimension for the first block to use the first coding mode and for the second block to use the second coding mode,
   wherein, for an encoding process, both the first coding mode and the second coding mode do not apply a transform operation, or for a decoding process, both the first coding mode and the second coding mode do not apply an inverse transform operation, and wherein the first coding mode includes a transform skip mode, and the second coding mode includes a differential coding mode, and wherein in the differential coding mode, differences between quantized residuals derived with an intra prediction mode of a block and predictions of the quantized residuals are included in the bitstream; and
   performing the conversion based on the determining,
   wherein a second syntax element that indicates on/off control for the second coding mode is included at a sequence parameter set (SPS) level under a condition check of whether the first coding mode is allowed, and
   wherein in case that the second coding mode is allowed for the second block, the first coding mode is applied to one or more residual blocks of the second block.

2. The method of claim 1, wherein a single first syntax element that indicates the allowed maximum dimension is included in the bitstream to control usage of the first coding mode and the second coding mode.

3. The method of claim 2, wherein the first syntax element is included in the bitstream in case that the first coding mode is enabled.

4. The method of claim 3, wherein the first coding mode is enabled at a level which is not a coding unit level.

5. The method of claim 2, wherein whether to enable the second coding mode depends on whether the first coding mode is enabled.

6. The method of claim 1, wherein in the first coding mode, a quantization operation is also skipped in the encoding process and an inverse quantization operation is also skipped in the decoding process.

7. The method of claim 1, wherein the allowed maximum dimension is also used for a third coding mode associated with a third block of the video region, and wherein the third coding mode allows coefficient values at a transform domain of the third block to be same as values of a residual block of the third block.

8. The method of claim 1, wherein the differences are represented using a block based differential pulse coding modulation representation.

9. The method of claim 1, wherein the first block and the second block are a same block.

10. The method of claim 1, wherein the conversion includes encoding the video region into the bitstream.

11. The method of claim 1, wherein the conversion includes decoding the video region from the bitstream.

12. An apparatus for processing video data comprising a processor and a non-transitory memory with instructions thereon, wherein the instructions upon execution by the processor, cause the processor to:
  determine, for a conversion between a video region of a video and a bitstream of the video, whether a first coding mode associated with a first block of the video region and a second coding mode associated with a second block of the video region are enabled based on a dimension constraint;
    wherein the dimension constraint states a same allowed maximum dimension for the first block to use the first coding mode and for the second block to use the second coding mode,
    wherein, for an encoding process, both the first coding mode and the second coding mode do not apply a transform operation, or for a decoding process, both the first coding mode and the second coding mode do not apply an inverse transform operation, and
    wherein the first coding mode includes a transform skip mode, and the second coding mode includes a differential coding mode, and wherein in the differential coding mode, differences between quantized residuals derived with an intra prediction mode of a block and predictions of the quantized residuals are included in the bitstream; and
  perform the conversion based on the determining,
  wherein a second syntax element that indicates on/off control for the second coding mode is included at a sequence parameter set (SPS) level under a condition check of whether the first coding mode is allowed, and
  wherein in case that the second coding mode is allowed for the second block, the first coding mode is applied to one or more residual blocks of the second block.

13. The apparatus of claim 12, wherein a single first syntax element that indicates the allowed maximum dimension is included in the bitstream to control usage of the first coding mode and the second coding mode, and the first syntax element is included in the bitstream in case that the first coding mode is enabled, and
  wherein the first coding mode is enabled at a level which is not a coding unit level.

14. A non-transitory computer-readable storage medium storing instructions that cause a processor to:
  determine, for a conversion between a video region of a video and a bitstream of the video, whether a first coding mode associated with a first block of the video region and a second coding mode associated with a second block of the video region are enabled based on a dimension constraint;
    wherein the dimension constraint states a same allowed maximum dimension for the first block to use the first coding mode and for the second block to use the second coding mode,
    wherein, for an encoding process, both the first coding mode and the second coding mode do not apply a transform operation, or for a decoding process, both the first coding mode and the second coding mode do not apply an inverse transform operation, and
    wherein the first coding mode includes a transform skip mode, and the second coding mode includes a differential coding mode, and wherein in the differential coding mode, differences between quantized residuals derived with an intra prediction mode of a block and predictions of the quantized residuals are included in the bitstream; and
  perform the conversion based on the determining,
  wherein a second syntax element that indicates on/off control for the second coding mode is included at a sequence parameter set (SPS) level under a condition check of whether the first coding mode is allowed, and
  wherein in case that the second coding mode is allowed for the second block, the first coding mode is applied to one or more residual blocks of the second block.

15. The non-transitory computer-readable storage medium of claim 14, wherein a single first syntax element that indicates the allowed maximum dimension is included in the bitstream to control usage of the first coding mode and the second coding mode, and the first syntax element is included in the bitstream in case that the first coding mode is enabled, and
  wherein the first coding mode is enabled at a level which is not a coding unit level.

16. A method for storing a bitstream of a video, comprising:
  determining whether a first coding mode associated with a first block of a video region of the video and a second coding mode associated with a second block of the video region are enabled based on a dimension constraint;
    wherein the dimension constraint states a same allowed maximum dimension for the first block to use the first coding mode and for the second block to use the second coding mode,
    wherein, for an encoding process, both the first coding mode and the second coding mode do not apply a transform operation, or for a decoding process, both the first coding mode and the second coding mode do not apply an inverse transform operation, and
    wherein the first coding mode includes a transform skip mode, and the second coding mode includes a differential coding mode, and wherein in the differential coding mode, differences between quantized residuals derived with an intra prediction mode of a block and predictions of the quantized residuals are included in the bitstream;
  generating the bitstream based on the determining; and
  storing the bitstream in a non-transitory computer-readable recording medium;

wherein a second syntax element that indicates on/off control for the second coding mode is included at a sequence parameter set (SPS) level under a condition check of whether the first coding mode is allowed, and wherein in case that the second coding mode is allowed for the second block, the first coding mode is applied to one or more residual blocks of the second block.

17. The method of claim 16, wherein a single first syntax element that indicates the allowed maximum dimension is included in the bitstream to control usage of the first coding mode and the second coding mode, and the first syntax element is included in the bitstream in case that the first coding mode is enabled, and wherein the first coding mode is enabled at a level which is not a coding unit level.

* * * * *